United States Patent
Pogrebinsky

(10) Patent No.: US 11,459,877 B2
(45) Date of Patent: Oct. 4, 2022

(54) SYSTEM AND METHOD OF DOWNHOLE SIGNAL TRANSMISSION WITH COMBINATORIAL SCHEME

(71) Applicant: Michael Simon Pogrebinsky, Houston, TX (US)

(72) Inventor: Michael Simon Pogrebinsky, Houston, TX (US)

(73) Assignee: Michael Simon Pogrebinsky, Houston, TX (US)

( * ) Notice: Subject to any disclaimer, the term of this patent is extended or adjusted under 35 U.S.C. 154(b) by 131 days.

(21) Appl. No.: 17/025,118

(22) Filed: Sep. 18, 2020

(65) Prior Publication Data

US 2022/0090493 A1    Mar. 24, 2022

(51) Int. Cl.
*E21B 47/13*    (2012.01)
*H04Q 9/00*    (2006.01)

(52) U.S. Cl.
CPC .............. *E21B 47/13* (2020.05); *H04Q 9/00* (2013.01); *H04Q 2213/003* (2013.01)

(58) Field of Classification Search
CPC .......... E21B 47/13; E21B 47/18; E21B 47/20; E21B 47/12; H04Q 2213/003; H04Q 9/00; H04L 25/4902; G01V 11/002; H02P 9/30; H02P 21/05; H02P 6/28; B60L 50/66; B60L 15/2045; B60L 50/51; B60L 15/025; B60L 50/16
See application file for complete search history.

(56) References Cited

U.S. PATENT DOCUMENTS

| | | | |
|---|---|---|---|
| 4,847,815 A | 7/1989 | Malone | |
| 4,908,804 A | 3/1990 | Rorden | |
| 6,219,301 B1 | 4/2001 | Moriarty | |
| 6,327,524 B1 | 12/2001 | Chen | |
| 6,714,138 B1 | 3/2004 | Turner et al. | |
| 7,129,673 B2 | 10/2006 | Eisenhardt et al. | |
| 8,350,715 B2 | 1/2013 | Shearer | |
| 10,113,420 B2 | 10/2018 | Pogrebinsky et al. | |
| 2004/0012500 A1* | 1/2004 | Hahn | E21B 47/18 340/854.4 |
| 2006/0114747 A1* | 6/2006 | Hentati | G01V 11/002 367/83 |
| 2007/0189119 A1* | 8/2007 | Klotz | E21B 47/18 367/83 |
| 2008/0055110 A1* | 3/2008 | Hahn | E21B 47/18 340/854.3 |
| 2010/0039287 A1* | 2/2010 | Li | G01V 11/002 340/855.7 |

(Continued)

*Primary Examiner* — Sisay Yacob
(74) *Attorney, Agent, or Firm* — McCarter & English, LLP

(57) ABSTRACT

A combinatorial frequency system and method for transmitting data from LWD downhole operations to a surface location is provided. The system and method include obtaining data from at least one downhole sensor, encoding data by combinations of different harmonics, and (optionally) modulating the data using various frequency modulation techniques to produce a series of 3-40 bit rates. The system and method include transmitting the series as pressure wave signals through drilling fluid or through earth media by electromagnetic waves, detecting the signals, identifying at a surface location each frequency, modulating characteristics of each frequency, decoding each signal and forming output signals.

43 Claims, 37 Drawing Sheets

(56) References Cited

U.S. PATENT DOCUMENTS

| | | | |
|---|---|---|---|
| 2015/0345287 A1* | 12/2015 | White | E21B 47/20 |
| | | | 367/83 |
| 2016/0201455 A1* | 7/2016 | Liu | E21B 47/13 |
| | | | 340/854.6 |
| 2017/0284195 A1* | 10/2017 | White | E21B 47/20 |

* cited by examiner

| ANGLE RANGE | ACCELERATION | | | |
|---|---|---|---|---|
| | 40 MS | | 50 MS | |
| | 1:130 | 1:65 | 1:130 | 1:65 |
| 6° | 5.95 Hz | 9.00 Hz | 5.43 Hz | 8.20 Hz |
| 10° | 4.85 Hz | 7.30 Hz | 4.46 Hz | 6.58 Hz |
| 15° | 4.00 Hz | 6.10 Hz | 3.70 Hz | 5.52 Hz |

FIG. 4

| PULSER | GEAR RATIO | CATEGORY (BY FREQUENCY) | $F_{MAX}$ |
|---|---|---|---|
| STANDARD | 1:130 | LOW FREQ. | 4 Hz |
| | 1:65 | MID FREQ. | 6-8 Hz |
| ADVANCED | | HIGH FREQ. | 16 Hz |

FIG. 5

| # | BITS | FREQ. |
|---|------|-------|
| 1 | 000 | f=0 |
| 2 | 001 | f=2 |
| 3 | 010 | f=4 |
| 4 | 011 | f=6 |
| 5 | 100 | f=2; f=4 |
| 6 | 101 | f=2; f=6 |
| 7 | 110 | f=4; f=6 |
| 8 | 111 | f=2; f=4; f=6 |

| COMPONENTS OF OUTPUT SIGNAL | NUMBER OF POSSIBLE COMBINATIONS | DATA TRANSMISSION RATE (BPS) $F_{MAX}$=8 HZ, T=0.5 SEC | % |
|---|---|---|---|
| $C_4^1$ | 16 (16 USED) | 8.0 | |
| $C_4^1 + C_4^2$ | 112 (64 USED) | 12.00 | 50.00 |
| $C_4^1 + C_4^2 + C_4^3$ | 368 (256 USED) | 16.00 | 33.33 |
| $\sum_{K=1}^{4} C_4^K$ | 624 (512 USED) | 18.00 | 12.50 |

| F_MAX (HZ) | N | 4-PSK | | 5-PSK | | 6-PSK | |
|---|---|---|---|---|---|---|---|
| | | COMB. | BPS | COMB. | BPS | COMB. | BPS |
| 4 | 2 | 24 | 9.17 | 35 | 10.26 | 48 | 11.17 |
| 6 | 3 | 60 | 11.81 | 90 | 12.98 | 126 | 13.95 |
| 8 | 4 | 112 | 13.61 | 170 | 14.82 | 240 | 15.81 |
| 10 | 5 | 180 | 14.98 | 275 | 16.21 | 390 | 17.21 |
| 12 | 6 | 264 | 16.09 | 405 | 17.32 | 576 | 18.34 |
| 14 | 7 | 364 | 17.02 | 560 | 18.26 | 798 | 19.28 |
| 16 | 8 | 480 | 17.81 | 740 | 19.06 | 1056 | 20.09 |

T=0.5S, FORMULA (3), K=2

FIG. 21

| F_MAX (HZ) | N | 4-PSK | | 5-PSK | | 6-PSK | |
|---|---|---|---|---|---|---|---|
| | | COMB. | BPS | COMB. | BPS | COMB. | BPS |
| 4 | 4 | 112 | 6.81 | 170 | 7.41 | 240 | 7.91 |
| 6 | 6 | 264 | 8.04 | 405 | 8.66 | 576 | 9.17 |
| 8 | 8 | 480 | 8.91 | 740 | 9.53 | 1056 | 10.04 |
| 10 | 10 | 760 | 9.57 | 1175 | 10.2 | 1680 | 10.71 |
| 12 | 12 | 1104 | 10.11 | 1710 | 10.74 | 2448 | 11.26 |
| 14 | 14 | 1512 | 10.56 | 2345 | 11.2 | 3360 | 11.71 |
| 16 | 16 | 1984 | 10.95 | 3080 | 11.59 | 4416 | 12.11 |

T=1S, FORMULA (3), K=2

FIG. 22

| # | BITS | FREQ. | PHASES | # | BITS | FREQ. | PHASES |
|---|---|---|---|---|---|---|---|
| 1 | 000000 | f=2 | π/5 | 33 | 100000 | f=2; f=4 | 7π/5; π |
| 2 | 000001 | f=2 | 3π/5 | 34 | 100001 | f=2; f=4 | 7π/5; 7π/5 |
| 3 | 000010 | f=2 | π | 35 | 100010 | f=2; f=4 | 7π/5; 9π/5 |
| 4 | 000011 | f=2 | 7π/5 | 36 | 100011 | f=2; f=4 | 9π/5; π/5 |
| 5 | 000100 | f=2 | 9π/5 | 37 | 100100 | f=2; f=4 | 9π/5; 3π/5 |
| 6 | 000101 | f=4 | π/5 | 38 | 100101 | f=2; f=4 | 9π/5; π |
| 7 | 000110 | f=4 | 3π/5 | 39 | 100110 | f=2; f=4 | 9π/5; 7π/5 |
| 8 | 000111 | f=4 | π | 40 | 100111 | f=2; f=4 | 9π/5; 9π/5 |
| 9 | 001000 | f=4 | 7π/5 | 41 | 101000 | f=2; f=6 | π/5; π/5 |
| 10 | 001001 | f=4 | 9π/5 | 42 | 101001 | f=2; f=6 | π/5; 3π/5 |
| 11 | 001010 | f=6 | π/5 | 43 | 101010 | f=2; f=6 | π/5; π |
| 12 | 001011 | f=6 | 3π/5 | 44 | 101011 | f=2; f=6 | π/5; 7π/5 |
| 13 | 001100 | f=6 | π | 45 | 101100 | f=2; f=6 | π/5; 9π/5 |
| 14 | 001101 | f=6 | 7π/5 | 46 | 101101 | f=2; f=6 | 3π/5; π/5 |
| 15 | 001110 | f=6 | 9π/5 | 47 | 101110 | f=2; f=6 | 3π/5; 3π/5 |
| 16 | 001111 | f=2; f=4 | π/5; π/5 | 48 | 101111 | f=2; f=6 | 3π/5; π |
| 17 | 010000 | f=2; f=4 | π/5; 3π/5 | 49 | 110000 | f=2; f=6 | 3π/5; 7π/5 |
| 18 | 010001 | f=2; f=4 | π/5; π | 50 | 110001 | f=2; f=6 | 3π/5; 9π/5 |
| 19 | 010010 | f=2; f=4 | π/5; 7π/5 | 51 | 110010 | f=2; f=6 | π; π/5 |
| 20 | 010011 | f=2; f=4 | π/5; 9π/5 | 52 | 110011 | f=2; f=6 | π; 3π/5 |
| 21 | 010100 | f=2; f=4 | 3π/5; π/5 | 53 | 110100 | f=2; f=6 | π; π |
| 22 | 010101 | f=2; f=4 | 3π/5; 3π/5 | 54 | 110101 | f=2; f=6 | π; 7π/5 |
| 23 | 010110 | f=2; f=4 | 3π/5; π | 55 | 110110 | f=2; f=6 | π; 9π/5 |
| 24 | 010111 | f=2; f=4 | 3π/5; 7π/5 | 56 | 110111 | f=2; f=6 | 7π/5; π/5 |
| 25 | 011000 | f=2; f=4 | 3π/5; 9π/5 | 57 | 111000 | f=2; f=6 | 7π/5; 3π/5 |
| 26 | 011001 | f=2; f=4 | π; π/5 | 58 | 111001 | f=2; f=6 | 7π/5; π |
| 27 | 011010 | f=2; f=4 | π; 3π/5 | 59 | 111010 | f=2; f=6 | 7π/5; 7π/5 |
| 28 | 011011 | f=2; f=4 | π; π | 60 | 111011 | f=2; f=6 | 7π/5; 9π/5 |
| 29 | 011100 | f=2; f=4 | π; 7π/5 | 61 | 111100 | f=2; f=6 | 9π/5; π/5 |
| 30 | 011101 | f=2; f=4 | π; 9π/5 | 62 | 111101 | f=2; f=6 | 9π/5; 3π/5 |
| 31 | 011110 | f=2; f=4 | 7π/5; π/5 | 63 | 111110 | f=2; f=6 | 9π/5; π |
| 32 | 011111 | f=2; f=4 | 7π/5; 3π/5 | 64 | 111111 | f=2; f=6 | 9π/5; 7π/5 |

FIG. 23

| # | BITS | COMBINATORIAL GROUP {2, 6} | COMBINATORIAL GROUP {4, 8} |
|---|------|----------------------------|----------------------------|
| 1 | 000  | $f=2, \varphi=\pi/4$       | $f=4, \varphi=\pi/4$       |
| 2 | 001  | $f=2, \varphi=3\pi/4$      | $f=4, \varphi=3\pi/4$      |
| 3 | 010  | $f=2, \varphi=5\pi/4$      | $f=4, \varphi=5\pi/4$      |
| 4 | 011  | $f=2, \varphi=7\pi/4$      | $f=4, \varphi=7\pi/4$      |
| 5 | 100  | $f=6, \varphi=\pi/4$       | $f=8, \varphi=\pi/4$       |
| 6 | 101  | $f=6, \varphi=3\pi/4$      | $f=8, \varphi=3\pi/4$      |
| 7 | 110  | $f=6, \varphi=5\pi/4$      | $f=8, \varphi=5\pi/4$      |
| 8 | 111  | $f=6, \varphi=7\pi/4$      | $f=8, \varphi=7\pi/4$      |

FIG. 31

SYSTEM AND METHOD OF DOWNHOLE SIGNAL TRANSMISSION WITH COMBINATORIAL SCHEME

TECHNICAL FIELD

The present invention relates generally to data transmission methods during drilling operations and, particularly, to data collection and transmission during logging while drilling operations from downhole sensors using combinatorial scheme(s).

BACKGROUND

In the drilling industry, logging while drilling (LWD) systems can be used for data collection. As discussed herein, the term LWD is used to encompass both the collection of formation characteristics and parameters during drilling, as well as the collection of information relating to the position of the drilling assembly.

In general, while drilling is in progress, various sensors can be used to measure parameters and characteristics related to the drilling operations (e.g., downhole pressures, temperatures, orientations of drilling tools, or the like) and/or parameters related to subterranean rock formations at the bottom of the wellbore (e.g., resistivity, density, porosity, or the like). The sensors can be in communication with a transmitter positioned within the wellbore. The transmitter can transmit the reading from the sensors to the surface of the wellbore. In some instances, the transmitter may operate by generating signals using pressure wave fluctuations, electromagnetic fields, or acoustics.

Most traditional LWD systems use the drilling fluid (e.g., mud) in the drill string as the information carrier, and may be referred to as mud pulse telemetry systems. In positive-pulse systems, a valve or other form of flow restrictor can be used to create pressure pulses in the fluid flow by adjusting the area of a constriction in the drill string. In negative-pulse systems, a valve can be used to create pressure pulses by releasing fluid from the interior of the drill string to the annulus. In both systems types, the pressure pulses propagate at the speed of sound through the drilling fluid to the surface, where the signals are typically detected by one or more transducers. In general, there are two types of mud pulsers. One type of pulser is based on movements of a valve or restrictor along the wellbore axis to and from a non-movable stator. A second type of pulser provides a restriction of mudflow by moving a rotor in the plane perpendicular to the wellbore axis.

Traditional mud pulse telemetry systems can be based on generation of a sequence of pressure pulses which are separated between themselves in time. Such systems typically use only one frequency generated by a modulator, and may include phase or other type(s) of modulation. Using two or more modulators is impractical. The traditional method of coding/encoding can be based on the pulse position and/or distance between each pulse. Traditional LWD systems generally have low data transmission rates (e.g., about 0.5-2.0 bit/s) due to problems with pulse detection in most geotechnical conditions, such as drilling pump noise, vibrations, fluid turbulence, noises from the downhole motor and/or drill bit, or the like. In general, detection of pressure wave pulses with a length of about 0.5 seconds or less may be problematic and not reliable in various drilling conditions.

Thus, a need exists for a system and method for increasing data transmission rates by using more robust and effective encoding based on simultaneous transmission of different frequencies along with the ability to change one coding method through downlinking to another one based on detection of presence of noise frequencies. These and other needs are addressed by the system and method of the present disclosure.

SUMMARY

The present invention discloses a combinatorial frequencies method and system for transmitting a stream of the LWD data (e.g., LWD and MWD data) from a down hole location to a surface location by using a single pressure wave modulator or a modulator of electromagnetic waves. The modulator can be positioned in the bottom hole assembly and generates pressure wave signals or electromagnetic signals according to predetermined encoded combinatorial schemes. The generated signal transmits simultaneously one or a combination of a few frequencies which may have modulation by phase shift keying (PSK) or others modulation techniques.

In some embodiments, the combinatorial frequencies method can include selection and evaluation of a modulator based on the required data transmission rate. In some embodiments, the method can include detection of narrow band noises and changing by downlinking a current combinatorial set to a new combinatorial set in order to exclude from the combinatorial alphabet the frequencies that coincide with observed noises. In some embodiments, the amplitudes of each frequency can be generated by taking into account their attenuations based on the well depth, property of the drilling mud, and the internal diameter of the pipe. In some embodiments, the method can include detection of and decoding the generated waves of pressure by using a pressure transducer, a surface microelectronic device and a computing device with software capable of recognizing one or a few harmonies along with their modulation parameters.

In accordance with embodiments of the present disclosure, an exemplary method for transmitting data from a measurement/logging system in a downhole location to a surface location during drilling operation of a drilling rig is provided. The method includes obtaining a measurement from at least one downhole sensor. The method includes encoding data associated with the measurement from the at least one downhole sensor with a data encoder disposed in a wellbore, the data encoder encoding the data using a combinatorial frequency scheme. The method includes generating continuous equivalent duration output signals with a single modulator such that each of the continuous equivalent duration output signals includes a combination of periodical components from the combinatorial frequency scheme. The method includes receiving and recording at the surface location the continuous equivalent duration output signals generated by the single modulator. The method includes identifying digital signal frequency components of the continuous equivalent duration output signals with respective modulated characteristics using a data processing, demodulation and decoder module.

The combinatorial frequency scheme can include two or more different frequencies. In some embodiments, the two or more different frequencies can be orthogonal frequencies. The method includes determining a maximum frequency $F_{max}$ for the two or more different frequencies with the single modulator. The method can include determining a value of the maximum frequency $F_{max}$ with the single modulator based on one or more data transmission rate requirements of the drilling rig. In some embodiments, the single modulator can be a mud pulser, the mud pulser is a rotationally oscillated pulser, and the rotationally oscillated pulser includes a rotor and a stator. In such embodiments, the method can include determining a function of pressure wave amplitude from an angle of the rotor position.

In some embodiments, the function of pressure wave amplitude can be determined by flow loop measurements or by $$P(\varphi) = A(\varphi) - A_0 \approx \frac{\delta Q^2}{(\varphi_{max} - \varphi)^2} - \frac{\delta Q^2}{\varphi_{max}^2}.$$

In some embodiments, the method can include selecting a rotor oscillating range between a minimum angular position ($\varphi_{min}$) and a maximum angular position ($\varphi_{max}$) based on the function of pressure wave amplitude and the value of the maximum frequency $F_{max}$. An open area for mud flow can have a maximum value at the minimum angular position ($\varphi_{min}$) and the open area for mud flow can have a minimum value at the maximum angular position ($\varphi_{max}$). The method can include determining a rotor position $\varphi_n$. An angle associated with the rotor position $\varphi_n$ can be between the minimum angular position ($\varphi_{min}$) and the maximum angular position ($\varphi_{max}$), and an amplitude of a pressure wave ($A\varphi_n$) can be equal to ($A\varphi_{max}$-$A\varphi_{min}$)/2.

In some embodiments, the two or more different frequencies can be orthogonal frequencies, and an amount of the orthogonal frequencies in the combinatorial frequency scheme can be determined based on a value of the maximum frequency $F_{max}$ and on a selected equivalent duration of output combinatorial signals. The method can include adjusting the two or more frequencies of the combinatorial frequency scheme for attenuation during propagation of signals from a downhole to the surface location. An adjustment coefficient for each input frequency of the combinatorial frequency scheme can be calculated by $$C(f) = \frac{P(f_{min})}{P(f)} = \exp\left[-4\pi\left(\frac{D}{d}\right)^2\left(\frac{\mu}{K}\right)(f_{min} - f)\right].$$

where P(f) is a surface amplitude of harmonic with frequency f, P($f_{min}$) is the surface amplitude of harmonic with frequency $f_{min}$, $f_{min}$ is a lowest frequency in the combinatorial frequency scheme, D is a measured depth between a transducer at the surface location and the single modulator in a downhole, d is an inside diameter of a drill pipe, $\mu$ is a plastic viscosity of a drilling fluid, and K is a bulk modulus of a volume of the drilling fluid above the modulator.

The method can include downlinking data corresponding to a current measured depth for the single modulator to a downhole electronic controller. The current measured depth of the modulator in the downhole can be downlinked to the downhole electronic controller by a predefined incremental value. The method can include downlinking a next measured depth increment to the downhole electronic controller prior to reaching a predefined depth with the single modulator or when an actual depth of the well exceeds a corresponding predefined depth to use different attenuation coefficients. Amplitude correction attenuation coefficients can be applied identical to a measured depth interval between two consecutive downlinking commands, and the applied amplitude correction attenuation coefficients can be equal to the amplitude correction coefficients at a midpoint of the measured depth interval.

The method can include detecting narrow frequency noises during drilling operation. frequencies having strong noise levels above a predefined value can be excluded from the combinatorial frequency scheme. If a reduction of the amount of the frequencies of the combinatorial frequency scheme results in the data rate transmission below a predefined level, the method can include selecting a new combinatorial frequency scheme with more frequency components and/or modulation parameters than the current combinatorial frequency scheme and downlinking the new combinatorial frequency scheme to the downhole electronic controller. The method can include allocating some of the measured depth intervals to have no output signals for detecting the narrow frequency noises during the drilling operation and parameters of the narrow frequency noises. The method can include selecting a data transmission rate based on an amount of data transmission necessary to satisfy drilling requirements during operation of the drilling rig, and selecting the single modulator based on the amount of data transmission necessary to satisfy the drilling requirements.

In some embodiments, the method can include selecting a mud pulser for the single modulator for low frequency ranges of about 0.5 Hz to about 8 Hz of the two or more different frequencies. In some embodiments, the method can include selecting an electromagnetic generator for the single modulator for low frequency ranges of about 0.5 Hz to about 10 Hz of the two or more different frequencies. The combinatorial frequency scheme can include a set of N frequencies, and an amount of combinations for simultaneous transmissions of K different frequencies can be calculating by:

$$C_{n,k} = \frac{n!}{K!(n-k)!}$$

where n represents a total amount of the frequencies, and K is in a range $$1 \leq K \leq \frac{N}{2}$$

if N is an even value, and K is in a range $$1 \leq K \leq \frac{N+1}{2}$$

if N is an odd number, and wherein K is selected based on the one or more data transmission rate requirements of the drilling rig. The one or more data transmission rate requirements of the drilling rig can be calculated by: $C_{total,N,K}$= $C_{n,1}+C_{n,2}+ \ldots +C_{n,k}$ where K is changed from 1 to $$\frac{N}{2} \text{ or } \frac{(N+1)}{2}.$$

A cumulative curve of the one or more data transmission rates from K can be constructed and $K_j$ can be selected based on predetermined criteria. In some embodiments, an option to send simultaneously $K_j$+1 frequencies can be added to the combinatorial frequency scheme, such option providing an increase in the data transmission rate of less than 20%, and a maximum value of K is equal to K=$K_j$. In some embodiments, in order to increase the data transmission rate, an additional modulation in the form of at least one of phase or amplitude modulation can be added to each frequency of the combinatorial frequency scheme. The additional modulation of each frequency may include a combination of a phase shift key and an amplitude shift key.

In some embodiments, the combinatorial frequency scheme can be divided into groups of two or more frequencies, each group of the two or more frequencies is responsible for transmission of information independent from another group of the two or more frequencies, and the continuous equivalent duration output signals generated by the single modulator include one frequency combination from each group of the two or more frequencies. In some embodiments, the information transmitted by each group of the groups can be the same. In some embodiments, the information transmitted by each group of the groups can be different to avoid duplication.

If a presence of a significant level of noise is detected, the combinatorial frequency scheme is divided into two groups, each of the two groups having an equal number of frequency combinations, and each of the two groups simultaneously transmitting equal binary data sets. The method can include comparing the binary data sets from the two groups and (i) if the binary data sets are identical, determining that a probability value for correcting encoding is high, or (ii) if the binary data sets are different, an expected value is selected for encoding. The expected value can be calculated based on a prediction of a next sample value determined using at least one of the following methods: a naïve method, a moving average method, a weighted smoothing method, a simple linear regression method, a partial least squares regression method, a polynomial fit method, or the like.

A minimum equivalent duration can be selected such that at least two orthogonal frequencies are available to use in the combinatorial frequency scheme. An amount of different phase key shifts, amplitude key shifts, or a combination of the different phase key shifts and the amplitude key shifts can be selected to achieve the one or more data transmission requirements of the drilling rig. Downlinking commands can include two or more groups, and each group of the two or more groups can be related to one of a plurality of command categories, the command categories including commands to change current feed identification (FID), the combinatorial frequency scheme, attenuation compensation coefficients, or a measure depth counter.

In some embodiments, a group of the combinatorial frequency scheme can include subgroups allocated to avoid noise. One subgroup of the subgroups can be allocated to options of changing a value of an equivalent duration interval and another subgroup of the subgroups can be allocated to reducing frequencies of the combinatorial frequency scheme that coincide with frequencies of strong noise. The method can include eliminating noise frequencies below and above frequencies of the combinatorial frequency scheme with data processing means. The method can include transforming digital signals from a time domain to a frequency domain with the data processing means. The method can include calculating a power spectrum of equivalent duration segments with Fourier Transform (FT) or Fast Fourier Transform (FFT).

In accordance with embodiments of the present disclosure, an exemplary telemetry system for transmitting data from a measurement/logging system in a downhole location to a surface location is provided. The telemetry system includes a fluid supply line located at or near the surface location, the fluid supply line providing drilling fluid under pressure to a drill string. The telemetry system includes a bottom hole assembly of the drill string including at least one sensor. The telemetry system includes a single downhole modulator configured to transmit output signals to the surface location. The telemetry system includes one or more energy sources to power the at least one sensor and downhole electronics. The telemetry system includes a data encoder and signal processing electronics configured to produce a control signal using a combinatorial frequency scheme. The telemetry system includes receiving equipment at the surface location to receive and record the output signals from the single downhole modulator. The telemetry system includes a processing device configured to process, modulate, decode and display data associated with the output signals.

The data encoder and signal processing electronics can be configured to produce the control signal using the combinatorial frequency scheme by generating continuous equivalent duration output signals with the single downhole modulator such that each of the continuous equivalent duration output signals includes a combination of periodical components from the combinatorial frequency scheme. In some embodiments, the single downhole modulator can be a mud pulser capable of operating at a maximum frequency $F_{max}$. The mud pulser can be an oscillating rotating pulser including a rotor with two to eight rotor blades and including a stator with a corresponding number of stator opening. A distance between the rotor and the stator can be adjustable based on an expected average flow rate of the drilling fluid.

The single downhole modulator can include a motor coupled to a valve of the rotor and configured to utilize a variable-feedback controller to keep rotor positions in a predefined angle range. The telemetry system can include a motor controller configured to receive control signals from a downhole controller to generate an output pressure wave which is unique to a particular combination of frequencies from the combinatorial frequency scheme. The modulator can be configured to be driven by a motor controller, and the motor controller can be configured to closely match a rotor position to each extremum of the output signals.

In some embodiments, the motor controller can provide regulation of the rotor position based on calculations of a rotor velocity for each discreet time step. In some embodiments, a motor control can be based on calculation of a time difference between adjacent extremums of the output signals. In some embodiments, the motor controller can be configured to take into account a presence of pitch play in a reduction gear, and an increase of the maximum frequency $F_{max}$ for the modulator can be achieved by selection of a gear reduction component with a reduced gear ratio.

The telemetry system can include a downhole controller including a memory set with a capacity to include numerous combinatorial frequency schemes. At least one of the numerous combinatorial frequency schemes can include one or more subschemes configured for elimination of frequencies of the at least one of the numerous combinatorial frequency schemes which coincide with one or more noise frequencies. The telemetry system can include a downhole controller including a microcontroller and firmware software configured to obtain data from downhole tools and probes, convert analog signals to a digital form, organize data into words according to a current FID, select an appropriate combination from the combinatorial frequency scheme, perform bend filtering, generate control signals of the output signals, and send the control signals to a controller of a motor driver of the single downhole modulator. The processing device can be configured to perform at least one of bandpass filtering, calculation of a ratio signal to noise, or removal of narrow band noises including a pump noise.

In accordance with embodiments of the present disclosure, an exemplary electromagnetic telemetry system for generating electromagnetic signals is provided. The electromagnetic telemetry system includes a single downhole modulator configured to transmit data via electromagnetic telemetry. The electromagnetic telemetry system includes at least one downhole sensor. The electromagnetic telemetry system includes a downhole processing device configured to encode data using a combinatorial frequency scheme to generate output signals. The electromagnetic telemetry system includes one or more energy sources to power the single downhole modulator, the at least one downhole sensor, and the at least one downhole processing device. The electromagnetic telemetry system includes a receiver system at a surface location. The electromagnetic telemetry system includes a surface processing device configured to identify periodical components of the output signals and modulate characteristics of the output signals.

In some embodiments, the single downhole modulator can be a dipole with an insulator gap. A strength of the output signals can be aligned with impedance of a surrounding earth formation around a well of a drilling rig. The impedance of the drilling fluid can be calculated based on measurement of a current level in a control line by using a constant value for a voltage for transmission of control signal, and the constant value of the voltage in the control line can be 5-10 less than a nominal value of the voltage of a supply from the one or more energy sources. The control signals can be a harmonic with frequency equal to $(F_{max}-F_{min})/2$, where $F_{max}$ is a value of a maximum frequency in the combinatorial frequency scheme and $F_{min}$ is a value of a minimum frequency in the combinatorial frequency scheme, and the control signals can occupy 0.1-10% of a total transmission time depending on earth strata heterogeneity. A strength of the output signals can be adjusted to a level of a recorded signal at the surface location. If the strength of the recorded signal at the surface location is above a predetermined level, downlinking can be applied in order to decrease the strength of generated output signals.

BRIEF DESCRIPTION OF THE DRAWINGS

To assist those of skill in the art in making and using the disclosed system for downhole signal transmission with combinatorial frequencies, reference is made to the accompanying figures, wherein:

FIG. 4 is a table of a maximum possible frequency for an exemplary system for downhole signal transmission with combinatorial frequencies according to the present disclosure based on angle ranges and rotor speed.

FIG. 5 is a table of a gear ratio, frequency and maximum frequency for a standard and advanced rotary oscillating pulser for an exemplary system for downhole signal transmission with combinatorial frequencies according to the present disclosure.

FIG. 21 is a table of bit rates for 4 PSK, 5 PSK and 6 PSK techniques for time of 0.5 seconds.

FIG. 22 is a table of bit rates for 4 PSK, 5 PSK and 6 PSK techniques for time of 1 second.

FIG. 23 is a table of combinations for three available orthogonal frequencies for a pulser.

FIG. 31 is a table of combinatorial code using duplication of data for two groups of frequencies transferring the same information.

DESCRIPTION OF EXEMPLARY EMBODIMENTS

Figure 1:
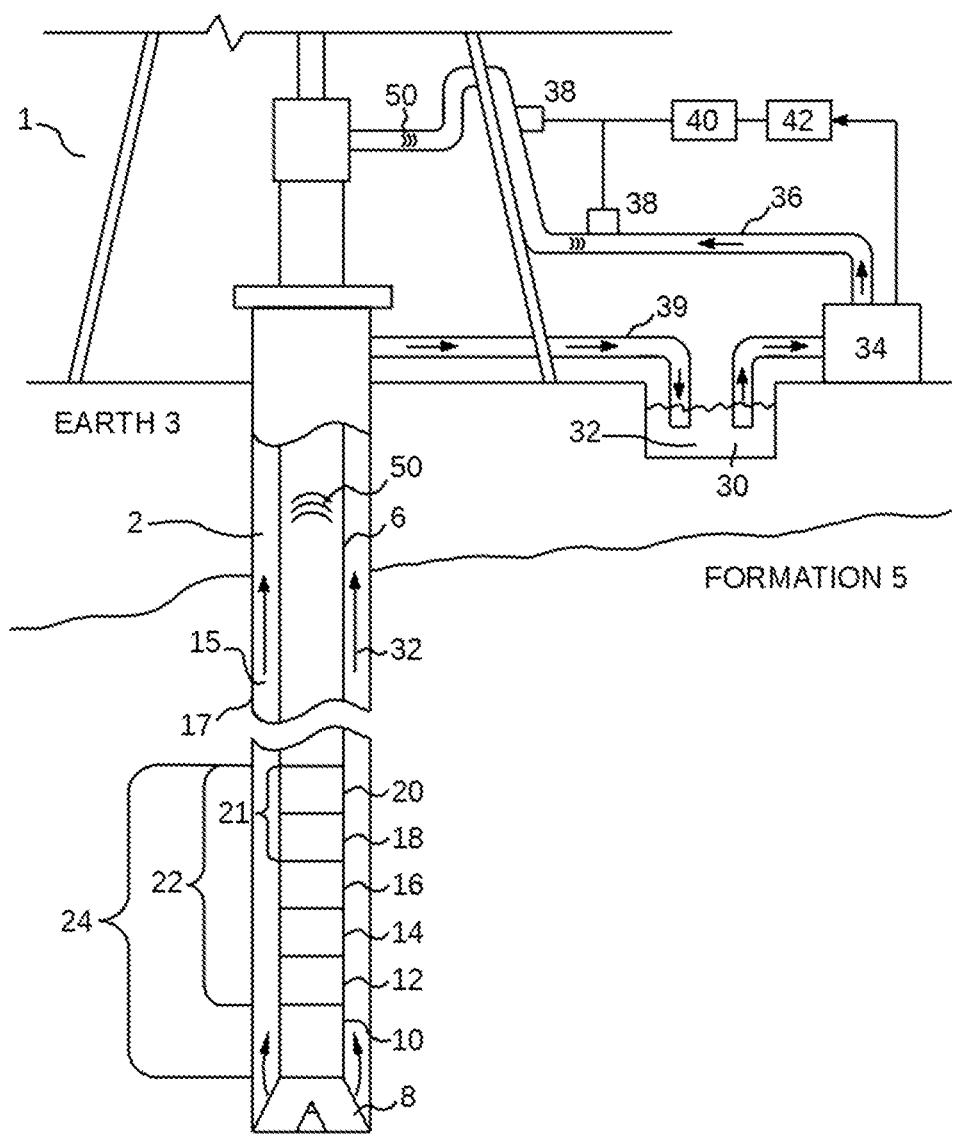
FIG. 1 is a diagrammatic view of a drilling rig with an exemplary system for downhole signal transmission with combinatorial frequencies according to the present disclosure.

FIG. 1 is a diagrammatic view of a drilling rig 1 for implementation of an exemplary system for downhole signal transmission with combinatorial frequencies. The drilling rig 1 can be engaged in drilling operation with simultaneous LWD acquisitions that can be used for the combinatorial frequencies for downhole signal transmission discussed herein. As discussed herein with respect to operation of the exemplary signal transmission system, LWD operation can include both LWD and measurement while drilling (MWD) operation, as well as additional measurements. During operation, a well borehole 2 is drilled into the ground 3 through formation 5 by using the rotary drilling rig 1. Drilling operations generally include the circulation of drilling fluid 32 (e.g., drilling mud) by a pump 34 through a mud line 36, into and through a drill string 6 down to the drill bit 8, and back to the surface through the annulus 15 between the drill string 6 and the borehole wall 17. The drilling fluid 32 exits the wellbore 2 via a return conduit 39, which routes the drilling fluid 32 back to mud pits 30.

The bottom hole assembly (BHA) 22 at or near the distal end of the drill string 6 can include one or more sensor modules 12. In some embodiments, sensor modules 12 of the BHA 22 can include directional sensors, formation evaluation sensors, combinations thereof, or the like. The BHA 22 can include one or more sources of energy 14 (e.g., batteries or/and generators), and down hole electronics (including controller 16), in communication with the sensor modules 12. The BHA 22 can include a pulser assembly 21. The pulser assembly 21 can include a modulator 20 (e.g., a single modulator 20), and motor control and electronic power boards 18. During operation, the pressure fluctuations 50 propagate to the surface through the mudflow in the drill string 6 and are detected at the surface by a transducer(s) 38 which is connected to the flow line 36. The analog/digital modulator 40 supplies/transmits a digital form of the pressure signals to a processing device 42 (e.g., a computer or some other type of a data processing device). Processing device 42 operates in accordance with software to process and decode the signals received from the analog/digital modulator 40. The resulting LWD data can be further analyzed and processed to generate a display of various useful information. For example, the system can include a graphical user interface capable of displaying data acquired and/or processed by the system during the drilling operation.

The present invention can use either mud pulse telemetry or electromagnetic telemetry to transmit data signals including one or a sum of a few modulated frequencies. In some embodiments, the exemplary system can use a single modulator to transmit data signals including different frequency bands by using a combinatorial scheme. Details regarding the types of modulators capable of being used with the exemplary system are described below. The BHA 222 can be in the form of an LWD system, and can include a mud pulser 21, which has a stator, and a rotor rotationally disposed adjacent to the stator. In some embodiments, the pulser 21 can provide a restriction of mudflow by moving the rotor in a plane perpendicular to the wellbore axis.

U.S. Pat. No. 10,113,420, the entire contents of which are incorporated herein by reference, discusses rotary pulsers including a regulator mechanism and pump disposed within a housing. Based on a parameter or condition associated with the rotary pulser, the regulator mechanism is able to automatically adjust a parameter of the pump to control rotation of the rotor. Adjusting the parameter of the pump to control rotation of the rotor can change parameters of the pressure signals according to the predetermined pressure wave's characteristics. The rotary pulsers described in U.S. Pat. No. 10,113,420 can be used in the exemplary system discussed herein.

In some embodiments, the BHA 22 can include a different type of mud pulser 21, such as the mud pulsers described in U.S. Pat. No. 6,714,138, is the entire contents of which are incorporated herein by reference. The rotor blades of the mud pulser 21 can be about the same, slightly less, or slightly greater in size than that of stator openings. The pulser 21 can produce single pulses, which are separated in time. Although each pulse can have a different shape, in practice, the pulser 21 is capable of increasing the data rate by reducing the pulse length. The minimum length of the pulse can be equal to a sum of the time needed to open and close the stator openings. A reduction of this time can be achieved by using, for example, a rotor with eight blades instead of four blades, resulting in decreasing times of opening/closing to about 150-200 ms (for an eight blade rotor) from about 350-400 ms (for a four blade rotor). The practical limit of data transmission of the various oscillating pulsers is generally considered to be about 2-2.5 bit/s. The exemplary system allows for a significant increase in the data transmission rate by using traditional pulsers in a combinatorial manner.

Figure 2A:
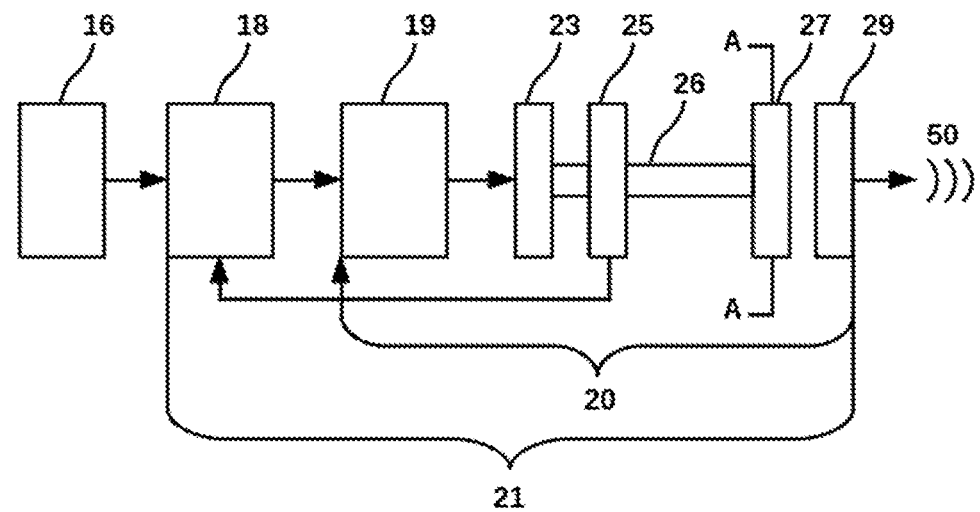
FIG. 2A is a diagrammatic view of a modulator of a pulser assembly.
Figure 2B:
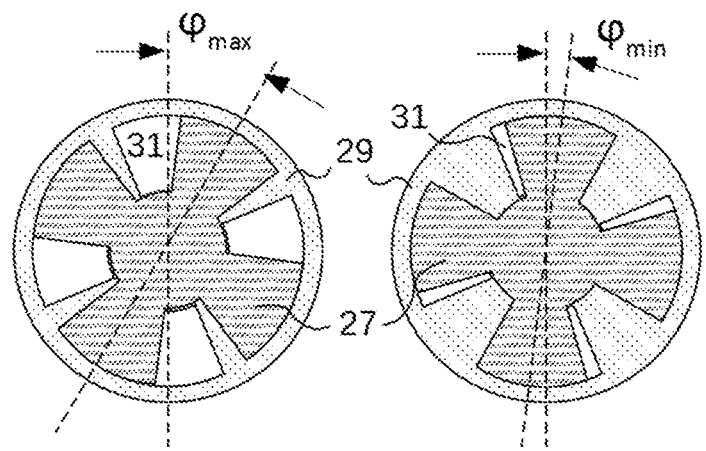
FIG. 2B is a diagrammatic view of a rotor and stator assembly for use with an exemplary system for downhole signal transmission with combinatorial frequencies according to the present disclosure.

FIG. 2A is a diagrammatic view of a pulser assembly 21 including an exemplary modulator 20, and FIG. 2B is a diagrammatic view of a rotor 27 and stator 29 assembly of the pulser assembly 21. The pulser assembly 21 includes the modulator 20 and motor controller 18. The encoder 16 transforms the data output from the sensors 12 into a digital code and transmits control signals to the motor driver controller 18. Based on the digital code, the controller 18 directs control signals to the motor driver 19. The modulator 20 includes an orientation encoder 23. The orientation encode 23 can include a magnet 25 coupled to the motor shaft 26 that rotates within a stationary housing. One or more Hall effect sensors can be used to detect rotation of the magnetic poles.

The motor controller 18 can use the detected absolute position of the shaft 26 and the position of the rotor 27 with respect to the stator 29 to control the motor by taking into account a gear ratio of the reduction gear box 23. Any suitable motor control techniques may be used in conjunction with the exemplary method of data transmission including, for example, U.S. Pat. Nos. 6,327,524 and 7,129,673, the entire contents of which are incorporated herein by reference.

FIG. 2B shows a cross-sectional view and configuration of the rotor 27 and stator 29 alone plane A-A of FIG. 2A. As is shown in FIG. 2B, the rotor 27 includes four blades and the stator 29 includes four corresponding openings. The rotor 27 can include a different number of blades (e.g., two to eight) and/or a variety of shapes. Similarly, the number of openings in the stator 29 can vary from two to eight to correspond with the number of blades of the rotor 27.

The modulator 20 can be operated within a range of rotor 27 rotations or radial positions starting from $\varphi_{start}$ to $\varphi_{end}$. The maximum range of the rotor 27 position during oscillation can be calculated as $\varphi_{end}-\varphi_{start}$. The rotor 27 can be positioned at a minimum radial position or rotation of $\varphi_{min}$ with the smallest section of the opening in the stator 29 exposed, and a maximum radial position or rotation of $\varphi_{max}$ with the largest section of the opening in the stator 29 exposed. The restriction of the oscillation range 31 allows generation of a pressure wave of higher a frequency as compared to using the full range, and can provide the additional benefit of reducing energy consumption and decreasing wear and tear.

Figure 3:
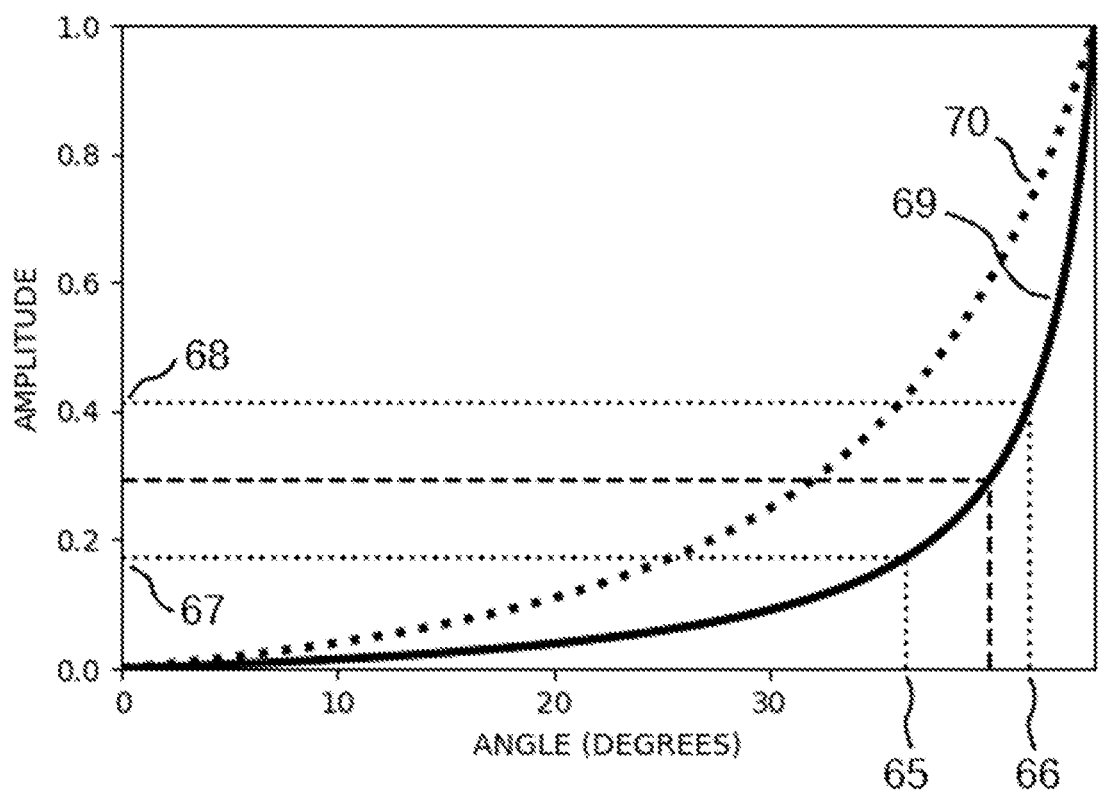
FIG. 3 shows an amplitude of a pressure wave depending on a rotor angle for an exemplary system for downhole signal transmission with combinatorial frequencies according to the present disclosure.

FIG. 3 shows an amplitude of the pressure wave depending on the rotor 27 angle based on experimental measurements and calculated using Equation 1 below. In particular, line 69 shows the results of the experimental measurements and line 70 shows the results calculated using Equation 1. The amplitude range of the pressure waves $P_{min}$ (value 67) and $P_{max}$ (value 68) must be selected to determine the amplitude range of the signal $P_{max}-P_{min}$ generated by the modulator 20. The corresponding rotation angle varies in a range from $A_{min}$ (value 65) to $A_{max}$ (value 66). The maximum value of the $\Delta A=A_{pmax}-A_{pmin}$ is achieved with a range of rotor 27 rotation angles corresponding to the complete opening of the stator 29 holes (a=0°) and complete closing (a=45°) for the case of a standard modulator 20 with four stator 29 holes. The neutral position (value 63) corresponds to the amplitude $P_0=(P_{max}-P_{min})/2$.

Based on expected mudflow Q in the drilling well and the density of the mud ρ, the function P(φ) can be calculated by using Equation 1 from discussed in U.S. Pat. No. 4,847,815:

$$P(\varphi) = A(\varphi) - A_0 \approx \frac{\delta Q^2}{(\varphi_{max} - \varphi)^2} - \frac{\delta Q^2}{\varphi_{max}^2} \qquad (1)$$

where A represents the rotation angle, Q represents the mudflow, φ represents the radial position of the rotor 27, and P represents the amplitude. The difference between experimental measurements at line 69 and the calculated curve at line 70 affects the amplitude of the output signals, without significantly affecting the range of amplitudes $\Delta P=P_{max}-P_{min}$.

For a typical mud pulser with four blades (such as the pulser of U.S. Pat. No. 6,714,138), a range of closing/opening positions can be about 45°. It can take about 650 ms to completely close the stator 29 openings and then return the rotor 27 to a fully open position. Such oscillations correspond to a frequency of about 1.54 Hz. The efficiency of the combinatorial generation of the sum signal process of the exemplary system involves a composition of one or more frequencies, each of which can be phase or amplitude modulated, increasing as the frequencies $F_{max}$ increase. In particular, the exemplary system uses a combinatorial frequency scheme that includes multiple different frequencies (as compared to only a single frequency in traditional systems). By implementing the exemplary combinatorial frequency system, the range of the starting and ending positions of the rotor 27 oscillation can be reduced or shortened to by 3-9 times (e.g., down to about 15° or even about 6°, between 6-15°, between 10-15°, or the like).

The maximum instantaneous rotary speed can be defined as a maximum rotary speed of the motor (e.g., about 5000 rpm). A corresponding instantaneous frequency can reach about 20 Hz. However, the real frequency value can be less due to various effects, such as acceleration and slowdown of the rotor 27. Thus, $F_{max}$ is a maximum possible frequency that could be achieved using the angle range of a rotor 27 ($\varphi_{min}$, $\varphi_{max}$), the acceleration and slowdown of the rotor 27, and/or the lost motion of the rotor 27 (due to possible pitch play). The table of FIG. 4 provides estimations of the maximum frequency $F_{max}$ for a standard pulser having a 5,000 rpm electrical motor, different φ ranges, acceleration times (40 and 50 ms), and two typical gear ratios (1:130, 1:65). As used herein, the term "acceleration time" refers to the time from the start of rotational movements of the rotor 27 to the time when the speed of the rotor 27 achieves the maximum value. Based on the estimation of FIG. 4, the maximum frequency $F_{max}$ for a standard pulser can be in the range of about 4 Hz to about 9 Hz, depending on the angle range, gear ratio, and/or value of the pitch play. U.S. Pat. No. 10,113,420 discusses rotary pulsers that are able to achieve a maximum frequency $F_{max}$ of up to 16-20 Hz.

The table of FIG. 5 shows that a standard rotary oscillating pulser is generally able to achieve a maximum frequency $F_{max}$ of about 4 Hz with the most popular reductor having a gear ratio of 1:130. If using a gear ratio of 1:65, it is possible to reach a maximum frequency $F_{max}$ of up to about 6-8 Hz. For advanced, special designed oscillating pulsers, the maximum frequency $F_{max}$ can reliably be about 16 Hz and above.

In use, an appropriate data transmission rate can initially be determined. In some embodiments, the appropriate data transmission rate (DTR) can be selected based on the amount of information that needs to be sent from the downhole to the surface from each point of measurement (e.g., based on a combination of sensors and/or sounds, including to sensors and/or sounds associated with the bottom hole assembly, and how many measurements each sensor performs. As an example, wave propagation resistivity tools can measure eight different parameters using two different frequencies, and two distances between the electromagnetic source and the antennas. For each of the four combinations, measuring includes phase and amplitude, totaling eight different curves. As a further example, one tool may have the capability to measure azimuthal parameters, such as natural gamma ray or azimuthal distribution of the density of rock. The amount of azimuthal sectors can vary from eight to sixteen. In some embodiments, providing detailed electrical micro images of rocks can include information relating to the drilling process, such as the bit weight, measurements of the well diameter, information about pressure, vibration, or the like.

In some embodiments, a geologist and/or expert in the industry (e.g., in the drilling company), can determine the appropriate density of observation. The density of observation can have an effect on the data transmission rate selected. In some embodiments, the density of observation can be 3 points per meter. Selection of the correct data transmission rate can also involve estimating the maximum drilling speed. As an example, if the maximum drilling speed is about 30 meters/hr, the density of measurements can be about 3 points per meter. The amount of measured parameters at each point can be about 30. On average, each parameter can consume about 10 bits. For one meter drilled by about 2 minutes to transmit data from 1 point, 40 seconds may be available. In such instance, the data transmission rate can be determined by 30*10/40=7.5 bit/sec. If $V_{max}$=60 m/hr, the data transmission rate would be 15 bit/sec. In some embodiments, the density of observation can be about one point per foot or three points per meter.

Next, a geologist and/or expert in the industry can determine a combination of sensors/sounds that sufficiently and accurately provide information about the geological formation to address key geological and production issues. It should be understood that any of the sensors discussed herein can be used to determine the geological formation. In some embodiments, if a combination of different measurements is complex, the system can include azimuthal measurements. In some embodiments, if the drilling speed is fast, the system can necessitate the use of high speed telemetry, including the option to take into consideration noise and attenuation. Depending on the requirements of the system, a low frequency modulator or a high frequency modulator can be selected. In general, a low frequency modulator (up to about 8 Hz) is widely available in the industry and, used in combination with the exemplary system, can be used to produce data transmission rates for a majority of LWD applications. A modulator with an $F_{max}$=4 Hz (e.g., a standard industry modulator produced by APS Technology) has a gear ratio of 1:130 and is capable of achieving a data transmission rate of about 9.17 bits/sec for 4-PSK and about 11.17 bits/sec for 6-PSK (see, e.g., FIG. 17) by transmitting one or two harmonics. By transmitting the same amount of harmonics, an advanced or high frequency modulator with an $F_{max}$=16 Hz can achieve a data transmission rate of about 17.81 bits/sec for 4-PSK and about 20.09 bits/sec for 6-PSK (see, e.g., last line of FIG. 17). The maximum frequency $F_{max}$ can further be selected for the selected practical modulator. $F_{max}$ can be selected based on the data transmission rate requirements. In general, $F_{max}$ can depend on the particular modulator being used, its gear ratio, the maximum motor speed, the selected range of angles for the rotor movements, combinations thereof, or the like. As an example, $F_{max}$=4 Hz is achievable for a standard mud pulser with a gear ratio of 1:130. If the gear ratio is changed to 1:65, $F_{max}$ would increase. In some embodiments, as discussed herein, $F_{max}$ can be determined and selected based on field experimentation and/or conditions.

In some embodiments, the exemplary system can be used to determine a practical limit of the maximum frequency $F_{max}$ for a standard pulser (e.g., having a gear ratio of 1:130). The system can be configured to transmit data with frequencies of 2, 3, and 4 Hz and four phases (quadrature phase shift keying (QPSK)). For time T=1 sec and carrier K=1, there are 12 available combinations. For carriers K=2 and K=3, there are 48 and 64 available combinations, respectively. Utilization of all three carriers results in 124 total combinations (12+48+16=124) and the data transmission rate will be about 7 bit/s. The system can be programmed to use this transmission process and rate every other interval of T, thereby occupying only about 50% of the transmission time. The remaining intervals of T can be available for the second experimental scheme with higher frequencies of 5, 6, and 8 Hz. The analysis of the decoded data from the second scheme allows for the determination of a practical value of the maximum frequency $F_{max}$ for those particular conditions.

Figure 6A:
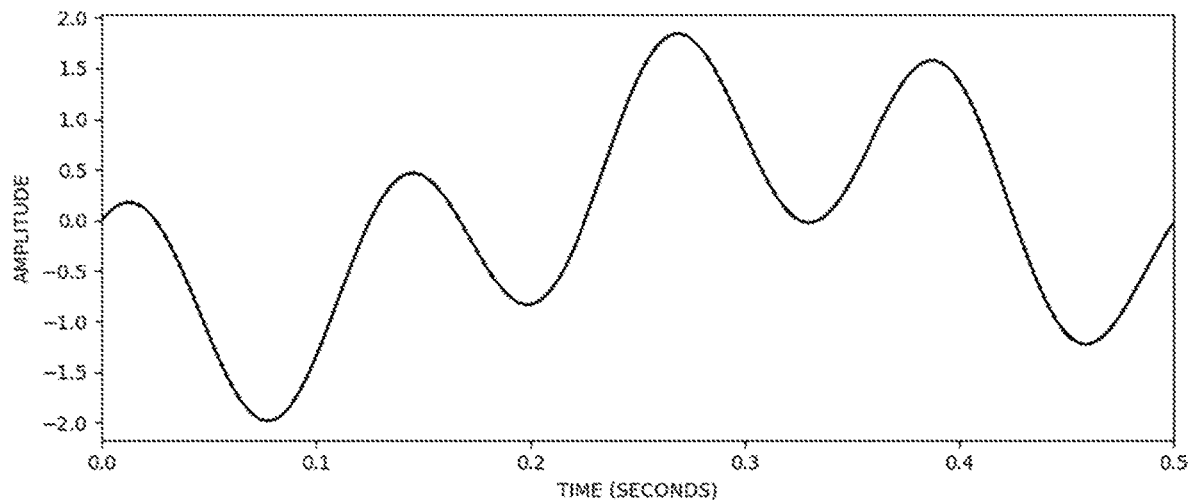
FIG. 6A shows an output signal for an interval of T=0.5 sec with a sum of two frequencies (2 and 8 Hz)
Figure 6B:
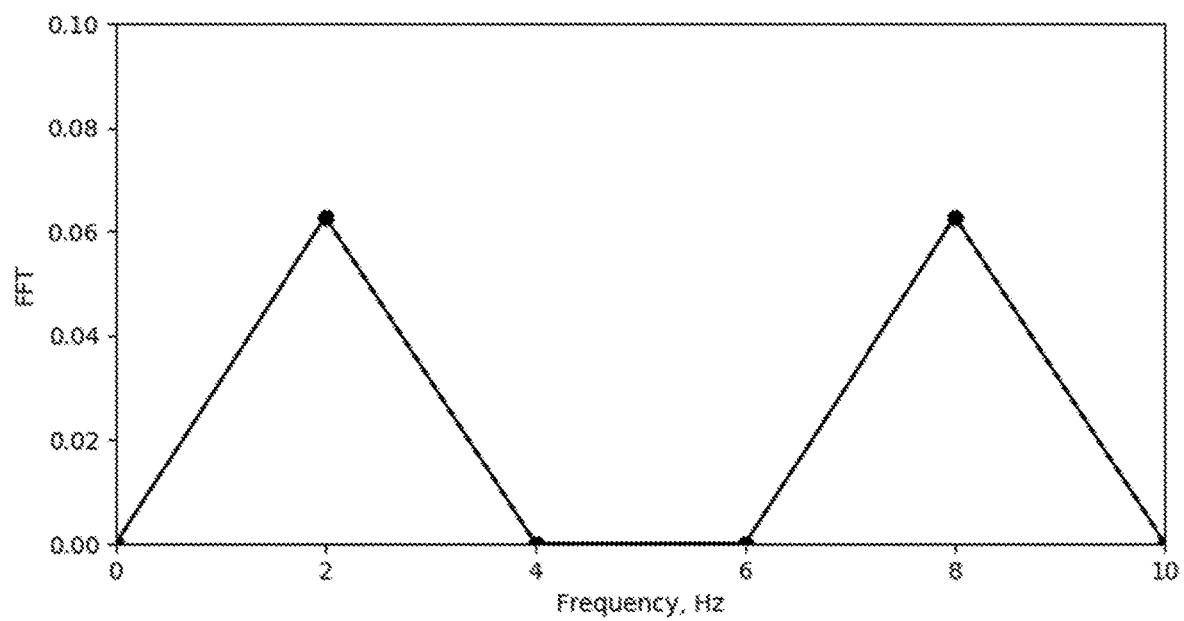
FIG. 6B shows an output signal after application of a Fourier transformation.
Figure 6C:
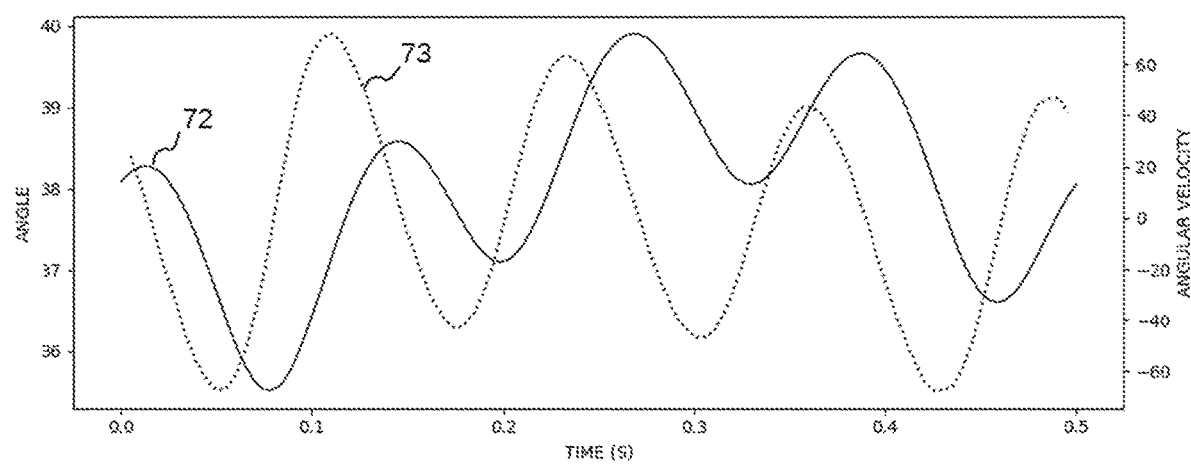
FIG. 6C shows a rotor rotation angle and angular velocity.

For a maximum frequency of $F_{max}$=8 Hz, the mud pulser can be capable of transmitting an output complex signal which includes a sum of different frequencies, each of the individual frequencies being equal to or less than 8 Hz. FIG. 6A shows the output signal on the interval T=0.5 sec, which comprises a sum of two frequencies of 2 Hz and 8 Hz. FIG. 6B shows that after applying a Fourier transformation to the output signal of FIG. 6A, the two frequency components are correctly identified on the amplitude power spectrum. FIG. 6C shows graphs of the rotor rotation angle (line 72) and the angular velocity (line 73) for the output signals. The angular velocity does not exceed the value of 80 degrees/second, which is less than about $\omega_{max}$≈150°/sec for a traditional mud pulser with four holes.

Figure 7A:
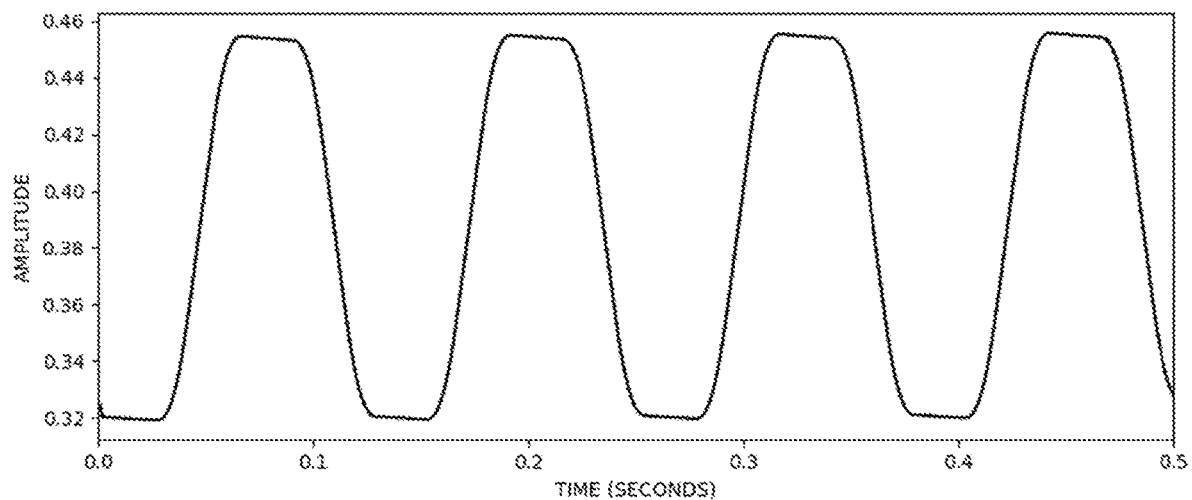
FIG. 7A shows a periodical signal generated by a modulator with 25 ms of lost motion for a frequency of 8 Hz.
Figure 7B:
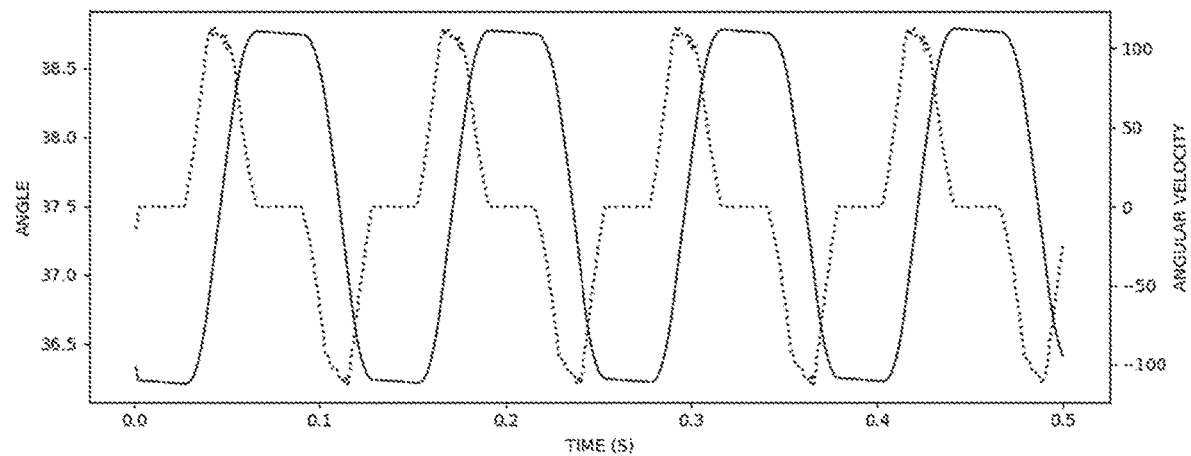
FIG. 7B shows corresponding changes of a rotor angle and rotary speed.
Figure 7C:
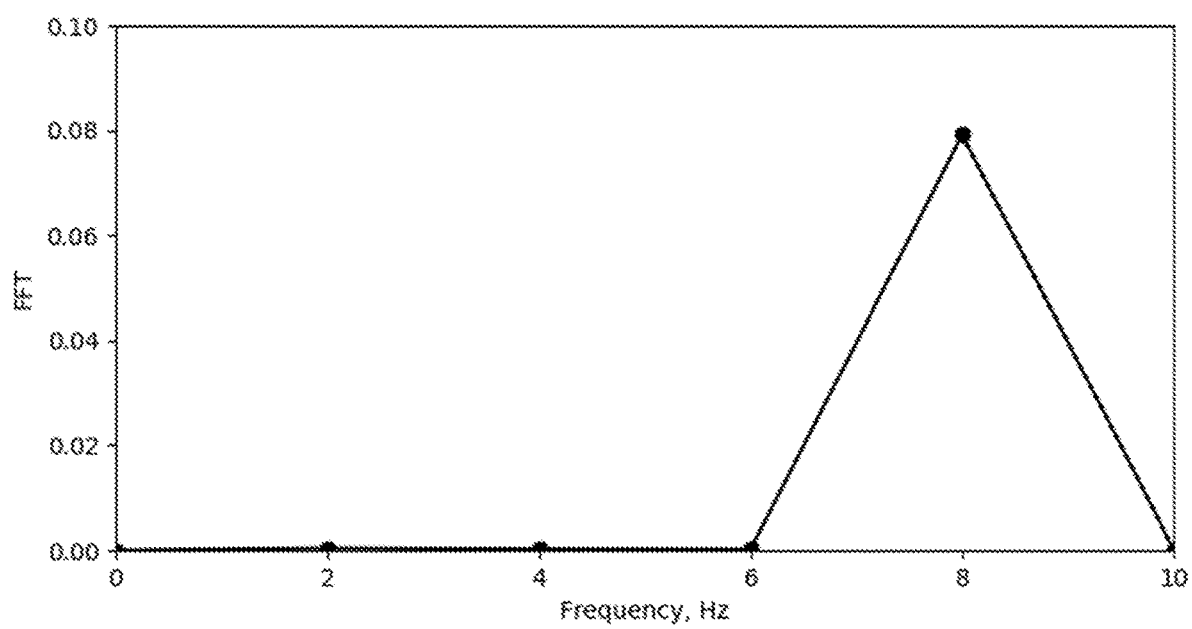
FIG. 7C shows a presence of an 8 Hz component in an output signal.

The pulser may have a lag between the motion of a motor and the motion of a rotor due to pitch play of the gear box. Such lag is generally referred to as lost motion. A gear box with a ratio of 1:130 can cause about 20-30 ms of lost motion in the beginning of rotation and every time when a motor changes the direction of rotation. Such lost motion effect can have the most influence on the frequencies closer to the maximum frequency $F_{max}$. FIG. 7A illustrates the periodical signal with an 8 Hz frequency generated by a modulator with about 25 ms of lost motion. The extremums or maximum values are truncated but are still at the correct positions. Corresponding changes of the rotor angle and rotary speed are shown in FIG. 7B. The rotary speed does not exceed $\omega_{max}$, and the FFT spectrum in FIG. 7C shows the presence of the 8 Hz frequency component in the output signal.

Figure 8A:
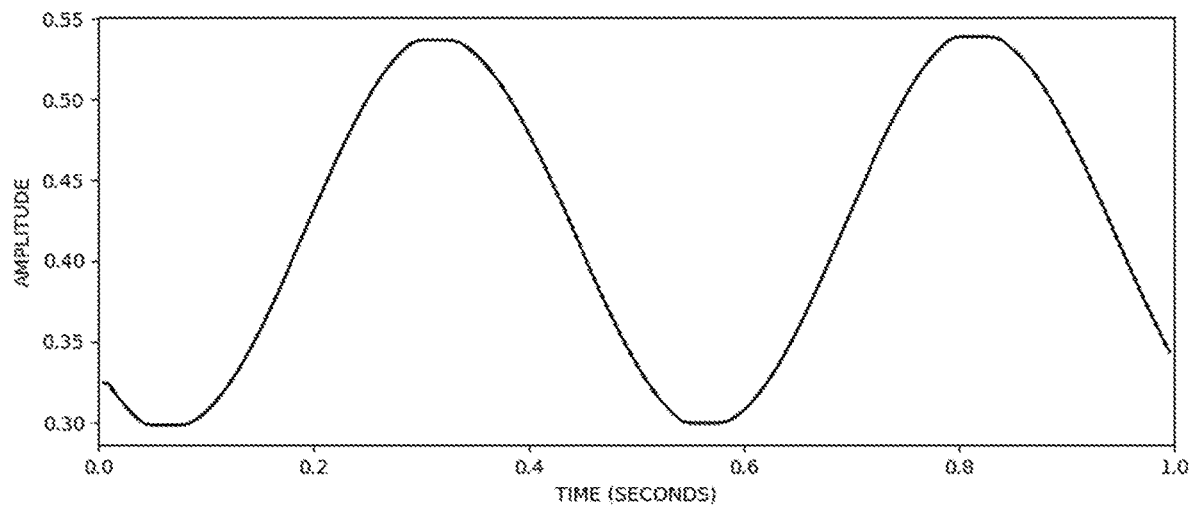
FIGS. 8A-8C show amplitude, angle and frequencies for a signals with a 2 Hz frequency maximum without a significant effect from lost motion.
Figure 8B:
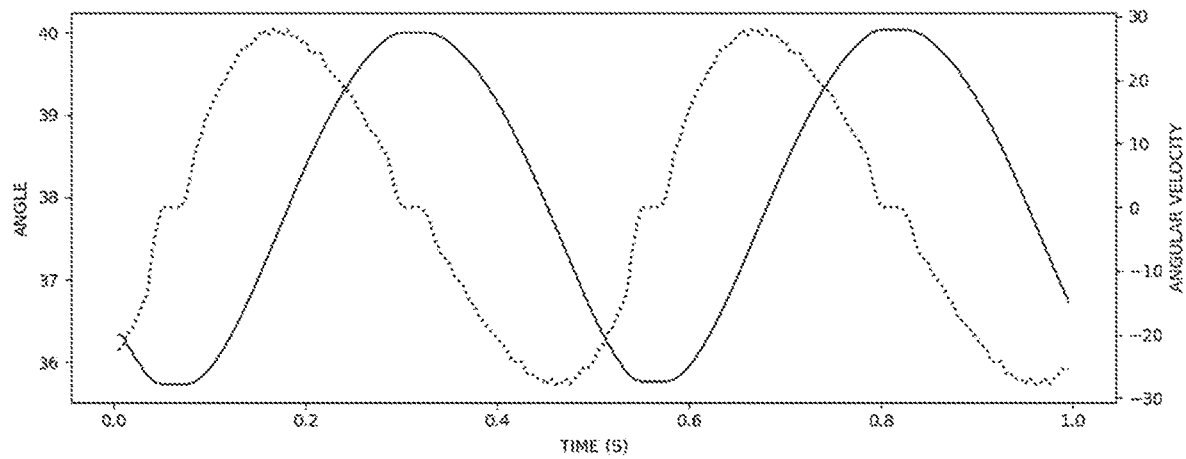
Figure 8C:
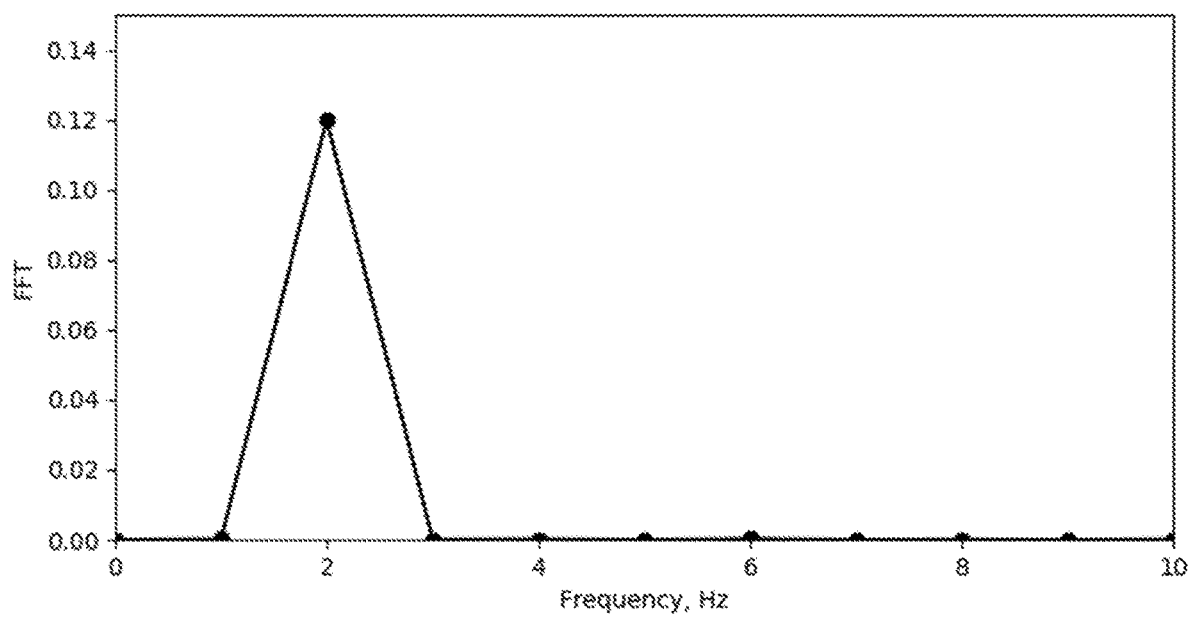
Figure 9A:
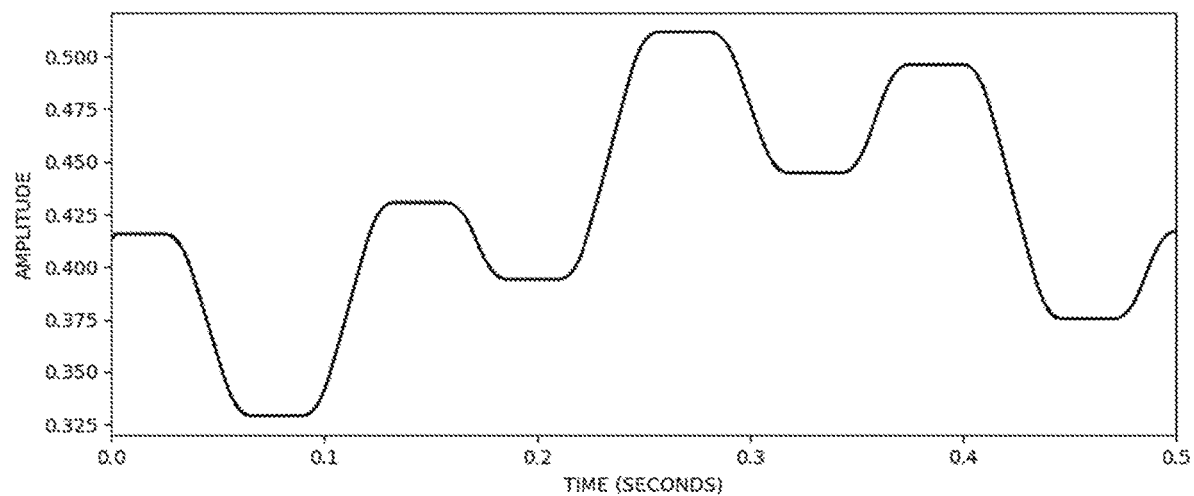
FIGS. 9A-9D show an effect of lost motion on a complex composite signal of a sum of 2 Hz and 8 Hz frequencies with respective phases of $5\pi/4$ and $\pi/4$.
Figure 9B:
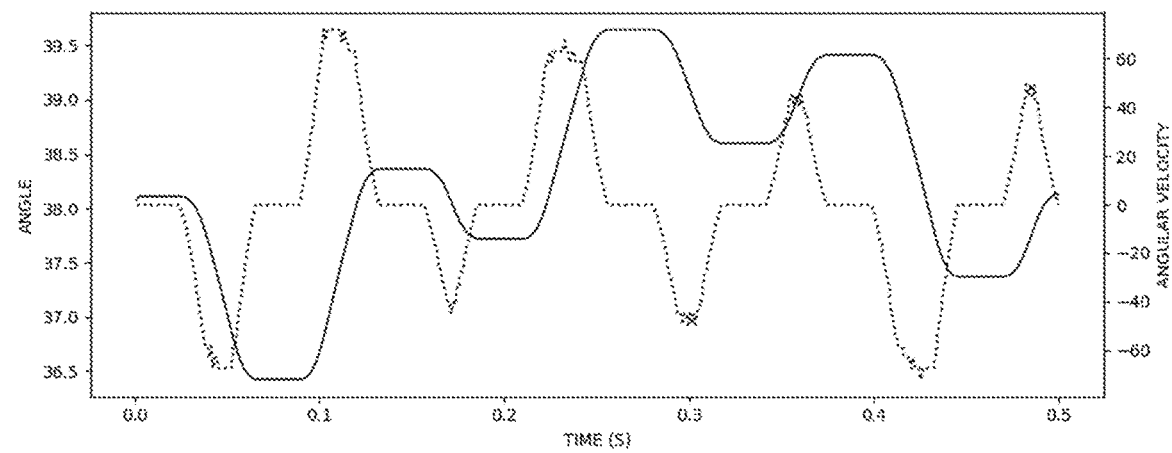
Figure 9C:
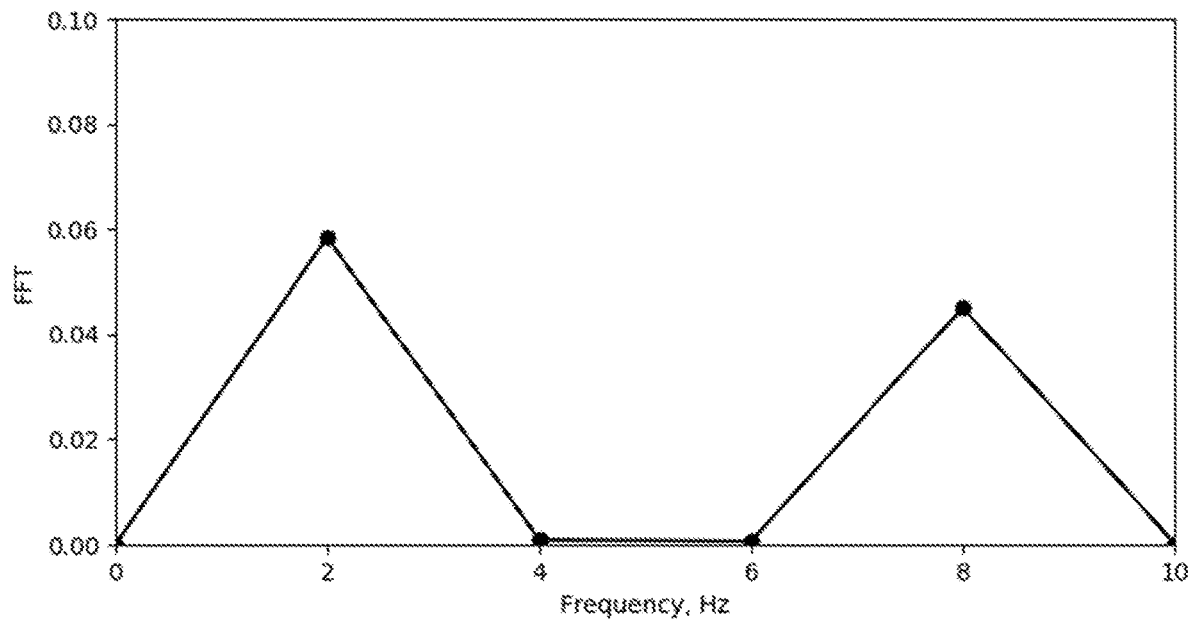
Figure 9D:
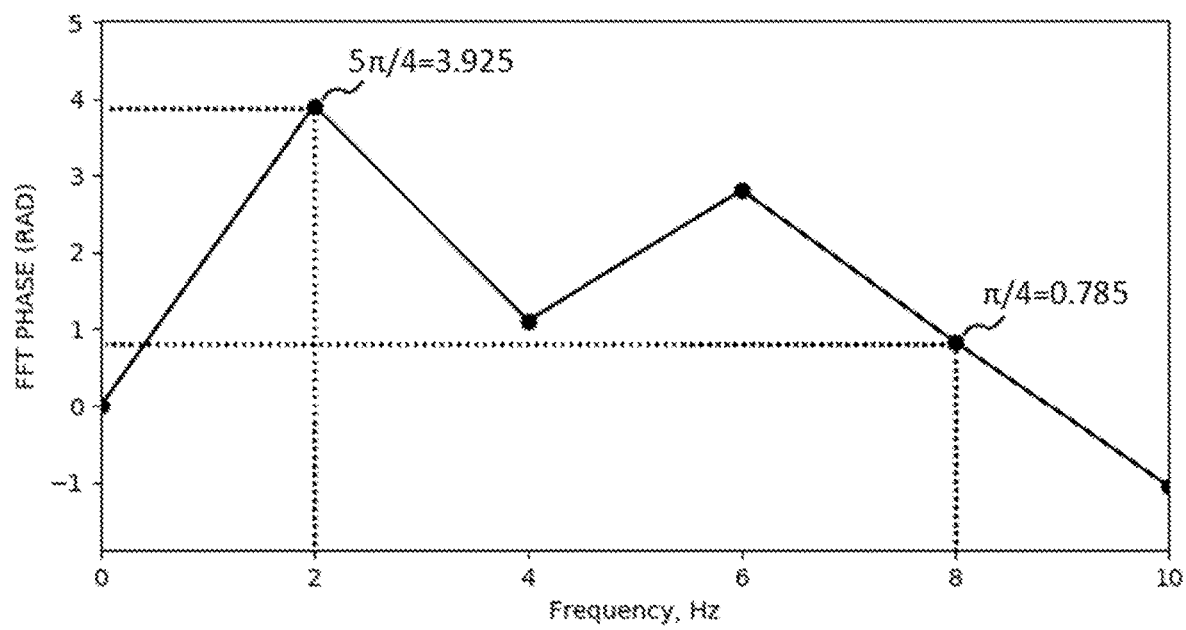

FIGS. 8A-8C show that for a signal with a 2 Hz frequency, the extremums or maximum values for the amplitude, angle and FFT are almost not affected by the effect of lost motion. FIGS. 9A-9D illustrate the effect of lost motion for amplitude, angle and FFT on a more complex composite signal which is a sum of 2 Hz and 8 Hz frequencies with phases 5π/4 and π/4, respectively. The presence of 2 Hz and 8 Hz frequencies is clearly illustrated on the amplitude power spectrum (FIG. 9C). The value of phase modulations is also illustrated after applying FFT (FIG. 9D).

In some embodiments, the combinatorial system can use harmonics in the range of about 0.25-8 Hz for a traditional mud pulser (such as the mud pulser of U.S. Pat. No. 6,714,138). The exemplary combinatorial system can transmit a complex pressure wave signal which can include a combination of different frequencies (including a possibility to transmit a single frequency). Each frequency can optionally include phase modulation, amplitude modulation, combinations thereof, or the like. Each complex pressure signal can have the same (or substantially the same) time duration, e.g., about 0.5 or 1.0 seconds. If the discreet Fast Fourier Transformation (DFFT) is used, the time duration of the output combined signal can be about 0.512 seconds and 1.024 seconds, respectfully.

In some embodiments, all frequencies of the combinatorial process can be orthogonal to each other. In such embodiments, the period $T_f$, ratio $T/T_f$ equals the integer value for each frequency The orthogonal relationship allows for demodulator implementation to use the DFFT algorithm on the receiver side for demodulation of the output signals. The amount of the frequency components available to construct a complex output signals can depend on a time base T and a maximum frequency $F_{max}$ for a particular modulator.

The data transmission rates of the exemplary combinatorial system can depend on one or more of the following factors. In some instances, the data transmission rates can depend on the capability of the modulator to generate periodically harmonic waves in the range from low frequencies up to a maximum frequency $F_{max}$. In some instances, the data transmission rates can depend on selection of a particular realization of the combinatorial process. In some instances, the data transmission rates can depend on the properties of the transmission channels. In some instances, the data transmission rates can depend on signal processing techniques and the process of complex signals demodulation and decomposition. In some instances, the data transmission rate can depend on the amount of orthogonal frequencies available for the combinatorial process with a given maximum frequency $F_{max}$ and value of T (i.e., the time allocated for generation of each pressure wave's combinatorial complex output signal). If the amount of the orthogonal harmonics is N, and the complex signal is a combination of K harmonics, then the total amount of combinations can be calculated using Equation 2 below:

$$C_N^K = \frac{N!}{(N-K)!K!} \quad (2)$$

For example, if N=20, the maximum number of combinations is achieved by K=10 (184756 combinations). The data transmission rate can be about 17 bit/s.

In some embodiments, the selection of the particular realization of the combinatorial process can be based on levels of various noises and/or degrees of the attenuation of different frequencies in the transmission channel or media. The range of amplitudes of the output signal can depend on mud flow Q, rotational position φ range (φ$_{min}$, φ$_{max}$), and/or the initial rotational position φ$_0$. The range of amplitudes of the output signal does not depend on a number of transmitted frequencies illustrated in FIG. 10.

Figures 10, 11:
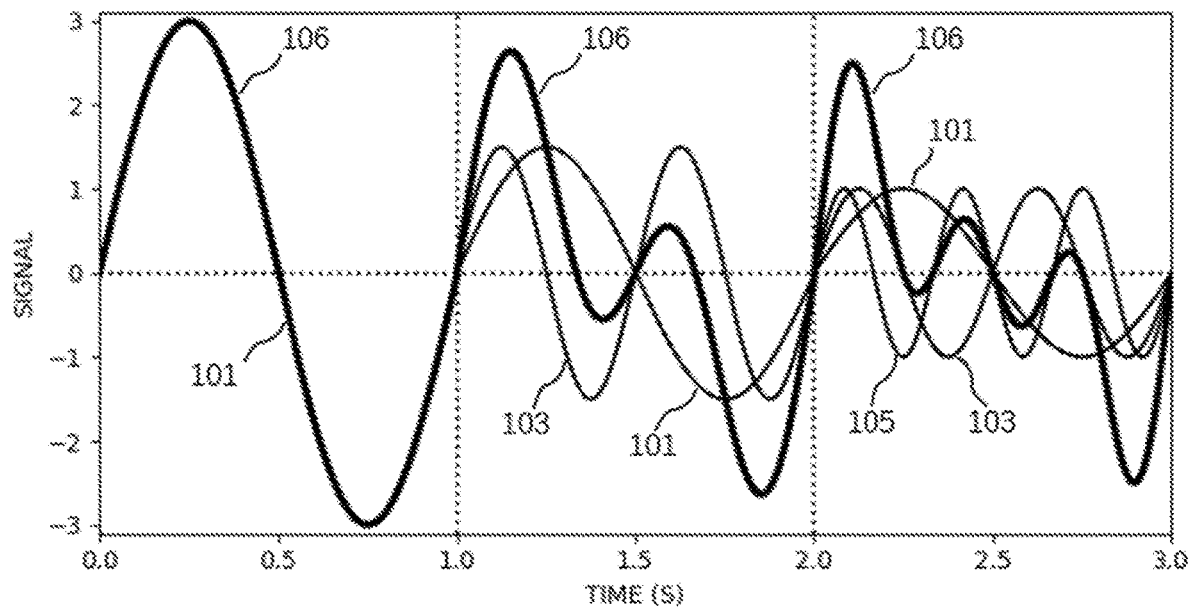
FIG. 10 shows three consecutive 1 second intervals with a 1 Hz harmonic, a sum of 1 Hz harmonic and a 2 Hz harmonic, and a sum of 1 Hz, 2 Hz and 3 Hz harmonics.
FIG. 11 is a table of data transmission rates based on maximum frequency and time.

In particular, FIG. 10 shows three consecutive one second intervals. The first interval includes only one 1 Hz harmonic (line 101) that matches the output signal (line 106). The output signal on the second interval is a sum of a 1 Hz harmonic (line 101) and 2 Hz harmonic (line 103). The third interval of the output signal is a sum of three harmonics: 1 Hz (line 101), 2 Hz (line 103), and 3 Hz (line 105). The more harmonics that are included into the output signal, the smaller an amplitude of each harmonic is. For example, on the third interval, an amplitude of each harmonic equals approximately ⅓ of the amplitude of a single transmitted harmonic.

The data transmission rate can depend on a number of combinations of orthogonal components which, in turn, depend on T. As show in FIG. 11, for a maximum frequency $F_{max}$=4 Hz, it is possible to utilize one frequency for T=0.25 sec (4 Hz), two frequencies for T=0.5 sec (2, 4 Hz), and four frequencies for T=1 sec (1, 2, 3, 4 Hz). For a maximum frequency $F_{max}$=8 Hz, there are two orthogonal frequencies for T=0.25 sec (4, 8 Hz), four frequencies for T=0.5 sec (2, 4, 6, 8 Hz), and eight frequencies for T=1 sec (1-8 Hz). Higher values of the maximum frequency $F_{max}$ and T allow the use of more orthogonal components.

Figure 12:
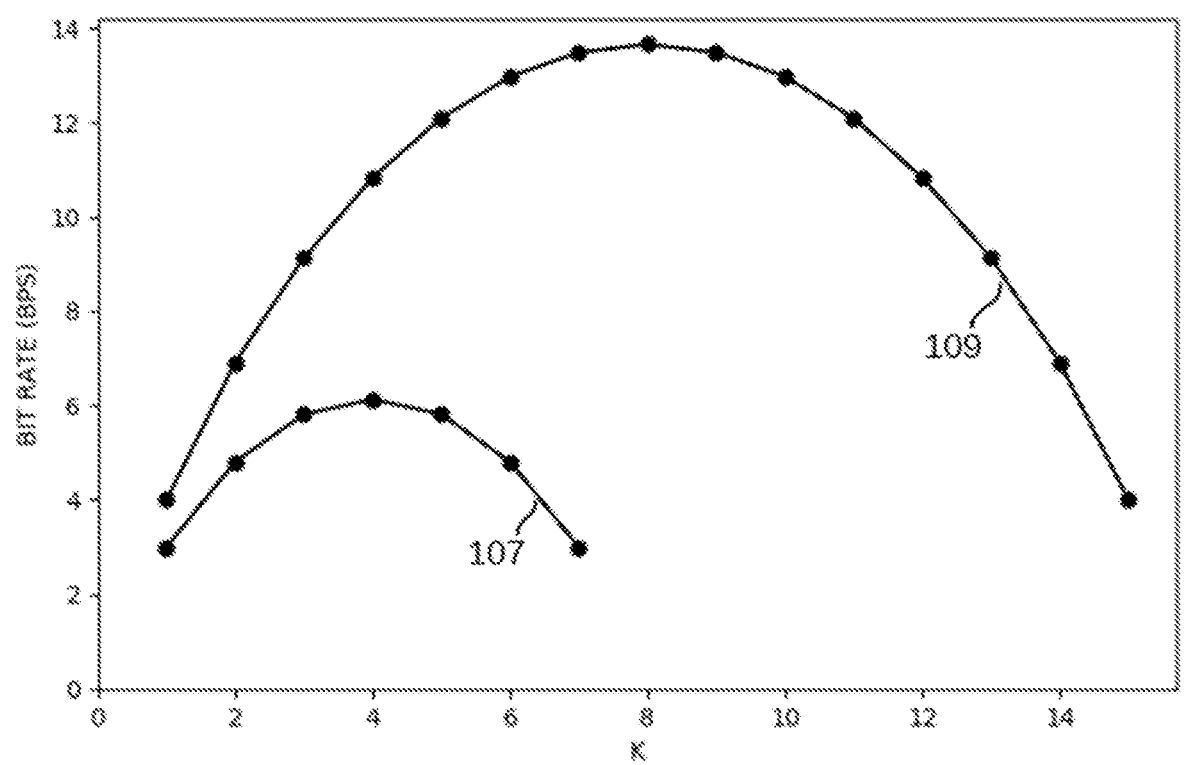
FIG. 12 shows a bit rate for simultaneous sending of K harmonics for N available orthogonal frequencies for maximum data transmission rates.

The exemplary combinatorial process can significantly increase data transmission rates even for low frequencies of standard modulators (e.g., mud pulsers and EM modulators). FIG. 12 shows that simultaneously sending of K harmonics for N available orthogonal frequencies results in the maximum data transmission rate being reached for K=N/2 (if N is even). Line 107 represents a dependency for the standard modulator with a maximum frequency $F_{max}$=8 Hz and line 109 represents an advanced modulator with a maximum frequency $F_{max}$=16 Hz (T=1 sec). For the standard modulator, the highest bit rate is achieved by sending combinations of four different frequencies, and equal about 6 bit/s. For the advanced modulator, the maximum bit rate is about 13.5 bit/s and is achieved by sending combinations of eight different frequencies.

The larger the number of frequencies used within the combinatorial signal, the smaller the amplitude of each frequency. Therefore, the exemplary process can involve determining a predefined criterion for an optimal number of frequencies in the signal. For example, the predefined threshold level for increasing the number of simultaneously sending harmonics may be needed to increase a data transmission rate by at least 20%. The optimal number of components for a maximum frequency $F_{max}$=8 Hz will be K=3, which results in a bit rate of approximately 6 bit/s without utilizing phase modulation. For a maximum frequency $F_{max}$=16 Hz, the optimal value of K=4 (10.5 bit/s) can be used.

Another step of the exemplary system or method to increase the combinatorial bit rate can include the use of additional combinations according to the Equation 3 below, with C representing each combination:

$$\sum_{K=1}^{N} C_N^K = C_N^1 + C_N^2 + \ldots + C_N^N \quad (3)$$

Figure 13:
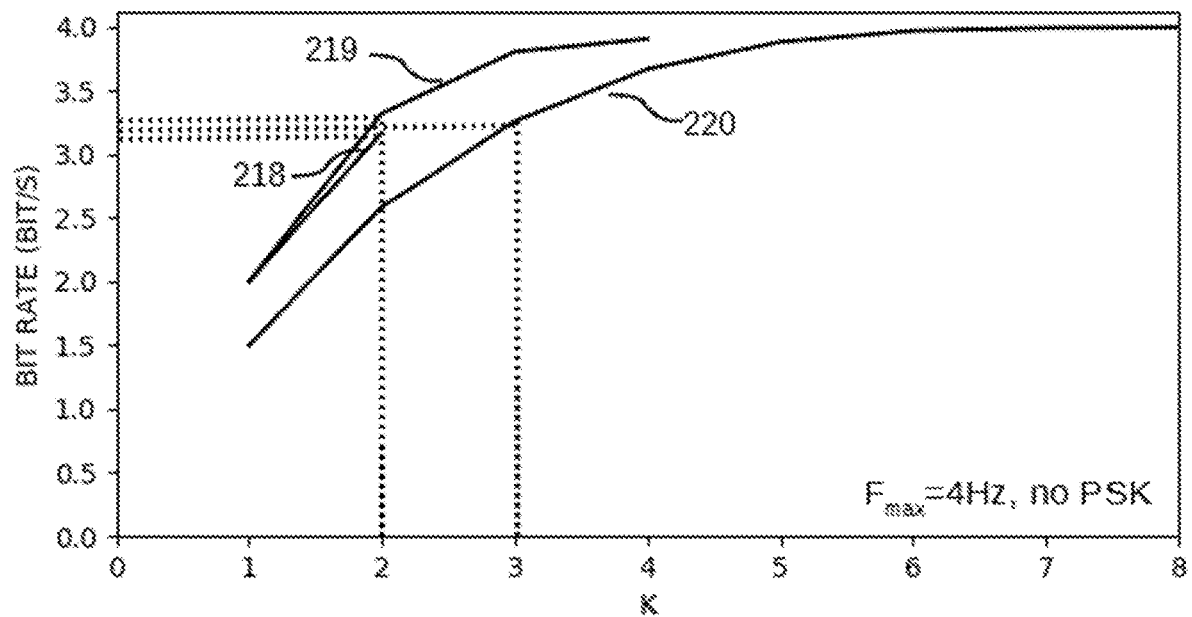
FIG. 13 shows bit rates for a combination of different frequencies and predetermined threshold level of 20%.

FIG. 13 shows that using a combination of different frequencies according Equation 3 and a predefined threshold level of 20% (every additional harmonic must increase the data rate by at least 20%), for a maximum frequency $F_{max}$=4 Hz, the optimal number is K=2 for T=0.5 sec (line 218), K=2 for T=1 sec (line 219), K=3 for T=2 sec (line 220). The corresponding data transmission rates for these optimal numbers are approximately equal to each other (e.g., about 3.1-3.3 bit/s).

Figure 14:
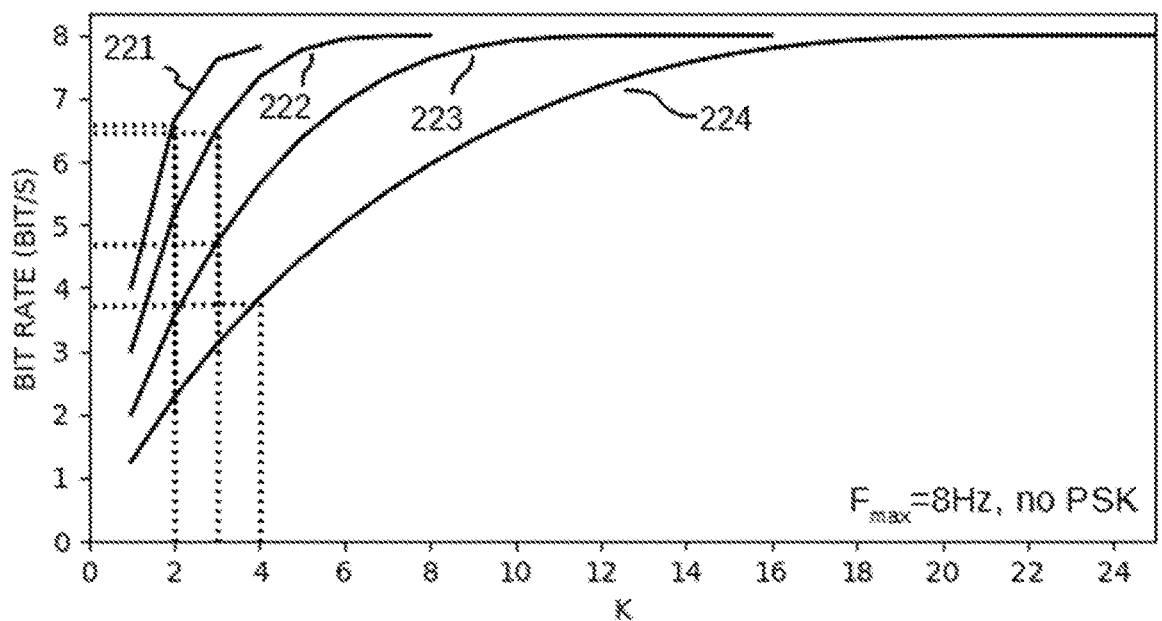
FIG. 14 shows bit rates for a maximum frequency of 8 Hz and a predetermined threshold level of 20%.

FIG. 14 illustrates that for a maximum frequency $F_{max}$=8 Hz with a predefined threshold level of 20%, the theoretical limit for each T is equal to about 8 bit/s. The optimal number of components is K=2 for T=0.5 sec (line 221, data rate about 6.64 bit/s), K=3 for T=1 sec (line 222, data rate about 6.52 bit/s), K=3 for T=2 sec (line 223, data rate about 4.72 bit/s) and K=4 for T=4 sec (line 224, data rate about 3.83 bit/s). Achievement of the desired data rate, for example 6 bit/s, can be based on Equation 3, and necessitates K=2 for T=0.5 sec, K=3 for T=1 sec, K=5 for T=2 sec, and K=10 for T=4 sec.

Figure 15:
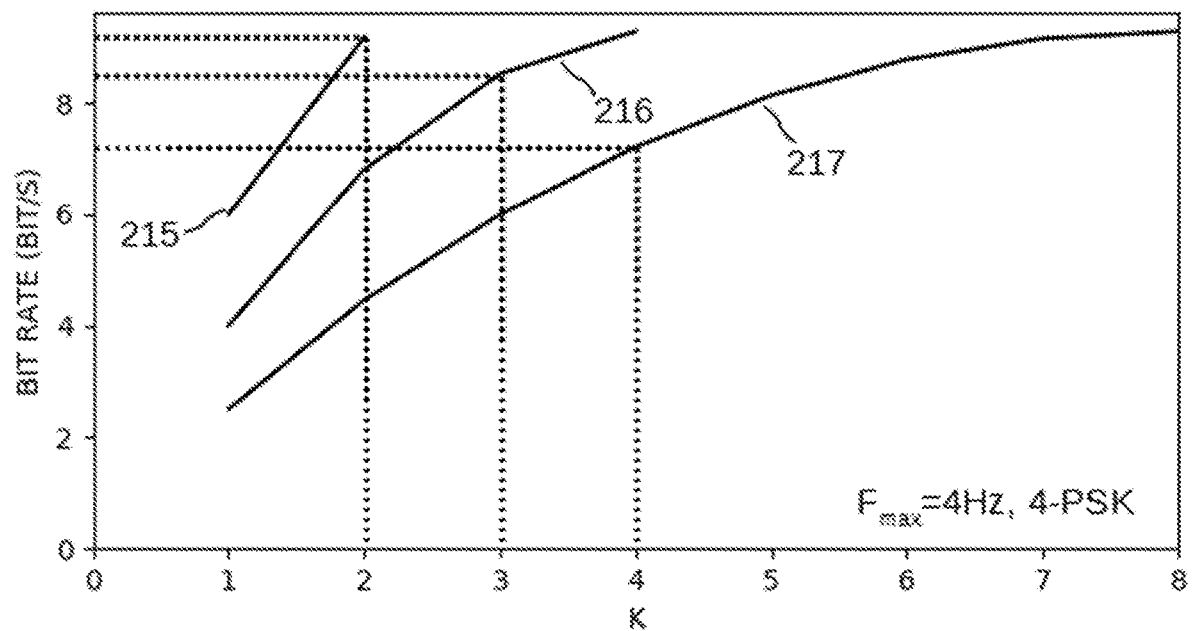
FIG. 15 shows bit rates for a maximum frequency of 4 Hz and 4-PSK.
Figure 16:
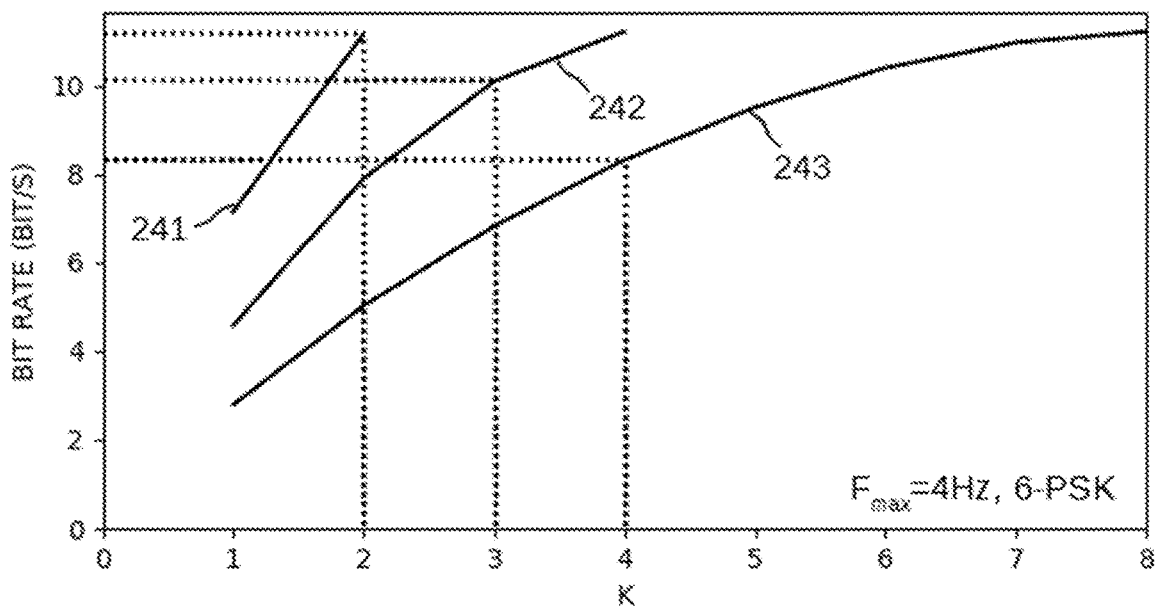
FIG. 16 shows bit rates for a maximum frequency of 4 Hz and 6-PSK.
Figure 17:
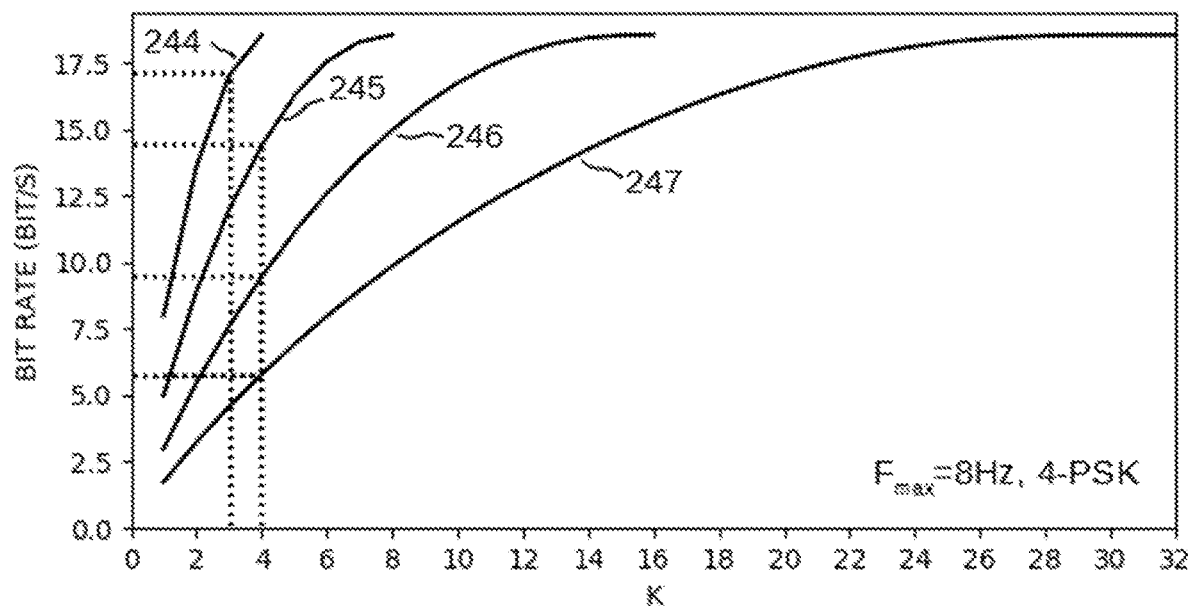
FIG. 17 shows bit rates for a maximum frequency of 8 Hz and 4-PSK.
Figure 18:
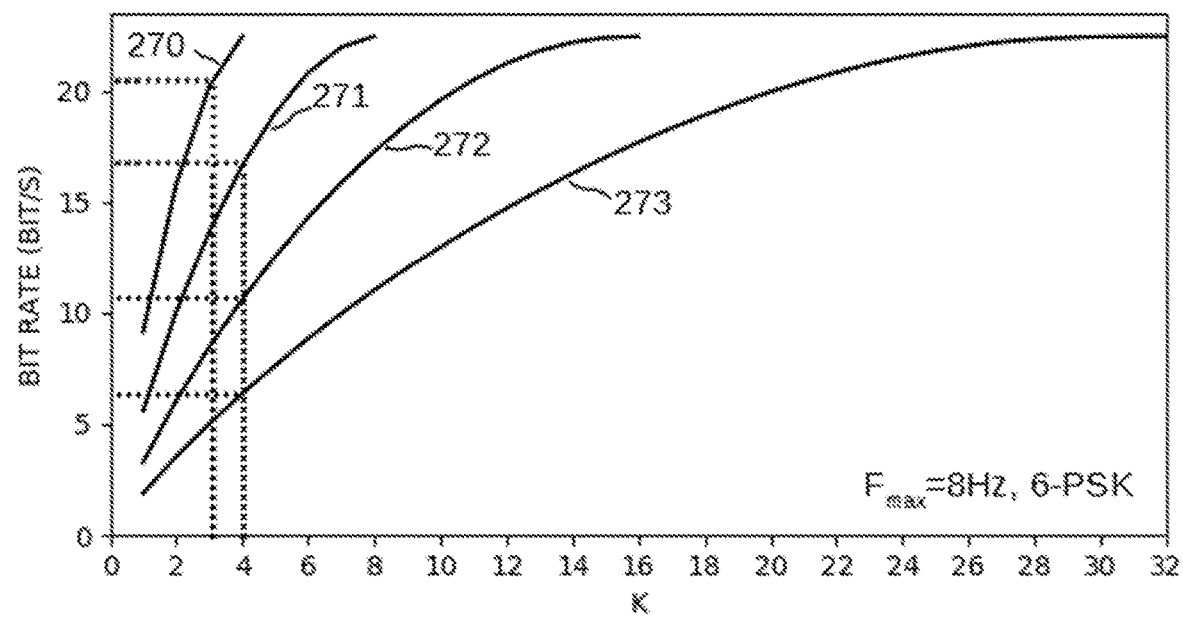
FIG. 18 shows bit rates for a maximum frequency of 8 Hz and 6-PSK.

FIG. 15 shows bit rates for a maximum frequency of 4 Hz and 4-PSK. The optimal number of components is K=2 for T=0.5 sec (line 215), K=3 for T=1 sec (line 216), and K=4 for T=2 sec (line 217). FIG. 16 shows bit rates for a maximum frequency of 4 Hz and 6-PSK. The optimal number of components is K=2 for T=0.5 sec (line 241), K=3 for T=1 sec (line 242), and K=4 for T=2 sec (line 243). FIG. 17 shows bit rates for a maximum frequency of 8 Hz and 4-PSK. The optimal number of components is K=3 for T=0.5 sec (line 244), K=4 for T=1 sec (line 245), K=4 for T=2 sec (line 246), and K=4 for T=4 sec (line 247). FIG. 18 shows bit rates for a maximum frequency of 8 Hz and 6-PSK. The optimal number of components is K=3 for T=0.5 sec (line 270), K=4 for T=1 sec (line 271), K=4 for T=2 sec (line 272), and K=4 for T=4 sec (line 273). FIGS. 15-18 show that traditional modulators with practically achievable $F_{max}$=6 Hz can provide a data transmission rate of 6 bits/sec, e.g., better than most known and widely used LWD systems) by using the exemplary combinatorial scheme discussed herein.

Figures 19, 20:
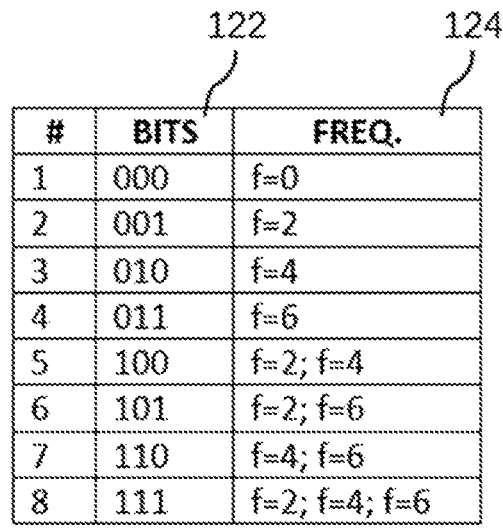
FIG. 19 is a table of bit rates for different frequencies.
FIG. 20 is a table of components of an output signal, a number of possible combinations, data transmission rates, and threshold levels for a maximum frequency of 8 Hz.

A traditional modulator can have a maximum frequency $F_{max}$=6 Hz. In order to achieve 6 bit/s for such traditional modulator, the system can use a combinatorial method based on Equation 3 and can introduce a case K=0, where no data is sent. An example of such option is shown in the table of FIG. 19. Eight possible combinations of three bits (column 122) are encoded by frequencies from column 124. For T=0.5 sec, the data rate is 3 bits per window or 6 bit/s.

Based on the above examples, it is possible to conclude that the combinatorial process of the present invention (without utilizing phase modulation of frequency components), using a threshold of 20%, allows achievement of a 3.3 bit/s data transmission rate for a single modulator with a maximum frequency $F_{max}$=4 Hz, a 6.64 bit/s for a maximum frequency $F_{max}$=8 Hz, and a 13.29 bit/s for a single modulator with a maximum frequency $F_{max}$=16 Hz. A modulator with a maximum frequency $F_{max}$=6 Hz using the particular approach illustrated in FIG. 19 can provide a 6 bit/s rate.

In some embodiments, a higher bit rate can be achieved by using phase modulation, for example QPSK (four phases for each frequency). In some embodiments, using data transmission of the data in accordance with the PSK modulation technique, for example, 4-PSK, allows for a standard modulator with a maximum frequency $F_{max}$=8 Hz achieve a data transmission rate up to about 18 bit/s (K=4, only 512 of 624 combinations are used) for T=0.5 sec, a rate more than twice higher as compared to using combinations of different frequencies without phase modulation or any others types of modulations. For $K_{opt}$=3 (threshold 20%), the data transmission rate equals about 16 bit/s. Such example and combinatorial relationship is shown in the table of FIG. 20. Unused combinations may be further used if a frequency of a particular harmonic matches the band noise and, thereby, must be excluded from the combinatorial signal.

Figure 24:
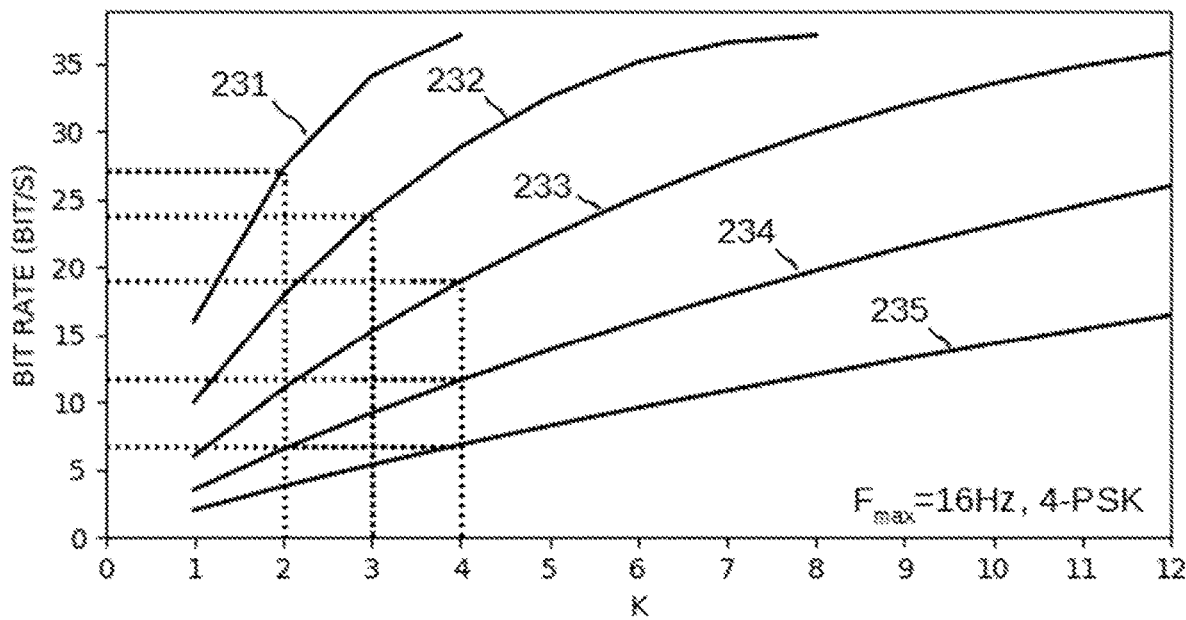
FIG. 24 shows bit rates for a maximum frequency of 16 Hz and a 4 PSK technique.

In most practical situations, a single standard modulator can be used to achieve the desired data transmission rate with K=2 according to Equation 3 and using the 4-PSK modulation technique. FIGS. 21 and 24 demonstrate methods for achieving a 10-20% increase of the data transmission rate by using 5-PSK and 6-PSK modulation techniques. A comparison of T=0.5 sec (FIG. 21) and T=1 sec (FIG. 22) shows a higher data transmission rate for T=0.5 sec for equal values of maximum frequency $F_{max}$. For example, a single standard modulator with maximum frequency $F_{max}$=4 Hz provides about 9.17 bit/s for 4-PSK and T=0.5 sec. The same data rate for T=1 sec requires a modulator with a maximum frequency $F_{max}$=8 Hz and use of 5-PSK. The exemplary combinatorial process allows achievement of at least a data rate of 9 bit/s even for K=2. Reaching the desired data rate with a smaller maximum frequency $F_{max}$ is preferable because attenuation of low frequencies is lesser than for high frequencies. Furthermore, K=2 can be used for any modulator from a maximum frequency $F_{max}$=4 Hz to $F_{max}$=16 Hz. Since K=2 is a maximum value for a modulator with a maximum frequency $F_{max}$=4 Hz, the data transmission rate will be about 9-11 bit/s depending of the type of PSK used. As shown in the table of FIG. 21, for T=0.5 sec and K=2 for a modulator with a maximum frequency $F_{max}$=6 Hz, the data rate is in the range of about 11.8-13.95 bit/s. For a maximum frequency $F_{max}$=8 Hz, the data rate will be about 13.61-15.81 bit/s.

One example of utilization of the exemplary system for a standard pulser with a maximum frequency $F_{max}$=6 Hz, and T=0.5 sec is shown in the table of FIG. 23. The table of FIG. 23 shows 64 different combinations of three available orthogonal frequencies (2, 4 and 6 Hz) and the 5-PSK technique applied with one and two carries. In such embodiments, the data bits of the digital data are grouped into six-bit groups, as generally indicated in column 142 of FIG. 23. Each possible bit sequence of such groups is associated with a particular combination of frequencies in column 144 and a corresponding phase in column 146. Utilization of this option provides about 12 bit/s for a standard modulator with a maximum frequency $F_{max}$ of only 6 Hz.

If the required data transmission rate must exceed 18 bit/s, the system can use an advanced pulser with a maximum frequency $F_{max}$=16 Hz or higher. In such case, for a maximum frequency $F_{max}$=16 Hz, T=0.5 sec, K=3 and 4-PSK the data transmission rate is about 23.98 bit/s (see FIG. 24, line 232). In some instances, the system can use T=0.25 sec with K=2 and 4-PSK that results in a data transmission rate of about 27.23 bit/s and a data transmission rate of about 34 bit/s for K=3. For T=0.25 sec, K=2 and 6-PSK the data transmission rate is about 31.63 bit/s, and for K=3 about 40.43 bit/s (see line 236 of FIG. 25). For T=0.25 sec, there are four available frequencies (4, 8, 12, 16 Hz), for T=0.5 sec there are eight available frequencies (2, 4, 6, 8, 10, 12, 14, 16 Hz), and for T=1 sec there are all sixteen available frequencies (1-16 Hz).

Figure 25:
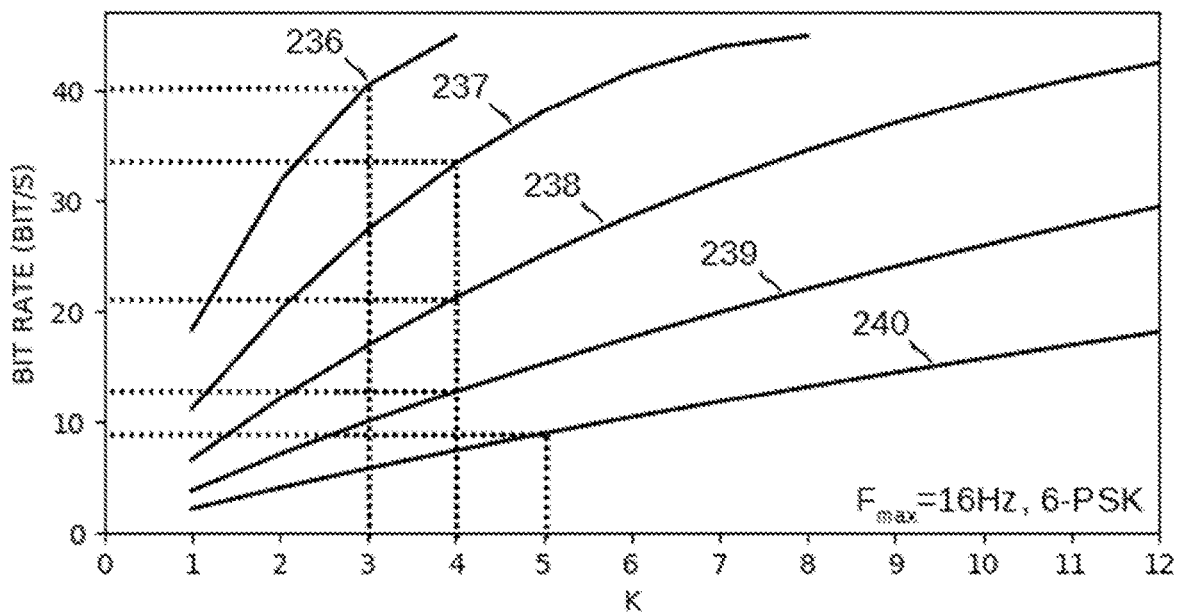
FIG. 25 shows bit rates for a maximum frequency of 16 Hz and a 6 PSK technique.

FIG. 24 illustrates optimal numbers of simultaneous harmonics $K_{opt}$ (for a threshold of 20%) and corresponding data transmission rates for a modulator with a maximum frequency $F_{max}$=16 Hz if 4-PSK modulation is utilized. For T=0.25 sec and $K_{opt}$=2 the data rate is about 27.23 bit/s (line 231), for T=0.5 sec and $K_{opt}$=3 the data rate is about 23.98 bit/s (line 232), for T=1 sec and $K_{opt}$=4 the data rate is about 18.94 bit/s (line 233), for T=2 sec and $K_{opt}$=4 the data rate is about 11.59 bit/s (line 234)), and for T=4 sec and $K_{opt}$=4 the data rate is about 6.83 bit/s (line 235). FIG. 25 shows the same type of information as FIG. 24, but for 6-PSK. For T=0.25 sec and $K_{opt}$=3 the data rate is about 40.43 bit/s (line 236), for T=0.5 sec and $K_{opt}$=3 the data rate is about 33.33 bit/s (line 237), for T=1 sec and $K_{opt}$=4 the data rate is about 21.24 bit/s (line 238), for T=2 sec and $K_{opt}$=4 the data rate is about 12.75 bit/s (line 239), and for T=4 sec $K_{opt}$=5 the data rate is about 8.95 bit/s (line 240).

Based on experimentation with the exemplary system, it was determined that a shorter T value results in higher data transmission rates and a smaller number of harmonics to transmit. The higher the number of variants of phase utilized in phase modulation, the higher the data transmission rate is. An advanced pulser with a maximum frequency $F_{max}$=16 Hz can reach about 13 bit/s without use of phase modulation, up to about 27 bit/s with use of a 4-PSK modulation technique, and up to about 40 bit/s with a 6-PSK modulation technique.

Figure 26:
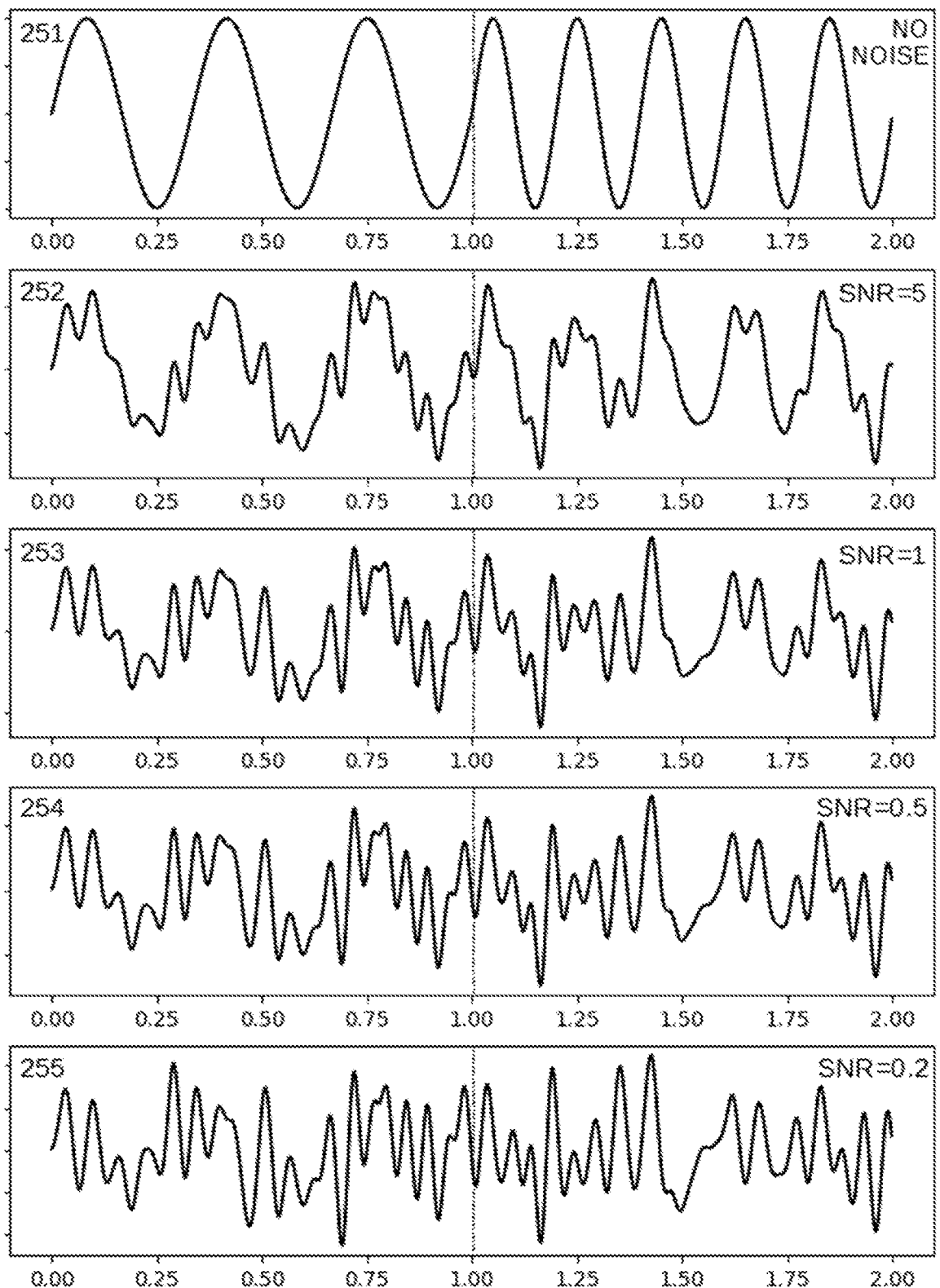
FIG. 26 shows noise immunity against white noise during implementation of an exemplary system for downhole signal transmission with combinatorial frequencies according to the present disclosure.
Figure 27:
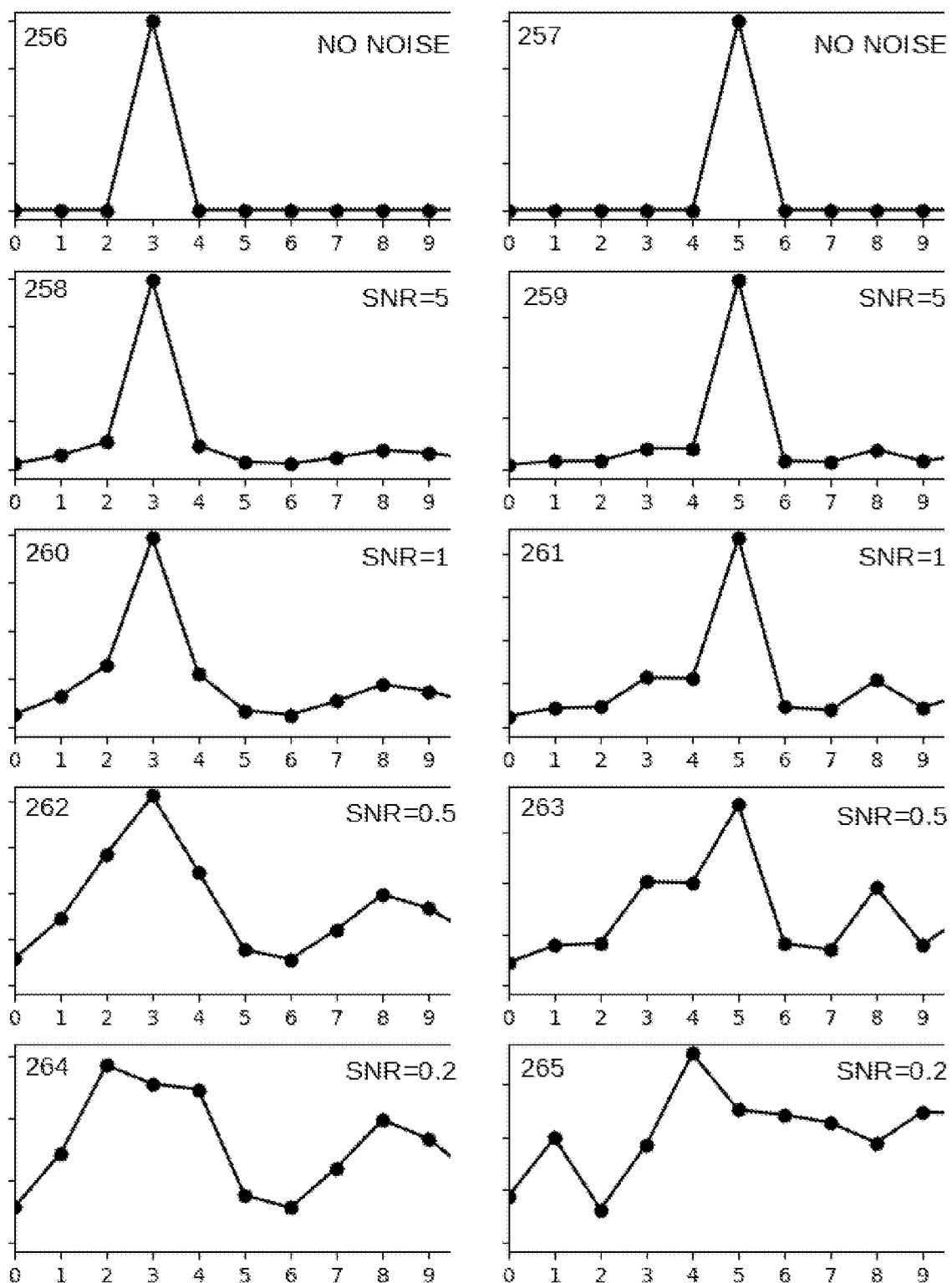
FIG. 27 shows noise immunity against white noise based on amplitude spectrums during implementation of an exemplary system for downhole signal transmission with combinatorial frequencies according to the present disclosure.

The exemplary process (in contrast to traditional processes) also provides a set of opportunities and advantages for operating in situations with different noises (e.g., white noise, band noise, pulse noise, combinations thereof, or the like). Noise immunity against white noise is illustrated in FIGS. 26 and 27. FIG. 26 shows a signal containing two consecutive windows (0-1 sec: 3 Hz, 1-2 sec: 5 Hz) for different values of signal/noise (S/N) ratio: 251—no noise, 252—S/N=5, 253—S/N=1, 254 S/N=0.5, 255—S/N=0.2. FIG. 27 shows corresponding amplitude spectrums calculated using DFFT. The first column of charts corresponds to the first window (charts 256, 258, 260, 262) and the second column of charts corresponds to the second window (charts 257, 259, 261, 263, 265). Charts 262 and 263 shows that it is possible to determine correct values of frequencies up to a S/N=0.5, indicating that the exemplary combinatorial process has a high stability against white noise.

Figure 28:
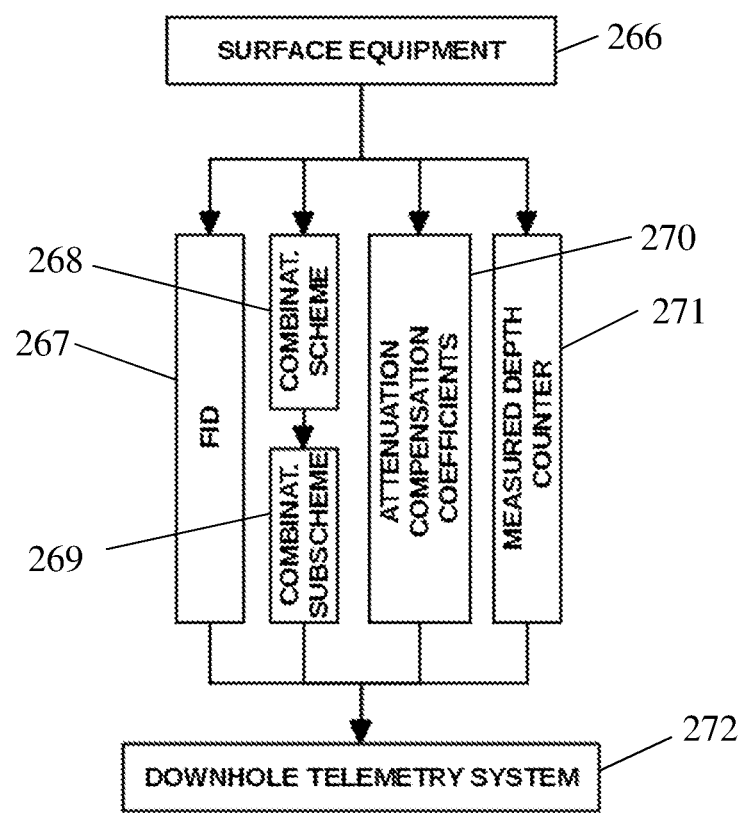
FIG. 28 is a diagrammatic view of an exemplary system for downhole signal transmission with combinatorial frequencies according to the present disclosure.

FIG. 28 is a diagrammatic view of the exemplary system for downhole signal transmission with combinatorial frequencies. The system includes surface equipment 266 and a downhole telemetry system 272 for performing the drilling operation. The system can include a current feed identification (FID) 267, one or more combinatorial schemes 268, attenuation compensation coefficients 270, and/or measured depth counters 271 in communication with the surface equipment 266 and the downhole telemetry system 272. In some embodiments, the system can also include one or more combinatorial subschemes 269.

Figure 29:
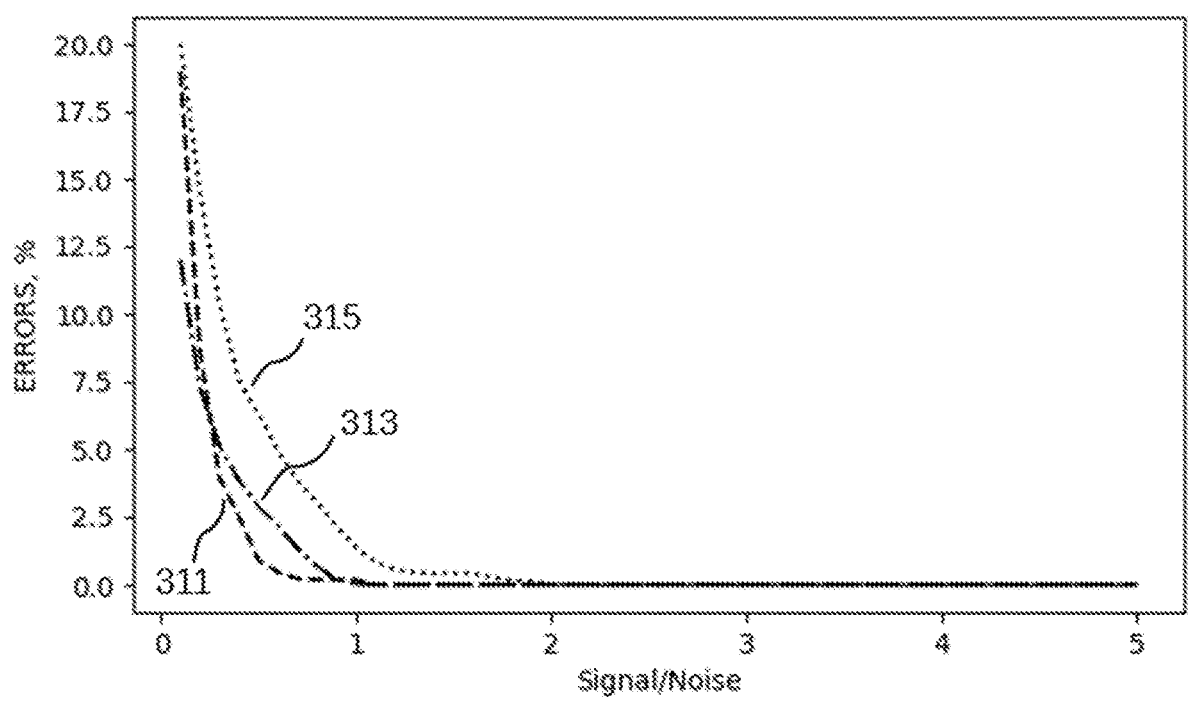
FIG. 29 shows a percentage of errors during detection of different realizations during implementation of an exemplary system for downhole signal transmission with combinatorial frequencies according to the present disclosure.

FIG. 29 illustrates the amount of errors during detection of three different realizations of the combinatorial process for different S/N ratios. Line 311 corresponds to a process providing 4 BPS with T=1 sec and utilizes frequency and phase modulation (4 frequencies, 4 phases). Line 313 corresponds to a process providing 4 BPS with only phase modulation (4 phases) and T=0.5 sec. Line 315 corresponds to a process providing 6 BPS with frequency and phase modulation (2 frequencies, 4 phases) with T=0.5 sec. For S/N above 1.0-2.0, the amount of the detection errors is 0 or significantly small.

In drilling operations during the LWD process, the level of white noise is typically below the level of the signal. Narrow-band interference can be divided into two groups: stable-in-time and short-time noises. In some embodiments, the selected combinatorial realization of the system can be changed by downlinking to another realization order to exclude one or more frequencies from the combinatorial set in situations when such frequencies coincide with strong narrow-band frequency noise. The system can therefore include combinatorial schemes and, if noise is detected with frequencies that coincide with one or more frequencies of the combinatorial scheme, one or more subschemes can be used. One or more subschemes can therefore be introduced to the system to supplement situations where noise is detected. One combinatorial scheme may have or be associated with several subschemes depending on the number of spare frequencies. As shown on FIG. 28, the downlink command initially sets a combinatorial scheme 268. This command has a special tag in the end showing whether the next command is coming. The second (optional) command sets a combinatorial subscheme 269.

For example, FIG. 21 shows the data rate is 9.17 bit/s for a maximum frequency $F_{max}$=4 Hz and 4-PSK. Excluding just one frequency (2 Hz or 4 Hz) reduces the data transmission rate more than twice (4 bit/s). At the same time, for T=1 sec, the loss of the data rate will be from 6.81 bit/s to 5.91 bit/s (a less severe result). Therefore, if the data rate 6 bit/s is required and band noises are very probable, the use of T=1 sec is a better choice.

However, the same calculations for a maximum frequency $F_{max}$=6 Hz shows a decrease of the data transmission rate for T=0.5 sec from 11.81 bit/s to 9.17 bit/s, and such rate is still better than for T=1.0 sec (from 8.04 bit/s to 7.49 bit/s). However, if one more frequency is taken by band noises, the situation transforms into the previous example. For example, for a standard modulator with maximum frequency $F_{max}$=8 Hz, T=0.5 sec, there are four orthogonal frequencies (2, 4, 6 and 8 Hz). Based on drilling speed and the amount of collected data, the level of 5 bit/s is required. In order to achieve such data transmission rate, it is enough to send various combinations of two frequencies, K=2. The total amount of combinations is equal 6, and the resulting data rate is 5.17 bit/s. During operation, a 2 Hz noise was observed. If the 2 Hz frequency is excluded from the combinatorial scheme, the data rate reduces to 3.17 bit/s. One option for continuing an operation with 5 bit/s is to change T from 0.5 sec to 1 sec, and K=2 to K=3, the resulting data transmission rate for such option being 5.13 bit/s. Based on the combinatorial scheme(s) and combinatorial subscheme(s) programmed into the system, the system can automatically adjust operation when noise is detected that coincides with a frequency of the combinatorial scheme. For example, if a noise is detected, the system can automatically adjust to operate using a subscheme associated with the combinatorial scheme.

Figure 30:
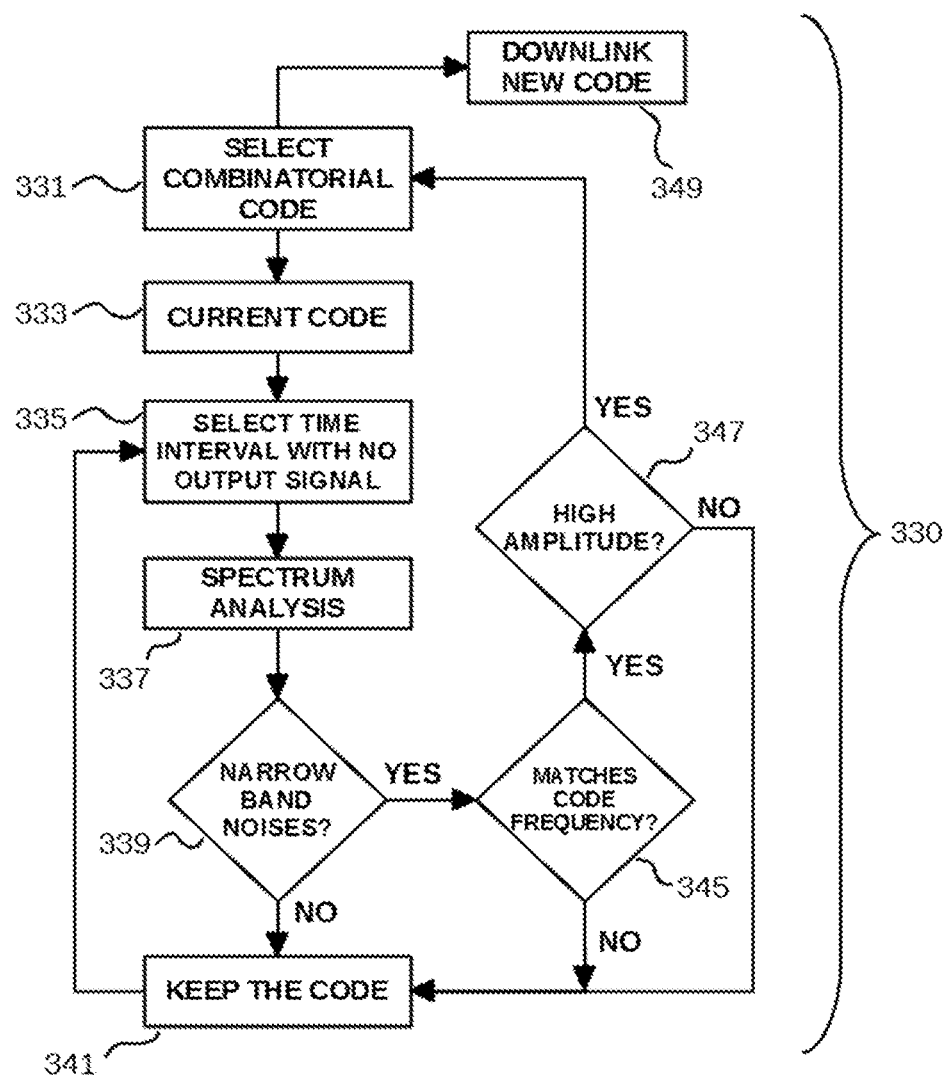
FIG. 30 is a flow chart for implementing an exemplary system for downhole signal transmission with combinatorial frequencies according to the present disclosure.

FIG. 30 shows a flow chart for a process 330 of implementing the exemplary system, including the option to exclude frequencies from the combinatorial scheme if such frequencies coincide with high amplitude narrow band noises. At step 331, the combinatorial code or scheme is selected based on the maximum frequency $F_{max}$ of a particular modulator and a request for a desirable level of data transmission rate. The data transmission rate is set in accordance with a speed at which a drill bit breaks the rock under the borehole to deepen the borehole (i.e., rate of penetration—ROP). Higher values of ROP generally require higher data transmission rates. On the other hand, low ROP generally allows for the use of slower but more energy efficient data transmission schemes. For example, it is possible to insert spare intervals between adjacent signals. In some embodiments, the maximum frequency of the modulator and the desired data transmission rate can be input into the system, and the system can automatically determine the preferred and most efficient combinatorial scheme to apply.

At step 333, the selected combinatorial code is programming into the downhole electronics. In order to detect and evaluate an existence of narrow band frequencies noise, at step 335, some time intervals are selected to have no output signals. For example, after sending ten signals, the next interval can be allocated to noise detection. Next, a windowed FFT application is applied using the processing device on the surface to perform spectrum analysis at step 337. At step 339, if narrow band noises are not detected, the process returns to step 335 to evaluate the next interval without signals and the current combinatorial code (step 341) is not changed. If the FFT analysis detects narrow band frequencies noises at step 339, then the system can compare the frequencies of the noises to the frequencies of combinatorial scheme selected at step 333. If the noise frequencies do not coincide with the frequencies of the combinatorial scheme, the process returns to step 341 to keep the original combinatorial code, and further proceeds to step 335 to continue detection of noises. If a match is observed at step 345 between the noise frequency and the combinatorial scheme frequency but the amplitude level is of the noise frequency not high (step 347), then the process can continue to step 341 to keep the original combinatorial code, and back to step 335 to continue detection of noises.

If the amplitude of the noise frequency is above a predetermined level (step 347), the process continues to step 331 in order to find and select a new combinatorial code, which replaces the previous combinatorial code thought downlinking at step 349. In general, if a frequency of the noise coincides (or substantially coincides) with a frequency of the combinatorial scheme, the decision on whether or not to exclude the frequency from the combinatorial scheme is made by the system. In some embodiments, if the noise level is above 0.5 of a signal level, the new combinatorial scheme or code, or subscheme of the current combinatorial scheme can be automatically selected by the system. The downlinking process of the surface located systems can include changing the rotary speed of the drill string and/or passing a portion of the high-pressure output of the drill fluid pumps at the surface. The rotary speed changes of the drill string can generally be used to detect changes in pressure. Combinations of different changes in pressure and rotational speeds, along with the options discussed above and using different intervals between the operations, allows the exemplary system to change the current combinatorial code to another combinatorial code according to the process 330 of FIG. 30.

In order to compensate for short-time and/or random noises, in some embodiments, the system can duplicate data by splitting the combinatorial scheme into two or more parts that transfer the same information via each part. Each part can be made of two or more frequencies, with each part having different frequency combinations. For example, FIG. 31 illustrates one possible implementations of such combinatorial scheme utilizing duplication of data that has two groups of frequencies—first (2 and 6 Hz) and second (4 and 8 Hz)—transferring the same information. The data from the two groups can be compared and, if it is identical (or substantially identical), the probability of the correct result is determined to be very high. If the data from the two groups is significantly different, the system can choose the result which is closer to the expected value. In general, if the comparison of the data is correct for both duplicative simultaneous messages, the results are considered identical. If the results are different from each other, the system can conclude that at least one (if not both) of the results are incorrect. The expected value can be predicted by different internally programmed algorithms (e.g., naïve method, moving average method, weighted smoothing method, simple linear regression method, partial least squares regression, polynomial fit method, combinations thereof, or the like). For example, a demodulator can keep all decoded values of a certain parameter and use the most recent of them to evaluate a newly decoded value. The example of the combinatorial code of FIG. 31 allows for the duplication of information and provides 6 bit/s for a maximum frequency $F_{max}$=8 Hz and T=0.5 sec. In some embodiments, each group can simultaneous transmit the same information for which data is to be compared. In some embodiments, to avoid duplication, each group can transmit different information for which data is to be compared.

In cases where there is a presence of burst noises, the exemplary combinatorial process can utilize an approach that increases the duration T of the signal that must exceed the duration of the burst noise by twice or more. By increasing the duration T, the system can compensate the impact made by the burst noise because the greater the number of periods of harmonic there are in the signal, the better the harmonic is detectable on FFT amplitude spectrums. If burst noises are rare, they can be ignored for the choice of T, and values on missed intervals can be restored by extrapolation.

In some embodiments, the amplitude attenuation of pressure waves traveling thousands of meters through the mud inside the drilling pipe from the down hole modulator towards the receiver can be used to construct one or more output signals. The signal attenuation increases with smaller pipe diameter, greater compressibility of the drilling fluid, higher viscosity of the drilling fluid, higher signal frequencies, and a greater measure of depth of the well. The effect of the attenuation can be calculated by using Equation 4 below (see, e.g., U.S. Pat. No. 6,219,301, which is incorporated herein by reference in its entirety)

$$S = S_o \exp[-4\pi F(D/d)^2 [\mu/K]] \tag{4}$$

where S represents the signal strength at a surface transducer, $S_0$ represents the signal strength at the downhole modulator, F represents the carrier frequency of the MWD signal in Hertz, D represents the measured depth between the surface transducer and the downhole modulator, d represents the inside diameter of the drill pipe (same units as measured depth), µ represents the plastic viscosity of the drilling fluid, and K represents the bulk modulus of the volume of mud above the modulator.

Figure 32A:
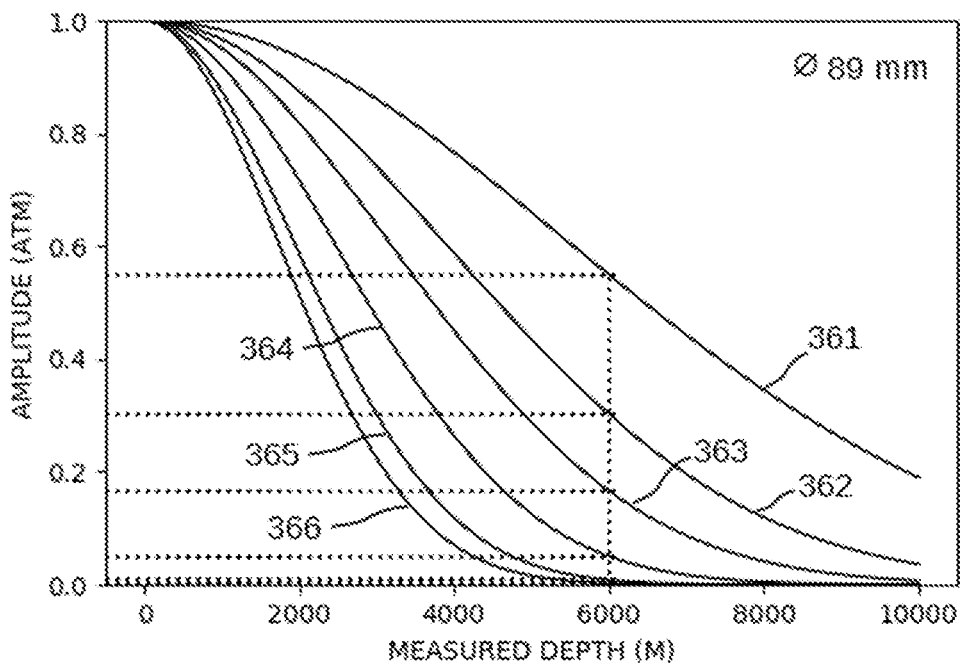
FIG. 32A shows an amplitude of attenuation with measured depth for different frequencies for an 89 mm outer diameter collar.
Figure 32B:
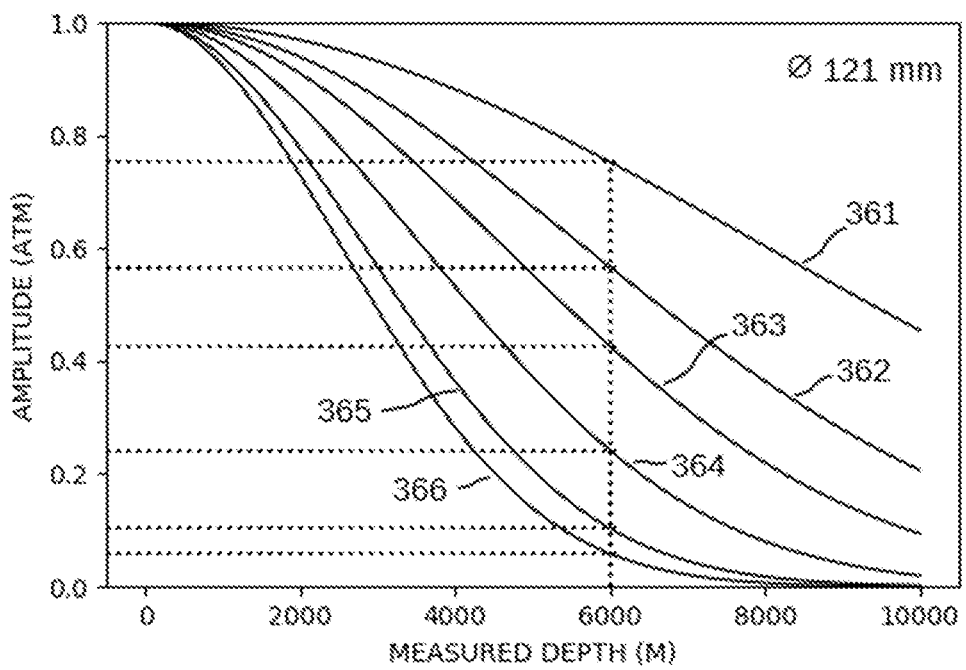
FIG. 32B shows an amplitude of attenuation with measured depth for different frequencies for a 121 mm outer diameter collar.

FIG. 32A shows the attenuation amplitude with measured depth for different frequencies (line 361 for 2 Hz, line 362 for 4 Hz, line 363 for 6 Hz, line 364 for 10 Hz, line 365 for 16 Hz, line 366 for 20 Hz) for a collar with an 89 mm outer diameter and water-based drilling fluid with a dynamic viscosity of 10 centipoises. FIG. 32B shows the same type of information as FIG. 32A but for a collar with an outer diameter of 121 mm (line 361 for 2 Hz, line 362 for 4 Hz, line 363 for 6 Hz, line 364 for 10 Hz, line 365 for 16 Hz, line 366 for 20 Hz).

For the 89 mm diameter collar, for a 10 Hz (line 364) harmonic signal at a depth of 6 km the generated attenuation amplitude is 95%, for a 6 Hz (line 363) harmonic signal at a depth of 6 km the attenuation amplitude is 83%, for a 4 Hz (line 362) harmonic signal at a depth of 6 km the attenuation amplitude is 70%, and for a 2 Hz (line 361) harmonic signal at a depth of 6 km the attenuation amplitude is 45%. As shown in FIG. 32B, for the 121 mm diameter collar, it is possible to use F=16 Hz (line 365) and even F=20 Hz (line 366).

Figure 33:
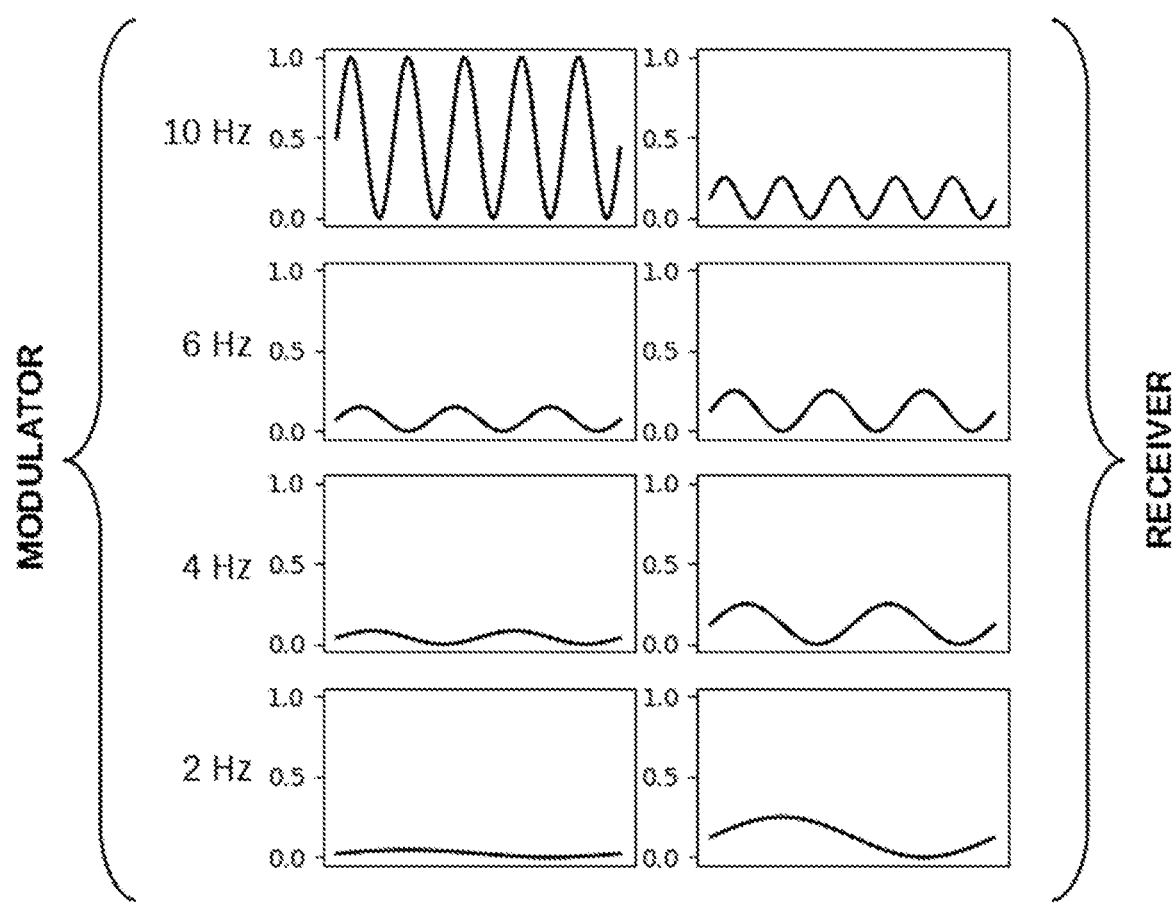
FIG. 33 shows a relationship of a modulator and receiver for different frequencies.
Figure 34:
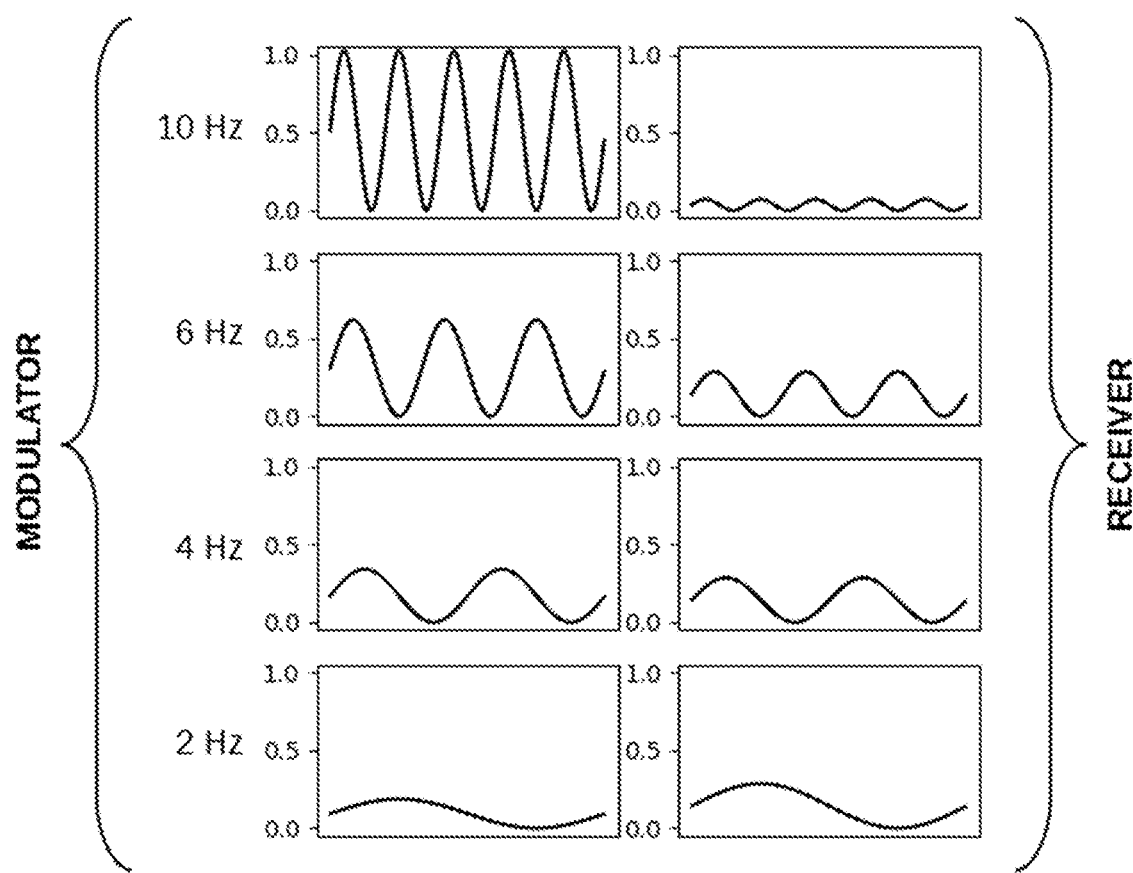
FIG. 34 shows a relationship of a modulator and receiver for different frequencies.

In order to improve reliability of detection of each frequency, for each frequency prior to combining all frequencies into the output signal, the system can apply a correction for the attenuations. The correction coefficient(s) and contribution of each frequency can be selected by the system in such a way that in the pressure wave signal registered at the surface, an amplitude of the power spectrum for each frequency may have equal (or substantially equal) values. As shown in FIG. 33, if a combinatorial scheme number consists of combinations of four harmonics 10, 6, 4 and 2 Hz and the output signal is generated and sent at depth of 6.0 km, then the contribution is 65% for f=10 Hz, 18% for f=6 Hz, 11% for f=4 Hz, and 6% for f=2 Hz (left column of charts of FIG. 33). Such proportions would lead to the equal value of amplitude power spectrum of the signal at the surface, as shown in the right column of charts of FIG. 33. The amplitude of the power spectrum at the surface may be designed to be a function of the other frequencies. At the modulator, the amplitude of a 10 Hz harmonic is much bigger than the amplitudes of the rest of the components. In order to decrease this difference, the system can make the downhole amplitude of 10 Hz be equal, for example, 50% of the rest harmonics, as shown at FIG. 34, where the difference is twice smaller. In such case, the contribution of the 10 Hz frequency to the output signal is 48%, for 6 Hz the contribution is 27%, for 4 Hz the contribution is 16%, and for 2 Hz the contribution is 9%. In some embodiments, a desired proportion of amplitudes of the power spectrum at the surface can be set for each word from combinatorial scheme depending on the attenuation and calculated, for example, using Equation 5 for each frequency of the output signal. Thus, in order to achieve equal amplitudes of all harmonics at the surface, the adjustment coefficients of the input frequency components can be calculated by using Equation 5:

$$C(f) = \frac{P(f_{min})}{P(f)} = \exp\left[-4\pi\left(\frac{D}{d}\right)^2\left(\frac{\mu}{K}\right)(f_{min} - f)\right] \quad (5)$$

where P(f) represents the surface amplitude of harmonic with frequency f, $P(f_{min})$ represents the surface amplitude of harmonic with frequency $f_{min}$, $f_{min}$ represents the lowest frequency in the set, D represents the measured depth between the surface transducer and the downhole modulator, d represents the inside diameter of the drill pipe, $\mu$ represents the plastic viscosity of the drilling fluid, and K represents the bulk modulus of the volume of mud above the modulator.

In some instances, during MWD/LWD operation, acquisition of the information about depth of the modulator may not be available to the downhole electronics. In such embodiments, the MD information can be downlinked to the downhole telemetry system each time when a predefined MD interval is drilled. For example, the information can be downlinked by steps. In some embodiments, each step can be about, e.g., 200 m, 300 m, 400 m, 500 m, 600 m, 800 m, 1,000 m, or the like. In some embodiments, downlinking can be used to send MD information for each step of about, e.g., 500 m, or the like. In some embodiments, downhole software programmed into the system can be used to calculate the well MD based on downlinking current commands and using this information for adjusting attenuation parameters associated with the system.

Figure 35:
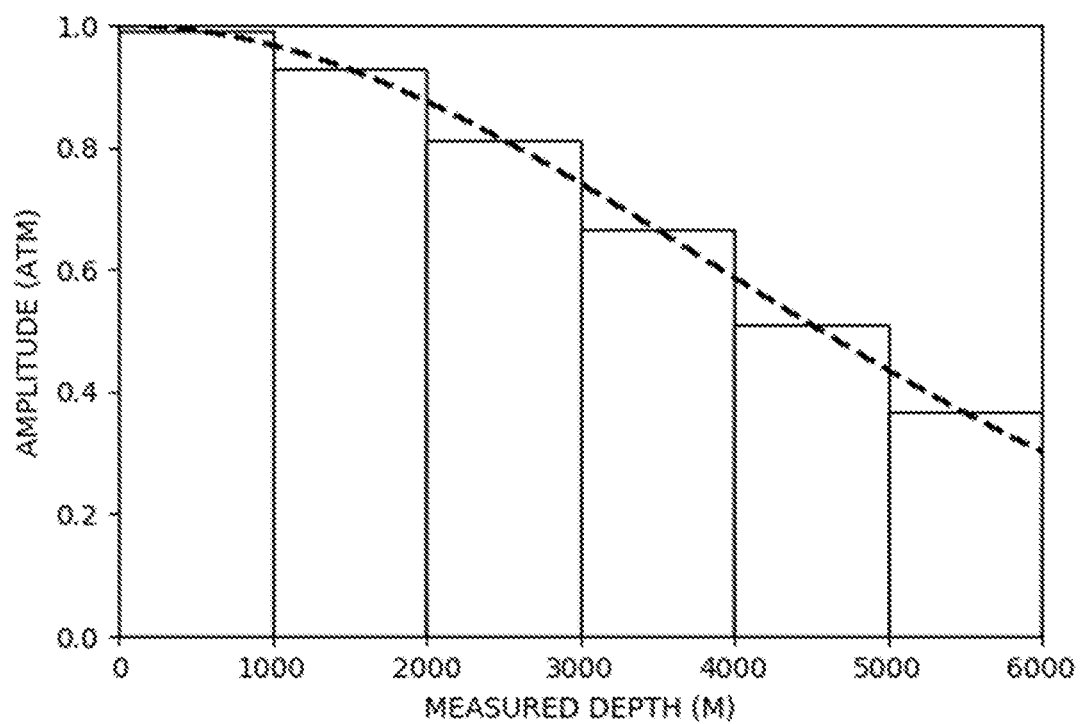
FIG. 35 shows attenuation coefficients for different frequencies applied to varying depth intervals.
Figure 36:
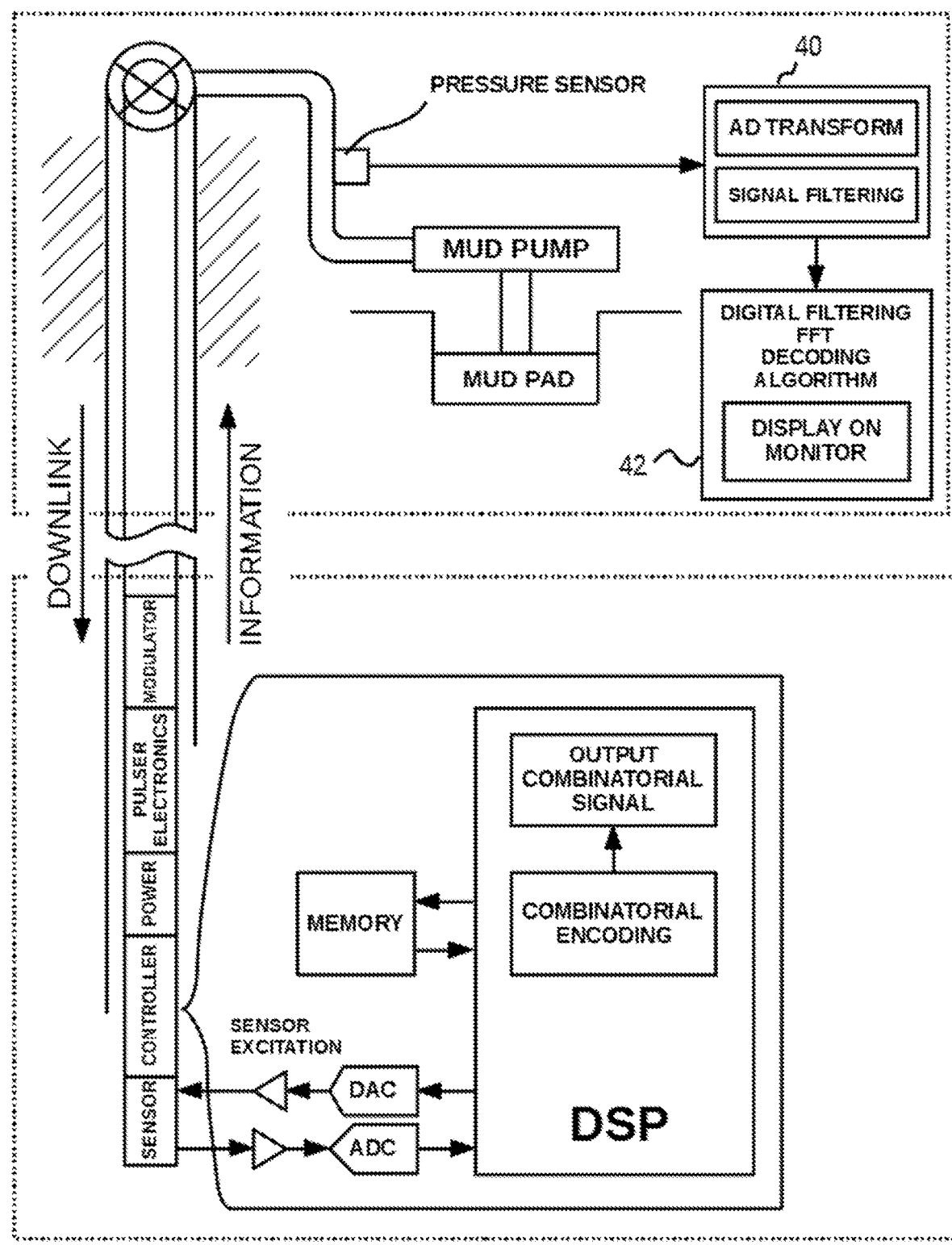
FIG. 36 is a diagrammatic view of a telemetry system for an exemplary system for downhole signal transmission with combinatorial frequencies according to the present disclosure.

In some embodiments, as shown on FIG. 35, attenuation coefficients for different frequencies can be applied by the system to the depth interval from $MD_{current}$ to $MD_{current}+\Delta$, where $\Delta$ is a predefined step. For such interval, the same attenuation coefficient can be applied using coefficients which corresponds to the middle of the depth interval. As discussed herein, the exemplary combinatorial system and method can be incorporated into and/or used in combination with a telemetry system (mud pulse or electromagnetic (ED)). FIG. 36 illustrates two parts an exemplary telemetry system used with the combinatorial system and method. The telemetry system of FIG. 36 can include a first part which operates in the downhole (e.g., downhole equipment), and a second part that operates at the surface (e.g., surface equipment). Both parts of the telemetry system interact with each other using a downlink procedure (from the surface to the downhole) and send information from the bottom hole assembly to the surface.

As discussed herein, data from the downhole sensors is processed in a digital signal processing (DSP) microelectronics processor and sent to a combinatorial frequency module of the exemplary system, the combinatorial frequency module programmed to perform the combinatorial frequencies method (CFM) algorithm. After a selection of a combination of frequencies is made, the system can apply attenuation correction and/or uses high pass filtering, and subsequently the output signal is sent to a modulator control electronics board. The modulator generates a signal (pressure or electromagnetic waves) that travel along the wellbore and are registered at the surface by the pressure recorder. The analog signal is transmitted to a ground gear box 40, where the analog/digital transformation is performed, signal filtering is applied, and the digital data is passed to the processing device 42. Using the processing device 42, the digitized signal can be pre-processed to remove noise and/or correct signal distortions caused by the channel. Subsequently, the signal can be demodulated by using FFT (or any other method) for identifying the frequency components of the recorded signal, including their phase as amplitude modulations, discording data, and providing data output and data display in a monitor of a graphical user interface.

Figure 37:
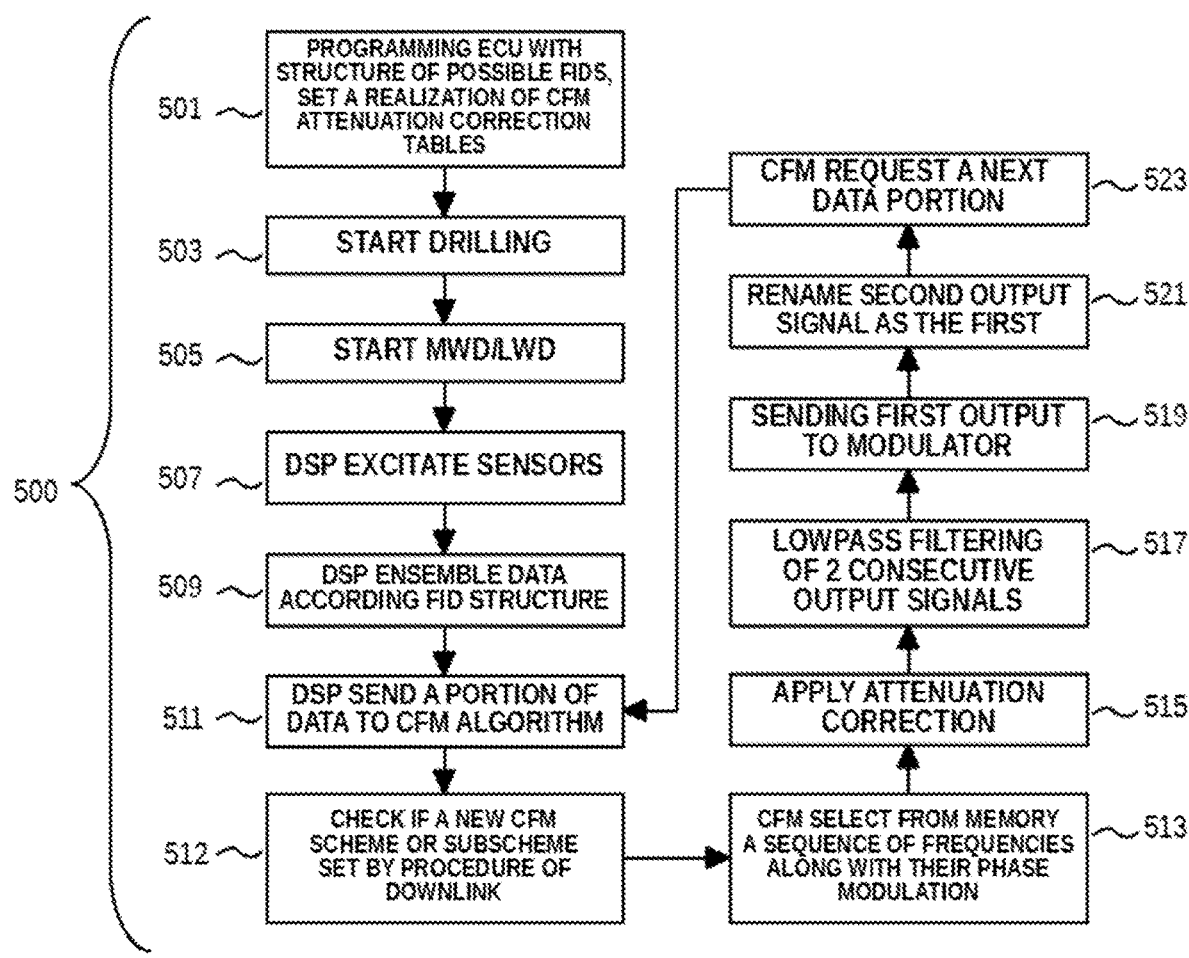
FIG. 37 is a flow chart of downhole drilling operation for an exemplary system for downhole signal transmission with combinatorial frequencies according to the present disclosure.

FIG. 37 shows a detailed flow chart of the downhole process 500 discussed herein. At step 501, operations related to the initial configuration of the downhole system are performed at the surface before the bit run for the drilling operation. All necessary settings of the controller can be programmed into the memory of the tool and/or system during step 501. At step 503, the drilling operation is initiated and, at step 505, the MWD/LWD system is initiated. After beginning of drilling and starting the MWD/LWD systems, at step 507, the controller can begin receiving and processing data from the sensors of the system. The sensors can provide data about operation within the borehole as well as regarding operations at the surface. At step 509, the system can collect the sensor data and, at step 511, prepares a particular part of the data for further encoding and transmission. At step 511, the system can transmit a portion of the collected data to a combinatorial frequency method (CFM) programmed into the system. At step 512, the controller can checks if a new combinatorial scheme (and/or sub scheme) was set by the downlinking signals, and switches to a new the new scheme if it is necessary.

At step 513, bits of data can be mapped into a certain set of frequencies and phases according to the programmed configuration of the combinatorial scheme. In some embodiments, (at step 515 if needed) the amplitudes of the frequencies can be corrected by the system according to their attenuations, and (at step 517 if needed) sharp transitions between two consecutive output signals can be smoothed by applying a low pass filter. At step 519, the first output signal is ready for transmission by the modulator and, at steps 521, 523 the second output signal is prepared for joining and smoothing with the next output signal produced by the same sequence of steps from the next portion of captured data.

Figure 38:
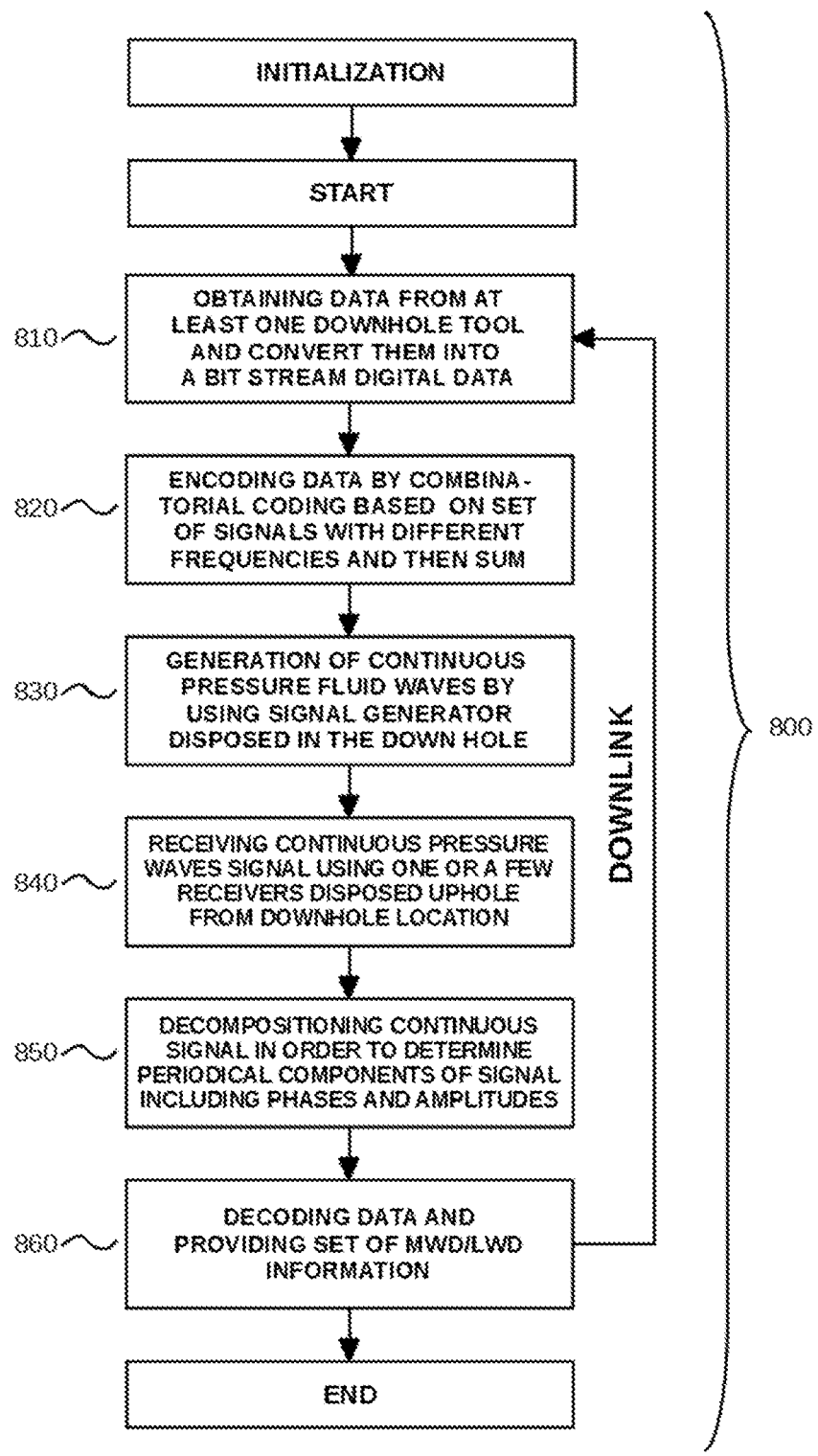
FIG. 38 is a flow chart of a combinatorial periodical signal transmission process of an exemplary system for downhole signal transmission with combinatorial frequencies according to the present disclosure.

FIG. 38 is a flow chart of the combinatorial periodical signal transmission process 800 used to send data from the downhole location to a location at the surface of the well site. The flow chart provides a general summary of the disclosed combinatorial process and its implementation may be realized based on mud pulse telemetry or EM telemetry (see, e.g., FIG. 39). At step 810, data is obtained from at least one downhole tool or sensor and is converted into a bit stream of digital data in accordance with a current feed identification (FID) sequence of words in the transmitting frame. A word can vary in size (e.g., from 3 to 40 bits) depending on a selection of particular realization of CFM. At step 820, the system calls for combinatorial encoding of the digital data stream to produce a series of 3 to 32 bit output signals. Each combination of bits has a unique corresponding set of frequencies along with their phase or other types of modulation. For example, if digital data is transmitting by 12 bit portions, then the amount of combinations in the combinatorial scheme is equal to $2^{12}$ or 4096 combinations.

At step 820, options are provided to the system for redistribution of amplitudes for frequency components of the output signal taking into account the difference in the attenuations for each frequency. At step 820, analysis of noises is performed and parameters of the combinatorial encoding and output signal can be adjusted by the system in order to neutralize the influence of noises. At step 820, downlinking commands can be received by the system in order to change the current CFM realization to a new realization (if needed), as well as to receive information on the measured depth, which may be used for adjustment of the attenuation coefficients. At step 820, the system can smooth transitions between phase shifts between adjacent output signals by using low pass filters.

At step 830, the system can transmit the series of 3-32-bit symbols as pressure wave signals 50 through the drilling fluid 32 disposed in the borehole via a mud pulses. At step 840, the system can receive the pressure wave signal 50 by a transducer(s) 38. At step 850, the system can convert an analog signal to digital signals, performs filtering, demodulation by using FFT or any others method of signal frequency decomposition, decodes data, organizes data according to frame predefined sequences, provides data outputs to the monitors and/or in the form of different prints and reports, combinations thereof, or the like. At step 850, the system can evaluate narrow frequency noises and generates downlinking commands to change current CFM realization to a new realization (if needed), which may better fit to the observed noises. An updated set of downhole instructions can be transmitted to supply MD information to the downhole controller. The process 800 of FIG. 38 can generally be used with electromagnetic (EM) telemetry systems.

Figure 39:
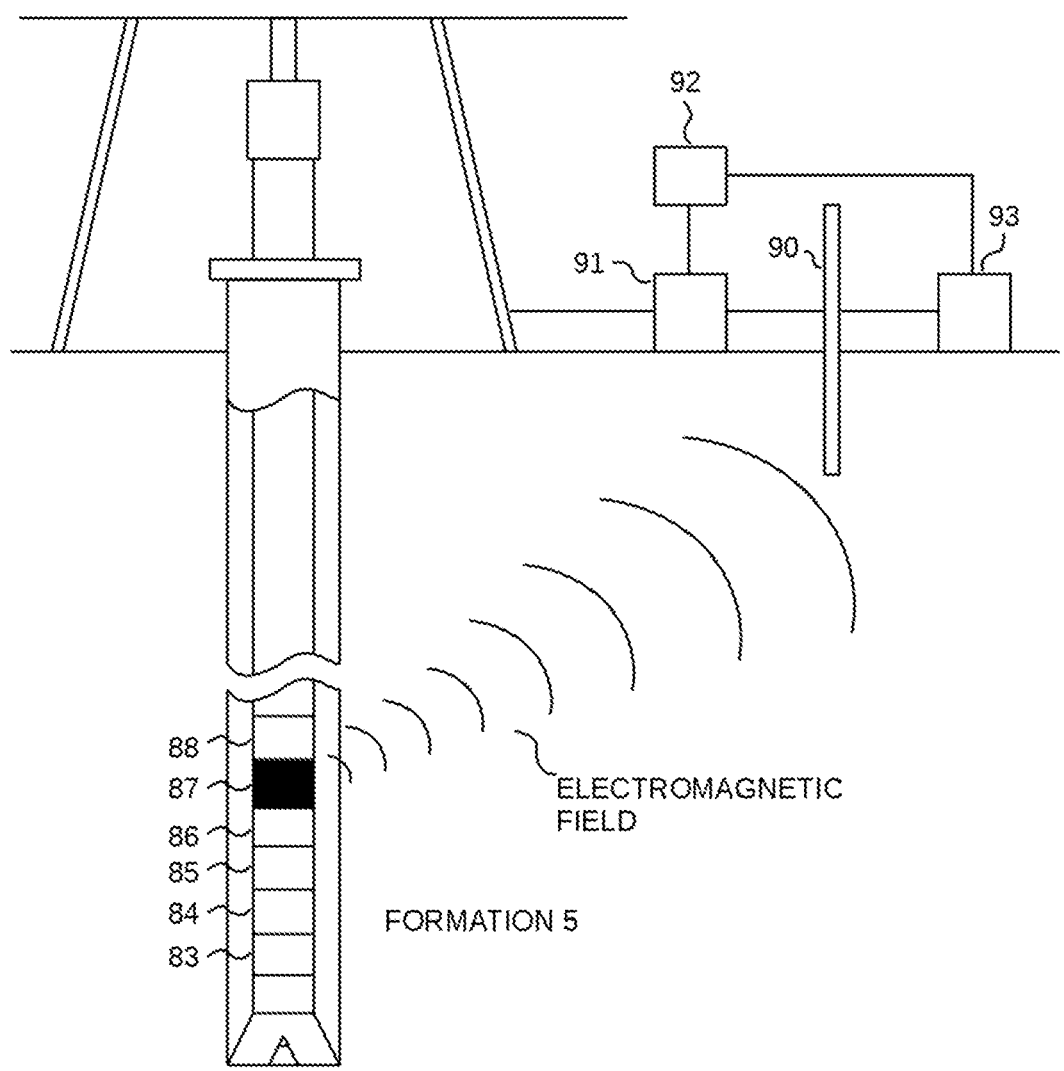
FIG. 39 is a diagrammatic view of a telemetry system for an exemplary system for downhole signal transmission with combinatorial frequencies according to the present disclosure.

FIG. 39 is a diagrammatic view of an electromagnetic LWD system that transmits information via electromagnetic signals and can incorporate the exemplary combinatorial frequency scheme. Such electromagnetic system generally includes at least one downhole sensor 83, a downhole signal transmitter 86, a downhole electronics and processing module 85 to encode data, a power supply 84 (batteries or generator), an uphole receiver system 91, and surface data processing and demodulation software. The downhole sensors 83 installed in the downhole EM telemetry tool can be used to measure parameters during operation of the tool. The sensors 83 (or a processing device associated with the system) can translate the detected parameters into one or more electrical signals, can modulate the signals, and transmits the signals using a transmitter 86.

In some LWD systems, the drill string can be divided into two sections by including an electrically insulating gap sub 87. The part of the drill string above the gap 87 (section 88) becomes one part of the antenna, and the lower part of the drill string below the gap 87 acts as the other side of the antenna. In order to transmit the signal, the tool applies voltage across the gap 87. The formation 5 completes the circuit by being in contact with the tool. Such type of antenna can be used as a lower frequency modulator during implementation of the exemplary combinatorial frequency system. On the surface, the difference in electrical potential is measured by setting up surface grounding rods 90. The surface data processing box 91 can include analog amplifiers to increase the transmitted signals. The data processing device 92 (e.g., a computer) performs the decoding of the transmitted data. Downlink transmitter 93 is used to change the downhole tool configuration during a bit run. All other options of downlinking described above for mud pulse telemetry are fully applicable for the combinatorial process of the electromagnetic telemetry system.

In order to save battery power, in some embodiments, the system can adjust the level of the uplink signal to prevent wasting of energy by the transmitter. The excessive strength of the signal on the surface can be unnecessary and a minimum sufficient level of the signal can be defined. The level can be selected to provide a suitable signal/noise ratio to decode information, and, at the same time, the level is such that going above the level would be redundant and does not bring any significant benefits to operation of the system, only causing extra battery consumption. For example, if the surface receiver of the particular electromagnetic LWD tool requires a 10-20 mV signal on the surface, a 500 mV signal would be a pointless waste of battery power.

In some embodiments, estimations of the actual level of the formation resistivity can be used to control the amplitude of the emitted signal by adjusting an internal resistivity level of the tool. In order to obtain such estimation, the system can utilize a special control signal, for example, having $F_{control} = (F_{max} - F_{min})/2$ and a constant amplitude. The changes of current reflect the information about formation resistivity. The control signal can occupy 0.1-10% of the power line depending on the formation heterogeneity. A low level of current that is used to generate the control signal provides low battery consumption. In some embodiments, the desired results can be achieved by adding high internal resistivity.

Figure 40:
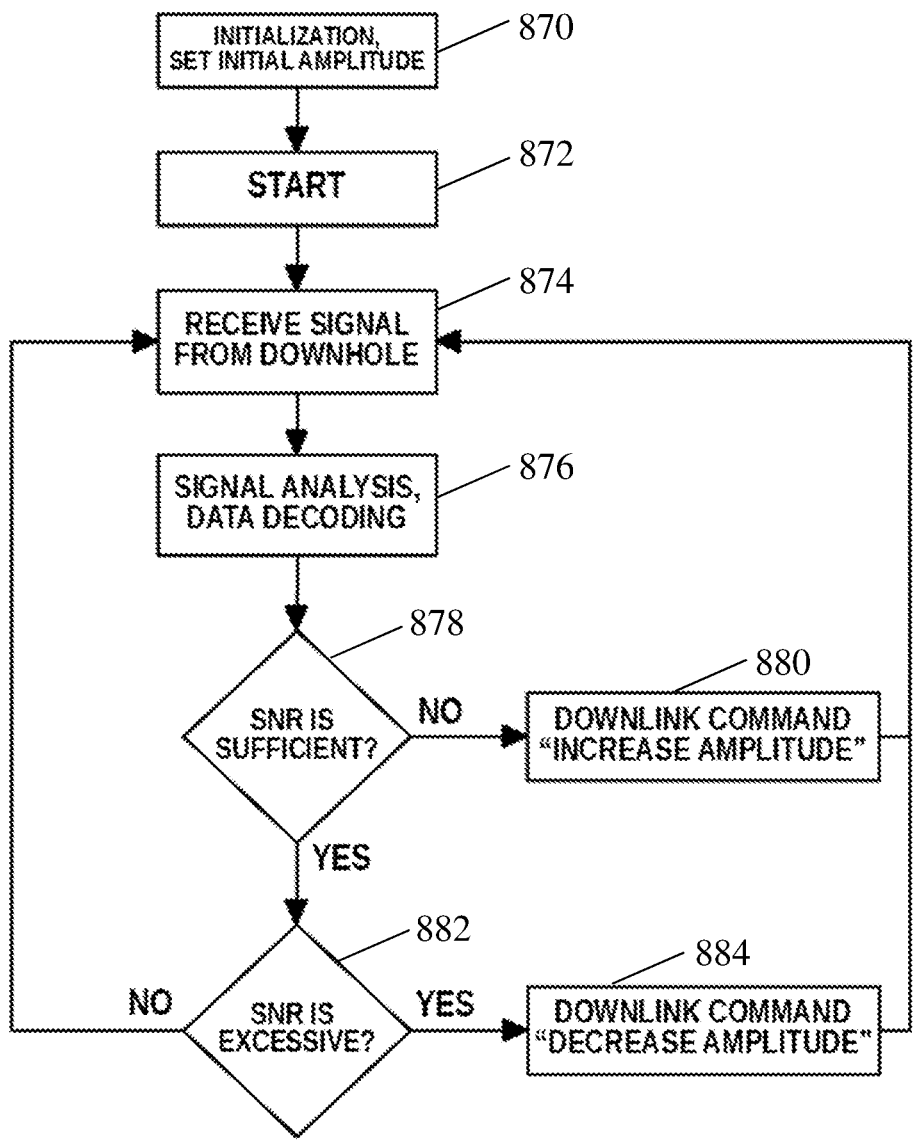
FIG. 40 is a flow chart for adjustment of amplitude of a signal at a surface subsystem to prevent the amplitude from moving out of lower and upper bounds for an exemplary system for downhole signal transmission with combinatorial frequencies according to the present disclosure.

In order to set an appropriate level of the signal, the downhole LWD tool can include a feedback loop from the surface equipment that provides precise estimations of the power of the received signal. The procedure of downlinking can include emitting the signal from the surface and receiving the signal by the downhole dipole. For example, if the surface receiver detects that the strength of the received signal is not sufficient (or too high), a special downlink code can be transmitted by the system downhole to control the LWD tool to adjust power of the emitting signal. FIG. 40 shows a flow chart of a process involving an algorithm programmed into the system for how the surface subsystem can adjust the amplitude of the signal preventing the signal from reaching out of lower and upper bounds. The number of downlink procedures can be decreased if some preliminary information on $R_{ext}$ is programmed into the tool before the bit run.

According to FIG. 40, at step 870, the system can be initialized and the initial amplitude can be set for normal LWD tool drilling operations. At step 872, the process for adjusting the amplitude of the signal can be initiated. At step 874, a signal is received from the downhole. At step 876, the signal is analyzed by the processing device and the data is decoded for further processing. At step 878, the system determines whether the signal to noise ratio (SNR) is sufficient for operation. If no, at step 880, the system can transmit a downlink command to increase the amplitude of operation. If yes, at step 882, the system can determine if the SNR is excessive for operation. If no, the system can continue to operate and returns to step 874 for further analysis of the amplitude (and potential adjustment of the amplitude, if needed). If yes, the system can transmit a downlink command to decrease the amplitude of operation.

Figure 41:
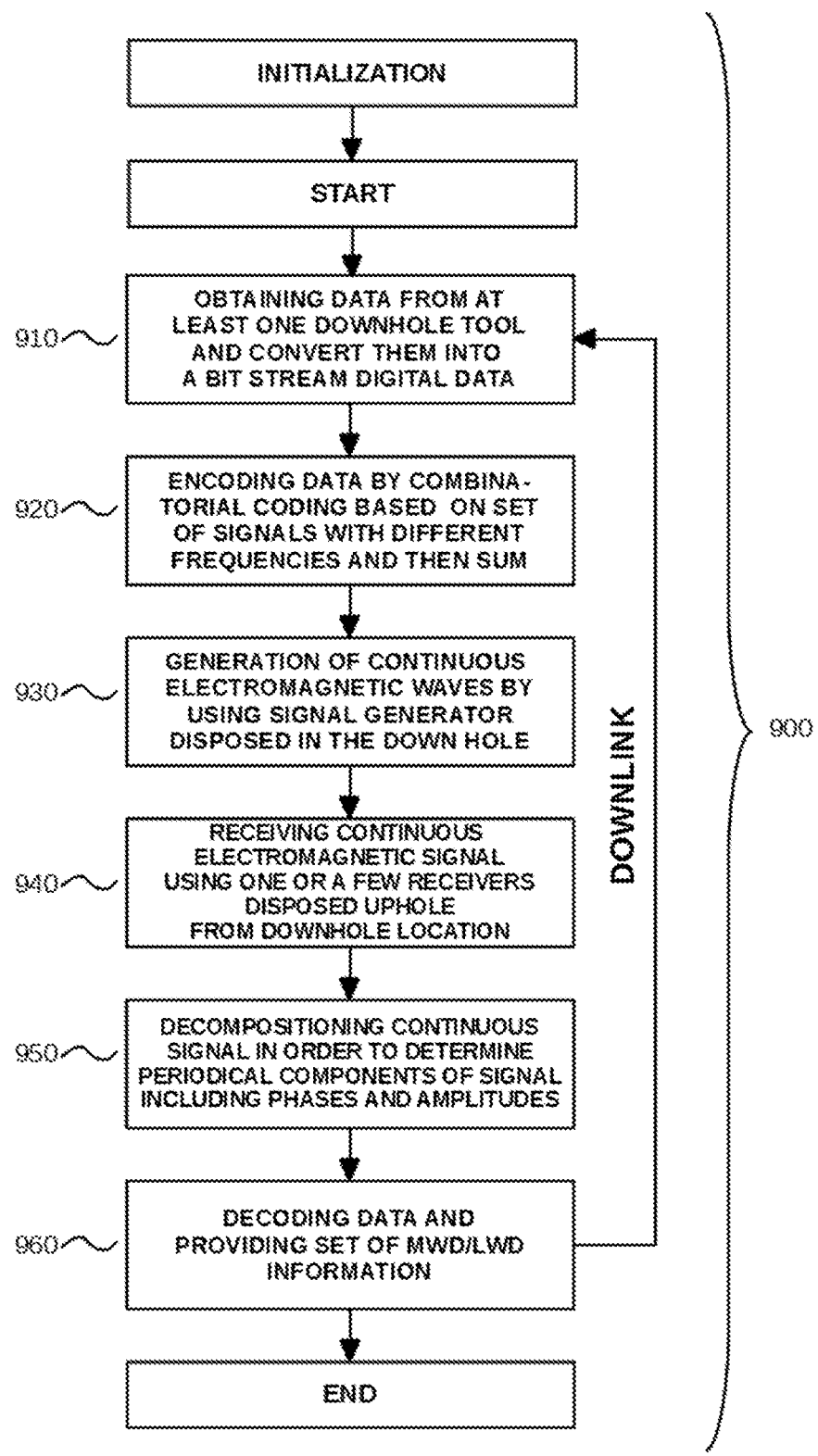
FIG. 41 is a flow chart of a combinatorial periodical signal transmission process of an exemplary system for downhole signal transmission with combinatorial frequencies according to the present disclosure.

FIG. 41 shows a process 900 which can be substantially similar to the process 800 of FIG. 38, except for the distinctions noted herein. Steps 910, 920, 950 and 960 can be substantially equivalent to steps 810, 820, 850 and 860, respectively, of FIG. 38. At step 930, the system can generate continuous electromagnetic waves by using a signal generator disposed in the down hole. At step 940, the system can receive a continuous electromagnetic signal using one or more receivers disposed upstream from or above the downhole location.

The flow diagrams and figures depicted herein are only examples and illustrations of various steps of operating the exemplary system and method. There may be many variations to the diagrams, figures and/or the steps (or operations, functions, etc.) described herein without departing from the crux and spirit of the invention. For instance, the steps may be performed in a differing order, or some steps may be added, eliminated, or modified. All of these variations are considered a part of the claimed invention.

While one or more embodiments have been shown and described, modifications and substitutions may be made thereto without departing from the spirit and scope of the invention. Accordingly, it is to be understood that the present invention has been described by way of illustrations and not limitations. It will be recognized that the various components or technologies may provide necessary or beneficial functionality or features. Accordingly, these functions and features may be added or removed as needed in support of the appended claims and variations thereof, and are recognized as being inherently included as a part of the teachings herein and a part of the invention disclosed. In addition, while the invention has been described with reference to exemplary embodiments, it will be understood that various changes may be made and equivalents may be substituted for elements thereof without departing from the scope of the invention. In addition, many modifications to the exemplary system and method may be appreciated to adapt a particular instrument, situation or material to the teachings of the invention without departing from the essential scope thereof. Therefore, it is intended that the invention not be limited to the particular embodiment disclosed as the best mode or preferred mode contemplated for carrying out this invention, but that the invention includes all embodiments falling within the scope of the appended claims.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A method for transmitting data from a measurement/logging system in a downhole location to a surface location during drilling operation of a drilling rig, the method comprising:
obtaining a measurement from at least one downhole sensor;
encoding data associated with the measurement from the at least one downhole sensor with a data encoder disposed in a wellbore, the data encoder encoding the data using a combinatorial frequency scheme;
generating continuous equivalent duration output signals with a single modulator such that each of the continuous equivalent duration output signals includes a combination of periodical components from the combinatorial frequency scheme;
receiving and recording at the surface location the continuous equivalent duration output signals generated by the single modulator; and
identifying digital signal frequency components of the continuous equivalent duration output signals with respective modulated characteristics using a data processing, demodulation and decoder module.

2. The method of claim 1, wherein the combinatorial frequency scheme includes two or more different frequencies.

3. The method of claim 1, wherein the single modulator is a mud pulser, the mud pulser is a rotationally oscillated pulser, and the rotationally oscillated pulser includes a rotor and a stator, the method comprising determining a function of pressure wave amplitude from an angle of the rotor position.

4. The method of claim 1, wherein the combinatorial frequency scheme is divided into groups of two or more frequencies, each group of the two or more frequencies is responsible for transmission of information independent from another group of the two or more frequencies, and the continuous equivalent duration output signals generated by the single modulator include one frequency combination from each group of the two or more frequencies.

5. The method of claim 1, comprising calculating a power spectrum of equivalent duration segments with Fourier Transform (FT) or Fast Fourier Transform (FFT).

6. The method of claim 2, wherein the two or more different frequencies are orthogonal frequencies.

7. The method of claim 2, comprising determining a maximum frequency $F_{max}$ for the two or more different frequencies with the single modulator.

8. The method of claim 2, comprising detecting narrow frequency noises during drilling operation.

9. The method of claim 2, comprising selecting a data transmission rate based on an amount of data transmission necessary to satisfy drilling requirements during operation of the drilling rig, and selecting the single modulator based on the amount of data transmission necessary to satisfy the drilling requirements.

10. The method of claim 2, comprising selecting a mud pulser for the single modulator for low frequency ranges of about 0.5 Hz to about 8 Hz of the two or more different frequencies.

11. The method of claim 2, comprising selecting an electromagnetic generator for the single modulator for low frequency ranges of about 0.5 Hz to about 10 Hz of the two or more different frequencies.

12. The method of claim 6, comprising adjusting the two or more frequencies of the combinatorial frequency scheme for attenuation during propagation of signals from a downhole to the surface location, wherein an adjustment coefficient for each input frequency of the combinatorial frequency scheme is calculated by:

$$C(f) = \frac{P(f_{min})}{P(f)} = \exp\left[-4\pi\left(\frac{D}{d}\right)^2\left(\frac{\mu}{K}\right)(f_{min} - f)\right].$$

where P(f) is a surface amplitude of harmonic with frequency f, $P(f_{min})$ is the surface amplitude of harmonic with frequency $f_{min}$, $f_{min}$ is a lowest frequency in the combinatorial frequency scheme, D is a measured depth between a transducer at the surface location and the single modulator in a downhole, d is an inside diameter of a drill pipe, μ is a plastic viscosity of a drilling fluid, and K is a bulk modulus of a volume of the drilling fluid above the modulator.

13. The method of claim 12, comprising downlinking data corresponding to a current measured depth for the single modulator to a downhole electronic controller, wherein the current measured depth of the modulator in the downhole is downlinked to the downhole electronic controller by a predefined incremental value.

14. The method of claim 13, comprising downlinking a next measured depth increment to the downhole electronic controller prior to reaching a predefined depth with the single modulator or when an actual depth of the well exceeds a corresponding predefined depth to use different attenuation coefficients, wherein amplitude correction attenuation coefficients are applied identical to a measured depth interval between two consecutive downlinking commands, and wherein the applied amplitude correction attenuation coefficients are equal to the amplitude correction coefficients at a midpoint of the measured depth interval.

15. The method of claim 14, wherein:
frequencies having strong noise levels above a predefined value are excluded from the combinatorial frequency scheme; and
if a reduction of the amount of the frequencies of the combinatorial frequency scheme results in the data rate transmission below a predefined level, the method comprises selecting a new combinatorial frequency scheme with more frequency components than the combinatorial frequency scheme and downlinking the new combinatorial frequency scheme to the downhole electronic controller.

16. The method of claim 14, comprising allocating some of the measured depth intervals to have no output signals for detecting the narrow frequency noises during the drilling operation and parameters of the narrow frequency noises.

17. The method of claim 6, wherein downlinking commands includes two or more groups, and wherein each group of the two or more groups is related to one of a plurality of command categories, the command categories including commands to change current feed identification (FID), the combinatorial frequency scheme, attenuation compensation coefficients, or a measure depth counter.

18. The method of claim 17, wherein a group of the combinatorial frequency scheme includes subgroups allocated to avoid noise, wherein one subgroup of the subgroups is allocated to options of changing a value of an equivalent duration interval and another subgroup of the subgroups is allocated to reducing frequencies of the combinatorial frequency scheme that coincide with frequencies of strong noise.

19. The method of claim 6, comprising:
eliminating noise frequencies below and above frequencies of the combinatorial frequency scheme with data processing means; or
transforming digital signals from a time domain to a frequency domain with the data processing means.

20. The method of claim 7, wherein the two or more different frequencies are orthogonal frequencies, and an amount of the orthogonal frequencies in the combinatorial frequency scheme is determined based on a value of the maximum frequency $F_{max}$ and on a selected equivalent duration of output combinatorial signals.

21. The method of claim 7, comprising determining a value of the maximum frequency $F_{max}$ with the single modulator based on one or more data transmission rate requirements of the drilling rig.

22. The method of claim 21, wherein the combinatorial frequency scheme includes a set of N frequencies, and an amount of combinations for simultaneous transmissions of K different frequencies is calculating by:

$$C_{n,k} = \frac{n!}{K!(n-k)!}$$

where n represents a total amount of the frequencies, and K is in a range $$1 \le K \le \frac{N}{2}$$

if N is an even value, and K is in a range $$1 \le K \le \frac{N+1}{2}$$

if N is an odd number, and wherein K is selected based on the one or more data transmission rate requirements of the drilling rig.

23. The method of claim 21, wherein the one or more data transmission rate requirements of the drilling rig are calculated by:
$C_{total,N,K} = C_{n,1} + C_{n,2} + \ldots + C_{n,k}$
where K is changed from 1 to $$\frac{N}{2} \text{ or } \frac{N+1}{2}.$$

24. The method of claim 23, wherein:
a cumulative curve of the one or more data transmission rates from K is constructed and $K_j$ is selected based on predetermined criteria; and
an option to send simultaneously $K_j+1$ frequencies is added to the combinatorial frequency scheme, such option providing an increase in the data transmission rate of less than 20%, and a maximum value of K is equal to $K=K_j$.

25. The method of claim 24, wherein in order to increase the data transmission rate, an additional modulation in the form of at least one of phase or amplitude modulation is added to each frequency of the combinatorial frequency scheme, wherein the additional modulation of each frequency includes a combination of a phase shift key and an amplitude shift key.

26. The method of claim 21, wherein a minimum equivalent duration is selected such that at least two orthogonal frequencies are available to use in the combinatorial frequency scheme, and wherein an amount of different phase key shifts, amplitude key shifts, or a combination of the different phase key shifts and the amplitude key shifts is selected to achieve the one or more data transmission requirements of the drilling rig.

27. The method of claim 3, wherein the function of pressure wave amplitude is determined by flow loop measurements or by:

$$P(\varphi) = A(\varphi) - A_0 \approx \frac{\delta Q^2}{(\varphi_{max} - \varphi)^2} - \frac{\delta Q^2}{\varphi_{max}^2}.$$

28. The method of claim 3, comprising:
selecting a rotor oscillating range between a minimum angular position ($\varphi_{min}$) and a maximum angular position ($\varphi_{max}$) based on the function of pressure wave amplitude and the value of the maximum frequency $F_{max}$, wherein an open area for mud flow has a maximum value at the minimum angular position ($\varphi_{min}$) and wherein the open area for mud flow has a minimum value at the maximum angular position ($\varphi_{max}$); and
determining a rotor position $\varphi_n$, wherein an angle associated with the rotor position $\varphi_n$ is between the minimum angular position ($\varphi_{min}$) and the maximum angular position ($\varphi_{max}$), and an amplitude of a pressure wave ($A\varphi_n$) is equal to ($A\varphi_{max} - A\varphi_{min}$)/2.

29. The method of claim 4, wherein the information transmitted by each group of the groups is the same.

30. The method of claim 4, wherein the information transmitted by each group of the groups is different.

31. The method of claim 4, wherein if a presence of a significant level of noise is detected, the combinatorial frequency scheme is divided into two groups, each of the two groups having an equal number of frequency combinations, and each of the two groups simultaneously transmitting equal binary data sets.

32. The method of claim 31, comprising comparing the binary data sets from the two groups and (i) if the binary data sets are identical, determining that a probability value for correcting encoding is high, or (ii) if the binary data sets are different, an expected value is selected for encoding.

33. The method of claim 32, wherein the expected value is calculated based on a prediction of a next sample value determined using at least one of a naïve method, a moving average method, a weighted smoothing method, a simple linear regression method, a partial least squares regression method, or a polynomial fit method.

34. A telemetry system for transmitting data from a measurement/logging system in a downhole location to a surface location, the telemetry system comprising:
a fluid supply line located at or near the surface location, the fluid supply line providing drilling fluid under pressure to a drill string;
a bottom hole assembly of the drill string including at least one sensor;
a single downhole modulator configured to transmit output signals to the surface location;
one or more energy sources to power the at least one sensor and downhole electronics;
a data encoder and signal processing electronics configured to produce a control signal using a combinatorial frequency scheme;
receiving equipment at the surface location to receive and record the output signals from the single downhole modulator; and
a processing device configured to process, modulate, decode and display data associated with the output signals;

wherein:
the data encoder and signal processing electronics is configured to produce the control signal using the combinatorial frequency scheme by generating continuous equivalent duration output signals with the single downhole modulator such that each of the continuous equivalent duration output signals includes a combination of periodical components from the combinatorial frequency scheme;
the single downhole modulator is a mud pulser capable of operating at a maximum frequency $F_{max}$, wherein the mud pulser is an oscillating rotating pulser including a rotor with two to eight rotor blades and including a stator with a corresponding number of stator opening, and wherein a distance between the rotor and the stator is adjustable based on an expected average flow rate of the drilling fluid;
the telemetry system comprises a downhole controller including a microcontroller and firmware software configured to obtain data from downhole tools and probes, convert analog signals to a digital form, organize data into words according to a current FID, select an appropriate combination from the combinatorial frequency scheme, perform bend filtering, generate control signals of the output signals, and send the control signals to a controller of a motor driver of the single downhole modulator;
the system comprises a downhole controller including a microcontroller and firmware software configured to obtain data from downhole tools and probes, convert analog signals to a digital form, organize data into words according to a current FID, select an appropriate combination from the combinatorial frequency scheme, perform bend filtering, generate control signals of the output signals, and send the control signals to a controller of a motor driver of the single downhole modulator; or
the processing device is configured to perform at least one of bandpass filtering, calculation of a ratio signal to noise, or removal of narrow band noises including a pump noise.

35. The telemetry system of claim 34, wherein the single downhole modulator comprises a motor coupled to a valve of the rotor and configured to utilize a variable-feedback controller to keep rotor positions in a predefined angle range.

36. The telemetry system of claim 35, comprising a motor controller configured to receive control signals from a downhole controller to generate an output pressure wave which is unique to a particular combination of frequencies from the combinatorial frequency scheme.

37. The telemetry system of claim 36, wherein the modulator is configured to be driven by a motor controller, and wherein the motor controller is configured to closely match a rotor position to each extremum of the output signals.

38. The telemetry system of claim 37, wherein:
the motor controller provides regulation of the rotor position based on calculations of a rotor velocity for each discreet time step; or
a motor control is based on calculation of a time difference between adjacent extremums of the output signals.

39. The telemetry system of claim 38, wherein the motor controller is configured to take into account a presence of pitch play in a reduction gear, and wherein an increase of the maximum frequency $F_{max}$ for the modulator is achieved by selection of a gear reduction component with a reduced gear ratio.

40. An electromagnetic telemetry system for generating electromagnetic signals, the electromagnetic telemetry system comprising:
- a single downhole modulator configured to transmit data via electromagnetic telemetry;
- at least one downhole sensor;
- a downhole processing device configured to encode data using a combinatorial frequency scheme to generate output signals;
- one or more energy sources to power the single downhole modulator, the at least one downhole sensor, and the at least one downhole processing device;
- a receiver system at a surface location; and
- a surface processing device configured to identify periodical components of the output signals and modulate characteristics of the output signals;
- wherein the single downhole modulator is a dipole with an insulator gap.

41. The electromagnetic telemetry system of claim 40, wherein a strength of the output signals is aligned with impedance of a surrounding earth formation around a well of a drilling rig, wherein the impedance of the drilling fluid is calculated based on measurement of a current level in a control line by using a constant value for a voltage for transmission of control signal, and wherein the constant value of the voltage in the control line is 5-10 less than a nominal value of the voltage of a supply from the one or more energy sources.

42. The electromagnetic telemetry system of claim 41, wherein the control signals are a harmonic with frequency equal to $(F_{max}-F_{min})/2$, where $F_{max}$ is a value of a maximum frequency in the combinatorial frequency scheme and $F_{min}$ is a value of a minimum frequency in the combinatorial frequency scheme, and wherein the control signals occupy 0.1-10% of a total transmission time depending on earth strata heterogeneity.

43. The electromagnetic telemetry system of claim 40, wherein a strength of the output signals is adjusted to a level of a recorded signal at the surface location, wherein if the strength of the recorded signal at the surface location is above a predetermined level, downlinking is applied in order to decrease the strength of generated output signals.

* * * * *